(12) United States Patent
Saito et al.

(10) Patent No.: US 7,934,673 B2
(45) Date of Patent: *May 3, 2011

(54) WEBBING TAKE-UP DEVICE

(75) Inventors: Takuhiro Saito, Niwa-gun (JP); Katsuki Asagiri, Niwa-gun (JP); Shinji Mori, Niwa-gun (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 499 days.

This patent is subject to a terminal disclaimer.

(21) Appl. No.: 10/594,748

(22) PCT Filed: Mar. 10, 2005

(86) PCT No.: PCT/JP2005/004197
§ 371 (c)(1),
(2), (4) Date: Feb. 12, 2008

(87) PCT Pub. No.: WO2005/097562
PCT Pub. Date: Oct. 20, 2005

(65) Prior Publication Data
US 2008/0252060 A1   Oct. 16, 2008

(30) Foreign Application Priority Data

Apr. 1, 2004 (JP) .................... 2004-109314
Sep. 7, 2004 (JP) .................... 2004-259788

(51) Int. Cl.
B65H 75/48 (2006.01)

(52) U.S. Cl. .............. 242/374; 242/390.8; 242/394.1; 280/806

(58) Field of Classification Search ............ 242/374, 242/375.1–375.3, 394, 394.1, 382.1–381.2, 242/390.8; 297/478; 280/806, 807
See application file for complete search history.

(56) References Cited

U.S. PATENT DOCUMENTS 2,637,987 A   5/1953   Hill et al.
(Continued)

FOREIGN PATENT DOCUMENTS

DE   295 00 807 U1   3/1995
(Continued)

OTHER PUBLICATIONS

Supplementary European Search Report dated Jun. 4, 2009 from corresponding European Patent Application No. EP 05 72 0468.

(Continued)

*Primary Examiner* — Sang Kim
(74) *Attorney, Agent, or Firm* — Roberts Mlotkowski Safran & Cole P.C.

(57) ABSTRACT

To obtain a webbing take-up device that can not only transmit to a take-up shaft only rotation from a motor by a clutch but is also simple and compact.

A clutch of this webbing take-up device has a simply configuration where sliders 144 of a clutch body portion 114 are caused by frictional force to be retained in a case, whereby the sliders 144 and lock bars 154 are caused to relatively move and the lock bars 154 are caused by this relative movement to move to positions where they engage with or disengage from a ratchet 134. Consequently, the overall configuration of a clutch 100 can be made significantly compact (thinned) in comparison to a configuration that causes a pawl to move using an inertial disk that is large and has weight as in a conventional clutch. Thus, the overall configuration of a webbing take-up device 10 can be made compact.

9 Claims, 27 Drawing Sheets

U.S. PATENT DOCUMENTS

| | | | |
|---|---|---|---|
| 5,553,802 A | 9/1996 | Park et al. | |
| 5,601,491 A | 2/1997 | Chan et al. | |
| 5,730,384 A | 3/1998 | Foehl | |
| 6,494,395 B1 | 12/2002 | Fujii et al. | |
| 7,083,136 B2* | 8/2006 | Mori et al. | 242/390.8 |
| 7,108,284 B2 | 9/2006 | Mori et al. | |
| 7,484,683 B2* | 2/2009 | Mori et al. | 242/374 |
| 7,533,842 B2* | 5/2009 | Saito et al. | 242/390.9 |
| 2003/0052209 A1 | 3/2003 | Honl et al. | |
| 2004/0075008 A1* | 4/2004 | Mori et al. | 242/390.8 |
| 2004/0075009 A1* | 4/2004 | Mori et al. | 242/390.8 |
| 2004/0182963 A1* | 9/2004 | Mori et al. | 242/374 |
| 2005/0239556 A1 | 10/2005 | Huthmacher et al. | |
| 2006/0249613 A1 | 11/2006 | Scherzinger et al. | |
| 2006/0273212 A1* | 12/2006 | Mori et al. | 242/390.8 |
| 2007/0246593 A1* | 10/2007 | Asagiri et al. | 242/390 |
| 2007/0284870 A1* | 12/2007 | Saito et al. | 280/806 |

FOREIGN PATENT DOCUMENTS

| | | |
|---|---|---|
| DE | 201 15 316 U1 | 2/2002 |
| DE | 203 15 870 U1 | 2/2004 |
| EP | 1 382 497 A1 | 1/2004 |
| EP | 1 382 498 A2 | 1/2004 |
| EP | 1 382 498 A3 | 3/2004 |
| JP | 2-71055 U | 5/1990 |
| JP | 2001-130376 A | 5/2001 |
| JP | 2001-225720 A | 8/2001 |
| JP | 2001-347923 A | 12/2001 |
| JP | 2004-42782 A | 2/2004 |
| JP | 2004-42789 A | 2/2004 |
| JP | 2005-28970 A | 2/2005 |

OTHER PUBLICATIONS

Non-Final Office Action dated Nov. 17, 2010 in co-pending U.S. Appl. No. 12/868,914.

* cited by examiner

# WEBBING TAKE-UP DEVICE

TECHNICAL FIELD

The present invention relates to a webbing take-up device, and in particular to a webbing take-up device that can take up a webbing by a motor causing a take-up shaft to rotate.

BACKGROUND ART

Seat belt devices for restraining passengers are disposed with a webbing take-up device. Among these webbing take-up devices, there is a webbing take-up device disposed with a tension reducer mechanism for alleviating or eliminating an excessive feeling of tightness when the webbing is worn and a pretensioner mechanism that eliminates slight looseness known as "slack" or the like by causing a certain amount of the webbing to be taken up on a take-up shaft when the vehicle suddenly decelerates or the like to increase the restraining force on the body of the passenger by the webbing and more reliably hold the body of the passenger. Moreover, a motor retractor of a configuration where these functions are performed by a motor is known (see Patent Document 1 and Patent Document 2 for examples).

This type of motor retractor can not only perform the functions of a tension reducer and a pretensioner as described above, for example, but can also assist in the taking up and pulling out of the webbing during ordinary wearing of the webbing, which is extremely beneficial.

Further, here, and particularly in recent years, a motor retractor is being considered which has a configuration where the distance to another vehicle or an obstacle which is ahead is detected by a forward monitoring device such as a distance sensor, the motor is actuated when the distance to the other vehicle or obstacle which is ahead becomes less than a certain value, and the take-up shaft is caused to rotate in a take-up direction by the rotational force of the motor. This kind of motor retractor is configured such that a clutch is intervened between an output shaft of the motor and the take-up shaft so that the clutch transmits to the take-up shaft only the rotation from the motor output shaft in order to prevent rotation from the take-up shaft from being transmitted to the motor.

Incidentally, this kind of conventional motor retractor is disposed, for example, with an inertial disk and a spring that biases the inertial disk in a predetermined direction, and the motor retractor is configured to utilize inertial force acting on the inertial disk to cause a pawl to move and couple to and disengage from the clutch. For this reason, there has been the problem that it is necessary to ensure the size and weight of the inertial disk, which leads to the clutch becoming larger overall.

Patent Document 1: JP-A No. 2001-130376
Patent Document 2: JP-A No. 2001-347923

DISCLOSURE OF THE INVENTION

Problem that the Invention is to Solve

In view of the aforementioned circumstances, it is an object of the present invention to obtain a webbing take-up device that can not only transmit just the rotation of the motor to the take-up shaft by a clutch but is simple and compact.

Means for Solving the Problem

A first aspect of the invention is a webbing take-up device comprising: a take-up shaft around which a webbing for restraining a passenger is wound such that the webbing can be taken up and pulled out; a motor; and a clutch that is mechanically intervened between the motor and the take-up shaft, transmits the rotation of the motor to the take-up shaft to cause the take-up shaft to rotate, and cuts off the transmission of rotation arising at the take-up shaft side to prevent that rotation from being transmitted to the motor, wherein the clutch includes a rotating body that is disposed coaxially with respect to the take-up shaft and rotates as a result of the rotation of the motor being transmitted to the rotating body, sliders that are configured to be relatively movable within a predetermined range with respect to the rotating body, and lock bars that are disposed on the rotating body and ordinarily retained by the sliders in positions where the lock bars are disengaged from the take-up shaft, and when the rotating body rotates in one direction about its axial line, the lock bars engage with the take-up shaft, transmit to the take-up shaft the rotation of the rotating body in the one direction about its axial line, and allow the relative rotation of the take-up shaft with respect to the rotating body in the one direction about its axial line, and when the rotating body rotates in the other direction about its axial line, the lock bars are moved to and retained in the disengaged positions by the sliders.

The webbing take-up device based on this aspect is disposed with the clutch that transmits the rotation of the motor to the take-up shaft. The clutch includes the rotating body, which rotates as a result of the rotation of the motor being transmitted to the rotating body, and the lock bars, which are disposed on the rotating body and engage with the take-up shaft to transmit to the take-up shaft the rotation of the rotating body in the one direction about its axial line. The lock bars are ordinarily retained by the sliders in positions where the lock bars are disengaged from the take-up shaft. For this reason, the rotating body and the take-up shaft are ordinarily mutually relatively rotatable, and rotation arising at the take-up shaft side is prevented from being transmitted to the motor.

Thus, when a passenger seated in the seat of the vehicle pulls the webbing stored in the webbing take-up device, the webbing is pulled out while the take-up shaft rotates. Thus, when the passenger places the pulled-out webbing around his/her body and, for example, causes a tongue plate disposed on the webbing to engage with a buckle device, the passenger can wear the webbing on his/her body.

Moreover, when the motor rotates, the rotating body of the clutch is rotated in one direction about its axial line. At this time, the rotating body relatively moves within a predetermined range with respect to the sliders, the retention of the lock bars by the sliders is released, and the lock bars disposed on the rotating body engage with the take-up shaft. Thus, the rotation of the rotating body in the one direction about its axial line is transmitted to the take-up shaft via the lock bars, and the take-up shaft is rotated in the one direction about the axial line.

Moreover, in this state, because the lock bars allow the relative rotation of the take-up shaft with respect to the rotating body in the one direction about its axial line, it is also possible to cause the take-up shaft to be forcibly rotated, by a separate pretensioner device or the like, in the one direction about the axial line independent of the motor.

On the other hand, when the motor reversely rotates, the rotating body of the clutch is rotated in the other direction about the axial line. At this time, the rotating body relatively moves within a predetermined range with respect to the sliders, and the lock bars disposed on the rotating body are again moved to and retained in the positions where the lock bars are disengaged from the take-up shaft by the sliders. Thus, the rotating body and the take-up shaft again become relatively rotatable, and free rotation of the take-up shaft becomes possible.

Here, the clutch of this webbing take-up device has a simple configuration where, as described above, the sliders and the lock bars are caused to relatively move such that the lock bars are caused by this relative movement to move to the positions where the lock bars engage with or disengage from the take-up shaft. Consequently, the overall configuration of the clutch can be made significantly compact in comparison to a configuration where a pawl is moved using an inertial disk that is large and has a certain weight as in a conventional clutch. Thus, the overall configuration of the webbing take-up device can be made compact.

A second aspect of the invention is a webbing take-up device comprising: a take-up shaft around which a webbing for restraining a passenger is wound such that the webbing can be taken up and pulled out; a motor; and a clutch that is mechanically intervened between the motor and the take-up shaft, transmits the rotation of the motor to the take-up shaft to cause the take-up shaft to rotate in the webbing take-up direction, and cuts off the transmission of rotation arising at the take-up shaft side to prevent that rotation from being transmitted to the motor, wherein the clutch includes a case, a rotating body that is disposed coaxially with respect to the take-up shaft and rotates as a result of the rotation of the motor being transmitted to the rotating body, a ratchet that is integrally coupled to the take-up shaft, sliders that are configured to be relatively movable within a predetermined range with respect to the rotating body as a result of being retained in the case by frictional force, and lock bars that are disposed on the rotating body, are always biased in a direction in which the lock bars engage with the ratchet, and are ordinarily retained by the sliders in positions where the lock bars are disengaged from the ratchet, and when the rotating body rotates in the webbing take-up direction, the lock bars move away from the sliders such that the retention is released, engage with the ratchet by the biasing force, transmit to the ratchet the rotation of the rotating body in the webbing take-up direction, and allow the relative rotation of the ratchet with respect to the rotating body in the webbing take-up direction, and when the rotating body rotates in the webbing pullout direction, the lock bars move toward the sliders and are moved to and retained in the disengaged positions by the sliders.

The webbing take-up device based on this aspect is disposed with the clutch that transmits the rotation of the motor to the take-up shaft. The clutch includes the rotating body that rotates as a result of the rotation of the motor being transmitted to the rotating body, the ratchet that is integrally coupled to the take-up shaft, and the lock bars that are disposed on the rotating body and engage with the ratchet to transmit to the ratchet the rotation of the rotating body in the webbing take-up direction. The lock bars are always biased in the direction in which they engage with the ratchet and are ordinarily retained by the sliders in the positions where the lock bars are disengaged from the ratchet. For this reason, the rotating body and the ratchet are ordinarily mutually relatively rotatable, and rotation arising at the take-up shaft side is prevented from being transmitted to the motor.

Thus, when a passenger seated in the seat of the vehicle pulls the webbing stored in the webbing take-up device, the webbing is pulled out while the take-up shaft rotates in the webbing pullout direction. Thus, when the passenger places the pulled-out webbing around his/her body and, for example, causes a tongue plate disposed on the webbing to engage with a buckle device, the passenger can wear the webbing on his/her body.

Moreover, when an obstacle is present in front of the vehicle while the vehicle is traveling and the distance between the vehicle and the obstacle (the distance from the vehicle to the obstacle) comes within a predetermined range, the motor rotates and the rotating body of the clutch is rotated in the webbing take-up direction. At this time, because the sliders are retained in the case by frictional force, the rotating body relatively moves within a predetermined range with respect to the sliders, and the lock bars disposed on the rotating body move away from the sliders.

For this reason, the lock bars engage with the ratchet by frictional force, and the rotation of the rotating body in the webbing take-up direction is transmitted to the ratchet via the lock bars. Thus, the ratchet is rotated in the webbing take-up direction, and the take-up shaft integrally coupled to the ratchet is rotated in the webbing take-up direction. Thus, the webbing is taken up on the take-up shaft, slight looseness called "slack" of the webbing in the worn state is eliminated, and the restraining force on the body of the passenger by the webbing can be raised.

Moreover, in this state, because the lock bars allow the relative rotation of the ratchet (the take-up shaft) with respect to the rotating body in the webbing take-up direction, it is also possible to cause the take-up shaft to be forcibly rotated in the webbing take-up direction by a separate pretensioner device or the like when, for example, a collision of the vehicle can no longer be avoided in a state where the "slack" has been eliminated as described above. In this case, the restraining force on the body of the passenger by the webbing can be raised even more, and injury to the passenger in the event of a vehicle collision can be kept to a minimum.

On the other hand, when the danger of a vehicle collision has been avoided as described above, the motor is reversely rotated and the rotating body of the clutch is rotated in the webbing pullout direction. At this time, because the sliders are retained in the case by frictional force, the rotating body relatively rotates with respect to the slides within a predetermined range, and the lock bars disposed on the rotating body move toward the sliders. For this reason, the lock bars are again moved to and retained in the positions where they are disengaged from the ratchet by the sliders. Thus, the rotating body and the ratchet again become relatively rotatable, and free rotation of the take-up shaft becomes possible.

Here, the clutch of this webbing take-up device has a simple configuration where, as described above, the sliders are caused to be retained in the case by frictional force, whereby the sliders and the lock bars are caused to relatively move such that the lock bars are caused by this relative movement to move to the positions where the lock bars engage with or disengage from the ratchet. Consequently, the overall configuration of the clutch can be made significantly compact in comparison to a configuration where a pawl is moved using an inertial disk that is large and has a certain weight as in a conventional clutch. Thus, the overall configuration of the webbing take-up device can be made compact.

In a third aspect of the invention, the rotating body of the webbing take-up device based on the first or second aspect includes: a gear wheel that rotates as a result of the rotation of the motor being transmitted to the gear wheel; a rotor that supports the lock bars; and spring pawls that are disposed between the gear wheel and the rotor, couple both to each other, and transmit the rotation of the gear wheel to the rotor, and when a load equal to or greater than a predetermined value acts on the rotor, the spring pawls cut off the transmission of rotation between the gear wheel and the rotor by the load to enable both to relatively idle.

In the webbing take-up device based on this aspect, when the gear wheel is rotated by the rotation of the motor, this rotation is transmitted to the rotor via the spring pawls and the rotor is rotated. For this reason, because the lock bars supported on the rotor relatively move within a predetermined range with respect to the sliders, retention of the lock bars by the sliders and release of this retention can be performed by switching the rotational direction of the motor.

When, for example, a load equal to or greater than a predetermined value acts on the take-up shaft from the webbing in a state where the take-up shaft and the rotor are coupled together by the lock bars, a load equal to or greater than a predetermined value acts on the rotor via the lock bars. When a load equal to or greater than a predetermined value acts on the rotor, the spring pawls cut off the transmission of the rotation between the gear wheel and the rotor by this load and enable both to relatively idle (load limiter mechanism). Thus, the take-up shaft coupled to the rotor via the lock bars can be prevented from being rotated with a force more than necessary by the driving force of the motor.

A fourth aspect of the invention is a webbing take-up device comprising: a take-up shaft around which a webbing for restraining a passenger is wound such that the webbing can be taken up and pulled out; a motor; and a clutch that is mechanically intervened between the motor and the take-up shaft, transmits the rotation of the motor to the take-up shaft to cause the take-up shaft to rotate, and cuts off the transmission of rotation arising at the take-up shaft side to prevent that rotation from being transmitted to the motor, wherein the clutch includes a rotating body that is disposed coaxially with respect to the take-up shaft and rotates as a result of the rotation of the motor being transmitted to the rotating body, sliders that are configured to be relatively movable within a predetermined range with respect to the rotating body and include push retention pieces that protrude toward one side in the moving direction, and lock bars that are disposed on the rotating body, are always biased in a direction in which they engage with the take-up shaft, include release pieces that protrude toward the push retention pieces of the sliders, and are ordinarily retained in positions where the lock bars are disengaged from the take-up shaft as a result of the release pieces engaging with the push retention pieces, and when the rotating body rotates in one direction about its axial line, the lock bars move away from the sliders such that the retention is released, engage with the take-up shaft by the biasing force, and transmit to the take-up shaft the rotation of the rotating body in the one direction about its axial line, and when the rotating body rotates in the other direction about its axial line, the lock bars move toward the sliders and are moved to and retained in the disengaged positions as a result of the release pieces engaging with the push retention pieces, and at least one of the push retention pieces of the sliders and the release pieces of the lock bars include retention portions that cause predetermined drag to arise with respect to the movement of the sliders away from the lock bars when the rotating body is stopped.

The webbing take-up device based on this aspect is disposed with the clutch that transmits the rotation of the motor to the take-up shaft. The clutch includes the rotating body, which rotates as a result of the rotation of the motor being transmitted to the rotating body, and the lock bars, which are disposed on the rotating body and engage with the take-up shaft to transmit to the take-up shaft the rotation of the rotating body in the one direction about its axial line. The lock bars include the release pieces, and ordinarily the release pieces engage with the push retention pieces of the sliders such that the lock bars are retained in the positions where the lock bars are disengaged from the take-up shaft. For this reason, the rotating body and the take-up shaft are ordinarily mutually relatively rotatable, and rotation arising at the take-up shaft side is prevented from being transmitted to the motor.

Thus, the same effects that are obtained by the webbing take-up device of the first aspect are obtained.

In the clutch of the webbing take-up device based on this aspect, at least one of the push retention pieces of the sliders and the release pieces of the lock bars include retention portions that cause predetermined drag to arise with respect to the movement of the sliders away from the lock bars when the rotating body is stopped. Consequently, even when the sliders try to move away from the lock bars due to intense vibration of the vehicle or the like during travel, this away movement is deterred by the predetermined drag resulting from the retention portions, and the state of engagement between the push retention pieces of the sliders and the release pieces of the lock bars is maintained. Thus, the retention of the lock bars by the sliders is prevented from being inadvertently released, and erroneous linkage of the clutch is prevented.

In a fifth aspect of the invention, the retention portions of the webbing take-up device of the fourth aspect are configured as slanted surfaces that cause the lock bars to move a predetermined amount in the direction in which the lock bars disengage from the take-up shaft counter to the biasing force when the sliders move away from the lock bars.

In the webbing take-up device based on this aspect, slanted surfaces are disposed on at least one of the push retention pieces of the sliders and the release pieces of the lock bars. The slanted surfaces cause the lock bars to move a predetermined amount in the direction in which the lock bars disengage from the take-up shaft counter to the biasing force when the sliders move away from the lock bars. Thus, predetermined drag arises with respect to the movement of the sliders away from the lock bars, and erroneous linkage of the clutch is prevented.

A sixth aspect of the invention is a webbing take-up device comprising: a take-up shaft around which a webbing for restraining a passenger is wound such that the webbing can be taken up and pulled out; a motor; and a clutch that is mechanically intervened between the motor and the take-up shaft, transmits the rotation of the motor to the take-up shaft to cause the take-up shaft to rotate, and cuts off the transmission of rotation arising at the take-up shaft side to prevent that rotation from being transmitted to the motor, wherein the clutch includes a rotating body that is disposed coaxially with respect to the take-up shaft and rotates as a result of the rotation of the motor being transmitted to the rotating body, sliders that are configured to be relatively movable within a predetermined range with respect to the rotating body, and lock bars that are disposed on the rotating body and are always biased in a direction in which the lock bars disengage from the take-up shaft, and when the rotating body rotates in one direction about its axial line, the lock bars engage with the take-up shaft as a result of being pushed toward the take-up shaft by the sliders and transmit to the take-up shaft the rotation of the rotating body in the one direction about its axial line, and when the rotating body rotates in the other direction about its axial line, the lock bars are moved to and retained in the disengaged positions by the biasing force as a result of the pushing by the sliders being released.

The webbing take-up device based on this aspect is disposed with the clutch that transmits the rotation of the motor to the take-up shaft. The clutch includes the rotating body, which rotates as a result of the rotation of the motor being transmitted to the rotating body, and the lock bars, which are disposed on the rotating body and engage with the take-up shaft to transmit to the take-up shaft the rotation of the rotating body in the one direction about its axial line. The lock bars are always biased in the direction in which they are disengaged from the take-up shaft and are ordinarily retained in the positions where they are disengaged from the take-up shaft. For this reason, the rotating body and the take-up shaft are ordinarily mutually relatively rotatable, and rotation arising at the take-up shaft side is prevented from being transmitted to the motor.

Thus, the same effects that are obtained by the webbing take-up device of the first aspect are obtained.

In the clutch of the webbing take-up device based on this aspect, the lock bars have a configuration where they are always biased in the direction in which they are disengaged from the take-up shaft. Consequently, even when intense vibration arises in the vehicle during travel, for example, the lock bars are retained by the biasing force in the positions where the lock bars are disengaged from the take-up shaft. Thus, the lock bars are prevented from inadvertently engaging with the take-up shaft, and erroneous linkage of the clutch is prevented.

A seventh aspect of the invention is a webbing take-up device comprising: a take-up shaft around which a webbing for restraining a passenger is wound such that the webbing can be taken up and pulled out; a motor; and a clutch that is mechanically intervened between the motor and the take-up shaft, transmits the rotation of the motor to the take-up shaft to cause the take-up shaft to rotate, and cuts off the transmission of rotation arising at the take-up shaft side to prevent that rotation from being transmitted to the motor, wherein the clutch includes a rotating body that is disposed coaxially with respect to the take-up shaft and rotates as a result of the rotation of the motor being transmitted to the rotating body, a pair of sliders that are configured to be relatively movable within a predetermined range with respect to the rotating body, a spacer that couples together and synchronizes the pair of sliders, and a pair of lock bars that are disposed on the rotating body and are ordinarily retained by the sliders in positions where the lock bars are disengaged from the take-up shaft, and when the rotating body rotates in one direction about its axial line, the retention is released such that lock bars engage with the take-up shaft and transmit to the take-up shaft the rotation of the rotating body in the one direction about its axial line, and when the rotating body rotates in the other direction about its axial line, the lock bars are moved to and retained in the disengaged positions by the sliders.

The webbing take-up device based on this aspect is disposed with the clutch that transmits the rotation of the motor to the take-up shaft. The clutch includes the rotating body, which rotates as a result of the rotation of the motor being transmitted to the rotating body, and the pair of lock bars, which are disposed on the rotating body and engage with the take-up shaft to transmit to the take-up shaft the rotation of the rotating body in the one direction about its axial line. The lock bars are ordinarily retained by the pair of sliders in the positions where they are disengaged from the take-up shaft. For this reason, the rotating body and the take-up shaft are ordinarily mutually relatively rotatable, and rotation arising at the take-up shaft side is prevented from being transmitted to the motor.

Thus, the same effects that are obtained by the webbing take-up device of the first aspect are obtained.

In the clutch of the webbing take-up device based on this aspect, the pair of sliders that retain the pair of lock bars in the positions where the lock bars are disengaged from the take-up shaft are coupled together by the spacer and are synchronous.

Consequently, even when one of the sliders tries to relatively rotate with respect to the rotating body (one of the lock bars) due to intense vibration of the vehicle or the like, the retention of the one lock bar by the one slider is not released unless the other slider and the spacer relatively rotate with respect to the rotating body. That is, in this clutch, the retention of the lock bars by the sliders is not released unless the sliders and the spacer relatively rotate at the same time with respect to the lock bars.

Thus, when the rotating body is stopped (i.e., when the motor is stopped), the pair of sliders are prevented from inadvertently relatively rotating with respect to the pair of lock bars, and erroneous linkage of the clutch is prevented.

In an eighth aspect of the invention, the clutch of the webbing take-up device based on the seventh aspect includes a case and the spacer slidingly contacts the case.

In the webbing take-up device based on this aspect, the clutch includes a case, and the spacer that couples and synchronizes the pair of sliders is configured to slidingly contact the case. For this reason, because frictional force acts on the spacer, the pair of sliders and the spacer can be more reliably prevented from inadvertently relatively rotating with respect to the rotating body, that is, the pair of lock bars, and erroneous linkage of the clutch can be more reliably prevented.

Effects of the Invention

As described above, the webbing take-up device pertaining to the present invention can not only transmit to a take-up shaft only rotation from a motor by a clutch but can also be configured simply and compactly Further, the webbing take-up device of the present invention can prevent erroneous linkage of a clutch.

BEST MODES FOR IMPLEMENTING THE INVENTION

First Embodiment

Figure 10:
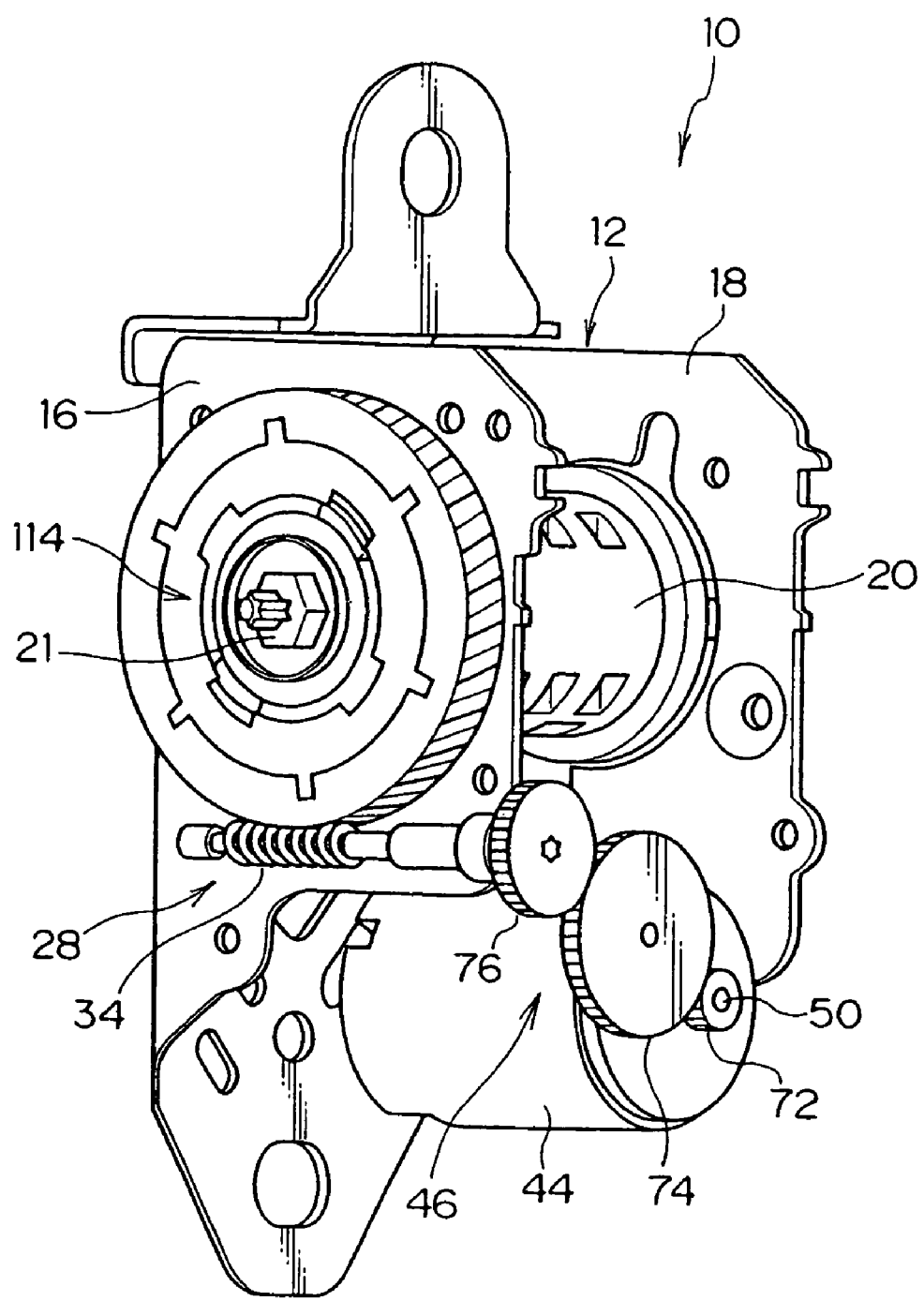
[FIG. 10] A perspective view showing the configuration of relevant portions of the webbing take-up device pertaining to the embodiment of the present invention.
Figure 11:
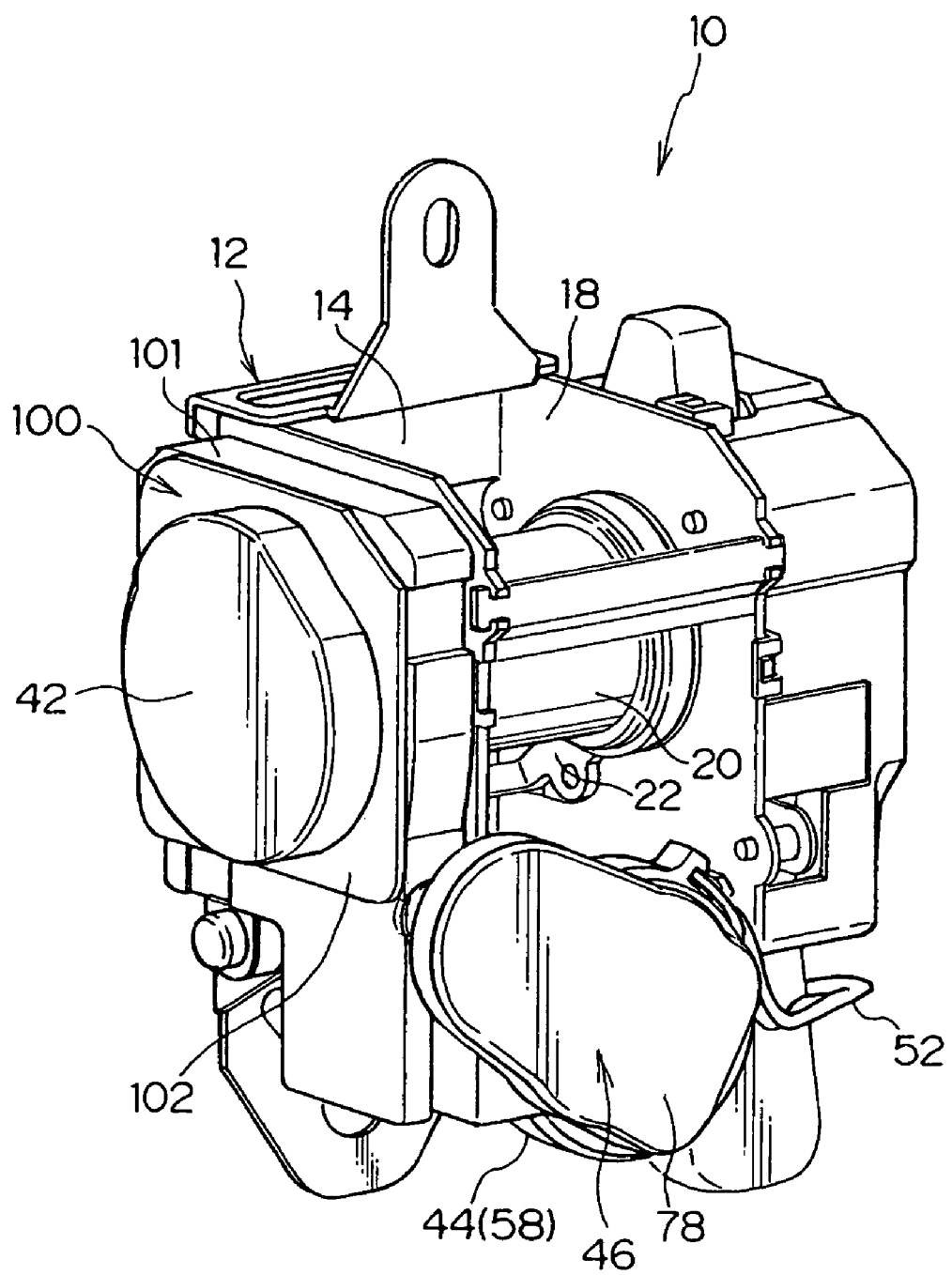
[FIG. 11] A perspective view showing the overall configuration of the webbing take-up device pertaining to the embodiment of the present invention.

In FIG. 11, the overall configuration of a webbing take-up device 10 pertaining to a first embodiment of the present invention is shown in perspective view. Further, in FIG. 10, the configuration of relevant portions of the webbing take-up device 10 is shown in perspective view. Moreover, in FIG. 9, the overall configuration of the webbing take-up device 10 is shown in exploded perspective view.

The webbing take-up device 10 is disposed with a frame 12. The frame 12 is configured by a substantially plate-like back plate 14 and a pair of a leg plate 16 and a leg plate 18 that extend integrally from both width-direction ends of the back plate 14. The frame 12 is attached to a vehicle body as a result of the back plate 14 being fixed to the vehicle body by unillustrated fastening means such as a bolt.

A take-up shaft 20 manufactured by die-casting or the like is rotatably disposed between the pair of the leg plate 16 and the leg plate 18 of the frame 12. The take-up shaft 20 has a drum-like shape overall, and a proximal end portion of a webbing (not shown) formed in a long band-like shape is coupled and fixed to the take-up shaft 20. When the take-up shaft 20 is rotated in one direction about its axial line (below, this direction will be called "the take-up direction"), the webbing is taken up in layers on the outer peripheral portion of the take-up shaft 20 from its proximal end side, and when the webbing is pulled out from its distal end side, the webbing is pulled out while the take-up shaft 20 rotates in the other direction about its axial line in accompaniment therewith (below, the rotational direction of the take-up shaft 20 when the webbing is pulled out will be called "the pullout direction").

One end side of the take-up shaft 20 penetrates the leg plate 18 and protrudes outward of the frame 12. An unillustrated lock mechanism is disposed on the side of the leg plate 18. The lock mechanism is configured to include an acceleration sensor and is linked to a lock plate 22 that spans the distance between the leg plate 16 and the leg plate 18 and to a torsion bar 24 that is disposed in the axial center portion of the take-up shaft 20. When the vehicle suddenly decelerates or the like, one end of the torsion bar 24 is restrained via the lock plate 22 by the actuation of the lock mechanism so that energy absorption is performed and the rotation of the take-up shaft 20 in the pullout direction is deterred.

The other end side of the take-up shaft 20 penetrates the leg plate 16 and protrudes slightly outward of the frame 12. A coupling screw 21 formed in a hexagonal column shape is coaxially and integrally coupled to the other end side of the take-up shaft 20.

Further, a clutch case 101 serving as a case configuring a clutch 100 pertaining to the present embodiment is disposed on the outer side of the leg plate 16. The clutch case 101 is formed in a box-like shape by a metal material or the like (e.g., an aluminum alloy, etc.) and opens toward the side opposite of the leg plate 16. A cover clutch 102 comprising an iron plate or the like and serving as a case is disposed on the open side of the clutch case 101. The clutch case 101 and the cover clutch 102 are integrally fixed to the leg piece 16 by a screw 291.

A circular through hole 106 is formed coaxially with the take-up shaft 20 in the center portion of the bottom wall of the clutch case 101, and the coupling screw 21 passes through the through hole 106. Further, the site in the vicinity of the through hole 106 protrudes slightly in a circular fashion toward the side opposite of the leg piece 16, and a ring-like sliding surface 108 is formed. Moreover, a circular cylindrical bushing support portion 110 that protrudes toward the side opposite of the leg piece 16 is formed in the hole edge portion of the through hole 106. A bushing 112 (see FIG. 1 and FIG. 2) formed in a ring-like shape by a resin material or the like is supported on the bushing support portion 110.

A clutch gear portion 28 is disposed inside the clutch case 101. The clutch gear portion 28 is disposed with a worm gear 34. The axis of the worm gear 34 is disposed in a state where it is perpendicular to the take-up shaft 20, end portions of the worm gear 34 are supported on the clutch case 101 via bushes 36 and 37, and one end side of the worm gear 34 is disposed protruding outward from the clutch case 101. Further, a steel ball 38 is housed in a bearing portion of the clutch case 101 that supports the distal end portion of the worm gear 34, the steel ball 38 contacts the distal end portion of the worm gear 34, and an adjust screw 40 is screwed into the bearing portion. The adjust screw 40 pushes the steel ball 38 at its distal end portion to cause the steel ball 38 to be pressed against the distal end of the worm gear 34. Thus, displacement in the axial direction of the worm gear 34 is regulated (thrust-adjusted). It will be noted that the steel ball 38 may also be configured such that it is formed integrally on the distal end portion of the adjust screw 40 (such that the distal end portion of the adjust screw 40 is formed in a spherical shape). A clutch body portion 114 that configures the clutch 100 pertaining to the present embodiment is disposed above the worm gear 34.

Figure 1:
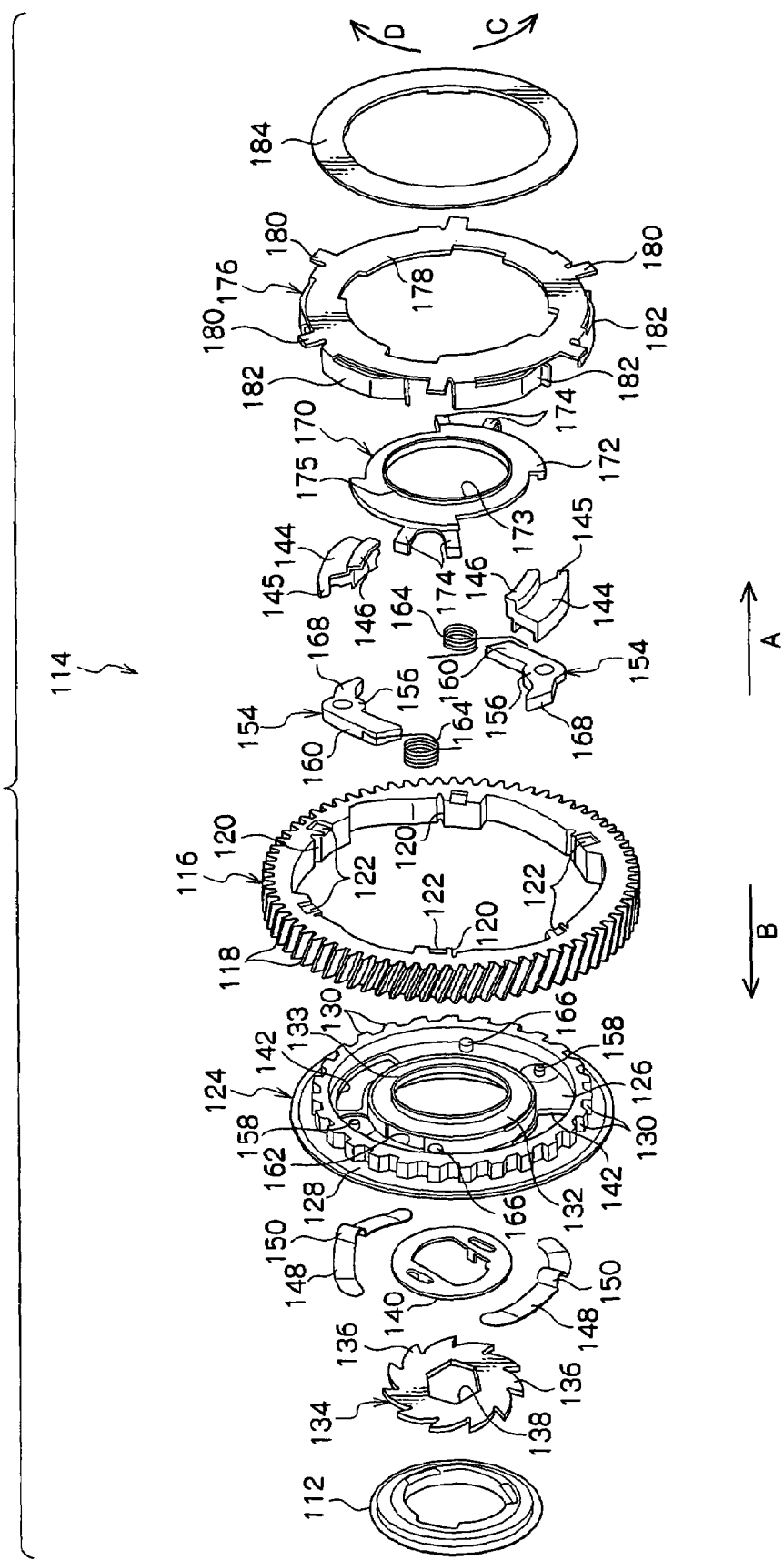
[FIG. 1] An exploded perspective view showing the configuration of relevant portions of a clutch that is a configural member of a webbing take-up device pertaining to an embodiment of the present invention.
Figure 2:
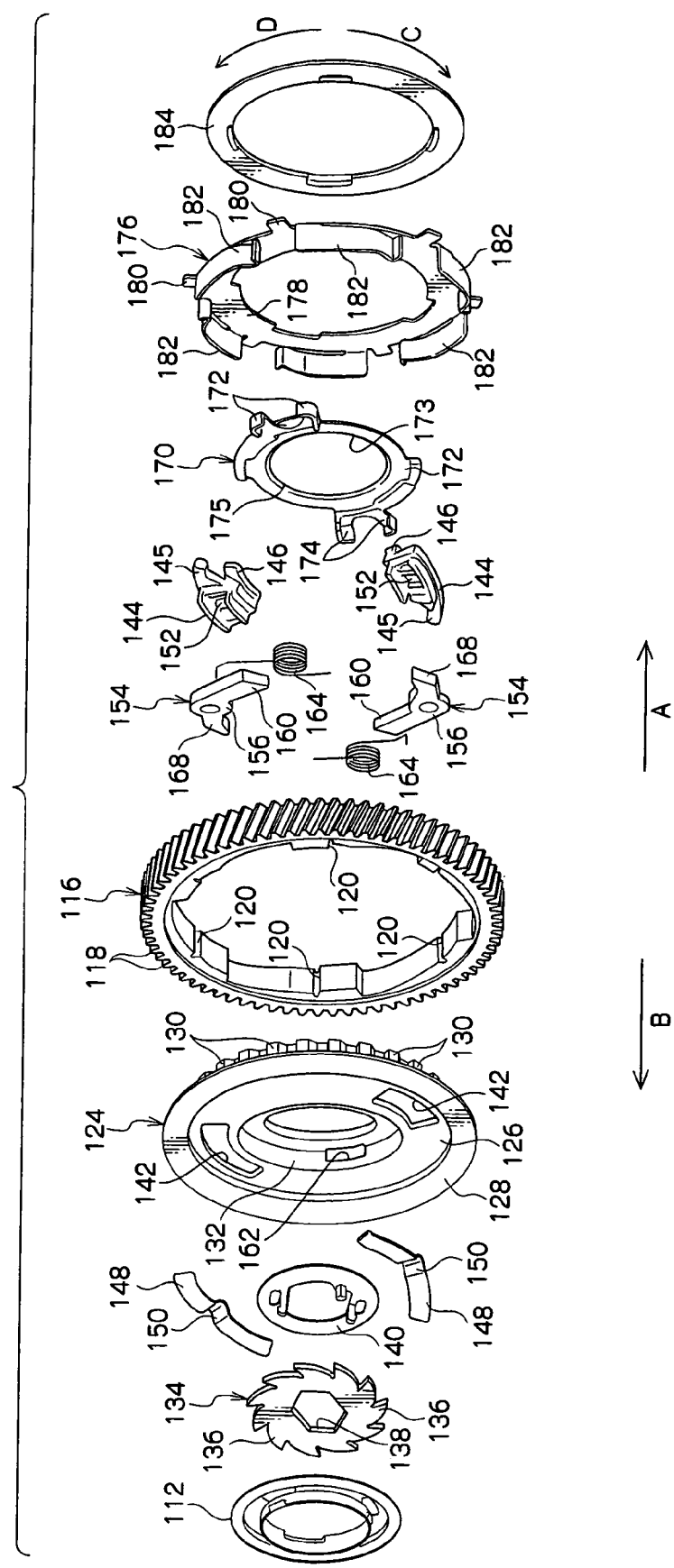
[FIG. 2] An exploded perspective view showing the configuration of relevant portions of the clutch that is a configural member of the webbing take-up device pertaining to the embodiment of the present invention.

Here, in FIG. 1 and FIG. 2, the configuration of the clutch body portion 114 is shown in exploded perspective view.

As shown in these drawings, the clutch body portion 114 is disposed with a gear wheel 116. The gear wheel 116 is formed in a ring-like shape by a resin material or the like, is disposed coaxially with the take-up shaft 20, and worm wheel teeth 118 are formed on the outer peripheral portion of the gear wheel 116. The worm wheel teeth 118 mesh with the above-mentioned worm gear 34. Further, plural (six in the present embodiment) circumferential-direction load receiving portions 120 are formed on the inner peripheral portion of the gear wheel 116 at constant intervals along the radial direction of the gear wheel 116. The circumferential-direction load receiving portions 120 correspond to later-described spring pawls 182 of a ring 176. Moreover, plural (six in the present embodiment) baffle concave portions 122 are formed on the end surface of one axial-line direction side (the side in the direction of arrow A in FIG. 1 and FIG. 2) of the gear wheel 116 at constant intervals along the circumferential direction of the gear wheel 116. The baffle concave portions 122 correspond to later-described baffle pawls 180 of the ring 176.

A rotor 124 formed in a discoid shape by a metal material or the like (e.g., zinc aluminum alloy, etc.) is disposed coaxially with the gear wheel 116 inside the gear wheel 116. The rotor 124 includes a bottomed circular cylindrical body portion 126 and a flange portion 128 that protrudes in the radial direction at one axial-line direction side (the side in the direction of arrow B in FIG. 1 and FIG. 2) of the body portion 126.

Plural outer teeth 130 are formed on the outer peripheral portion of the body portion 126 at equidistant intervals along the circumferential direction of the body portion 126. Side walls of the outer teeth 130 on one side (the side in the direction of arrow C in FIG. 1 and FIG. 2) along the circumferential direction of the body portion 126 slant with respect to the circumferential direction of the body portion 126, and side walls of the outer teeth 130 on the other side (the side in the direction of arrow D in FIG. 1 and FIG. 2) along the circumferential direction of the body portion 126 are formed parallel along the radial direction of the body portion 126 (in other words, the cross-sectional shapes of the outer teeth 130 are trapezoidal). The outer teeth 130 correspond to the later-described spring pawls 182 of the ring 176.

A substantially circular cylindrical housing portion 132 is formed coaxially in the center portion of the bottom wall of the body portion 126. A ring-like support shaft portion 133 protrudes coaxially on one axial-line direction side (the side in the direction of arrow A in FIG. 1 and FIG. 2) of the housing portion 132. The support shaft portion 133 is supported in a circular hole 135 formed in the cover clutch 102 such that the support shaft portion 133 can freely rotate via a later-described rotation support portion 175 of a holder 170. Further, the previously mentioned bushing 112 is fitted, such that it can freely rotate, in the other axial-line direction side (the side in the direction of arrow B in FIG. 1 and FIG. 2), and the other axial-line direction side of the housing portion 132 is supported, such that it can freely rotate, on the clutch case 101 via the bushing 112. Thus, the body portion 126 (the rotor 126) is configured to be rotatable about its own axial line.

A ratchet 134 formed in a substantially ring-like shape by a steel plate or the like is housed inside the housing portion 132 of the body portion 126. Outer teeth 136 that are ratchet teeth are formed on the outer peripheral portion of the ratchet 134. Further, a through hole (coupling hole) 138 that has a cross-sectionally hexagonal shape is formed in the axial center portion of the ratchet 134, and the previously mentioned coupling screw 21 is integrally (such that relative rotation is impossible) coupled to the ratchet 134 with respect to about its axial line in a state where the coupling screw 21 has been passed through the through hole 138. Thus, the ratchet 134 and the take-up shaft 20 are configured to rotate integrally via the coupling screw 21.

It will be noted that one axial-line direction side (the side in the direction of arrow B in FIG. 1 and FIG. 2) of the ratchet 134 slidably abuts against the previously mentioned bushing 112. Further, a washer 140 comprising a resin material or the like is attached to the other axial-line direction end (the side in the direction of arrow A in FIG. 1 and FIG. 2) of the ratchet 134. The washer 140 slidably abuts against the ring-like bottom wall of the housing portion 132, so that displacement along the axial line direction of the ratchet 138 is regulated.

A pair of guide holes 142 that are curved along the circumferential direction of the body portion 126 is formed in the bottom wall of the body portion 126 at the radial-direction outer side of the housing portion 132. Sliders 144 that are formed by a resin material or the like in substantially block-like shapes and are curved along the circumferential direction of the body portion 126 are slidably attached to the guide holes 142. The pair of sliders 144 is retained (guided) by the inner peripheral surface of the body portion 126 and by the outer peripheral surface of the housing portion 132 and is configured to be relatively movable with respect to the body portion 126 (the rotor 124) within a predetermined range along the guide holes 142.

Figure 3:
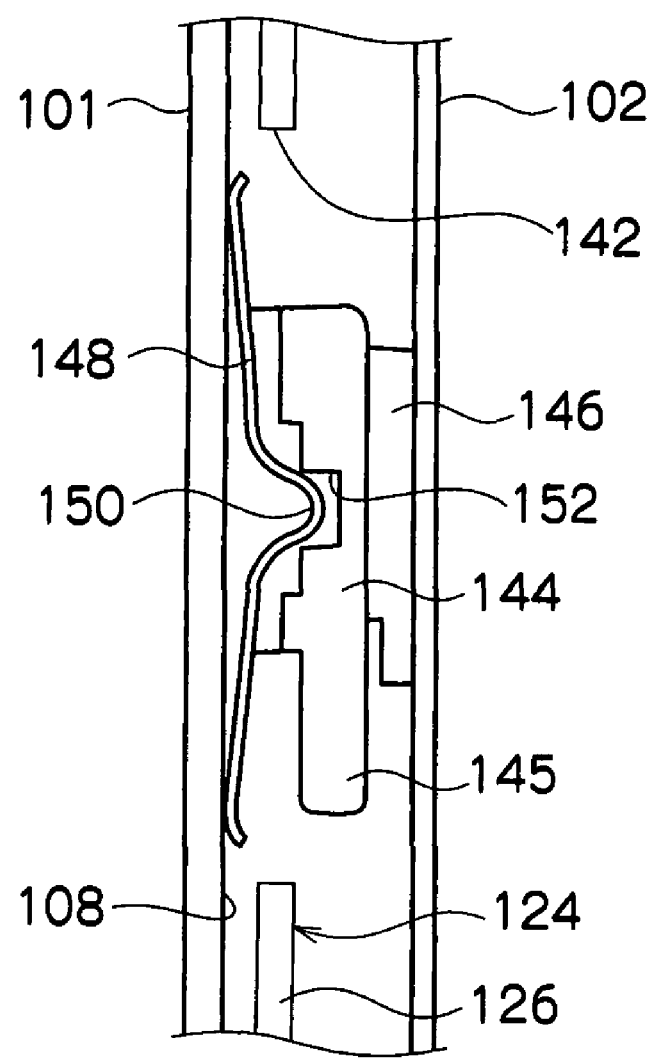
[FIG. 3] A cross-sectional view showing the partial configuration of the clutch that is a configural member of the webbing take-up device pertaining to the embodiment of the present invention.

Sliding pieces 146 protrude from one side (the side in the direction of arrow A in FIG. 1 and FIG. 2) of the sliders 144 and, as shown in FIG. 3, abut against the cover clutch 102. Further, retainers 148 are disposed on the side of the sliders 144 opposite of the sliding pieces 146. The retainers 148 are narrow metal pieces having elasticity and are bent in substantial "<" shapes. The retainers 148 are integrally coupled to the sliders 144 as a result of coupling portions 150 disposed in longitudinal-direction center portions of the retainers 148 being fitted into coupling holes 152 formed in the sliders 144, and are elastically deformed a predetermined amount as a result of both longitudinal-direction end portions of the retainers 148 being pushed against the previously mentioned sliding surface 108 of the clutch case 101.

For this reason, the sliding pieces 146 of the sliders 144 are pushed against the cover clutch 102 by the elastic force of the retainers 148, and predetermined frictional force is imparted to the movement (relative movement with respect to the rotor 124) of the sliders 144 along the guide holes 142. For this reason, when the rotor 124 rotates, the sliders 144 are retained in the case (the clutch case 101 and the cover clutch 102) temporarily by the frictional force acting on both longitudinal-direction end portions of the retainers 148 and the sliding pieces 146 and relatively move within a predetermined range along the guide holes 142 with respect to the rotor 124.

Further, a push retention piece 145 is formed on one curve-direction end portion (the end portions at the side in the direction of arrow C in FIG. 1 and FIG. 2) of each of the sliders 144. The push retention pieces 145 correspond to a pair of lock bars 154.

Each of the lock bars 154 is formed in a substantial "<" shape by a steel plate or the like, is disposed on one curve-direction end side of each of the sliders 144, and is disposed with a ring-like bearing portion 156. The bearing portions 156 are supported, such that they can freely rotate, by circular columnar support shafts 158 that protrude from the bottom wall of the body portion 126. A coupling piece 160 protrudes on the side (the side in the direction of arrow C in FIG. 1 and FIG. 2) of each of the bearing portions 156 opposite from the sliders 144. The coupling pieces 160 rotate about the support shafts 158 together with the bearing portions 156, whereby the distal end portions of the coupling pieces 160 penetrate hole portions 162 formed in the housing portion 132 of the rotor 124 and mesh with the previously mentioned outer teeth 136 of the ratchet 134. Further, the coupling pieces 160 are always biased in the direction in which they mesh with the outer teeth 136 (the ratchet 134) by the biasing force of torsion coil springs 164. It will be noted that the torsion coil springs 164 are supported by circular columnar support shafts 166 that protrude from the bottom wall of the body portion 126 of the rotor 124.

Release pieces 168 that correspond to the previously mentioned push retention pieces 145 protrude from the sliders 144 side (the side in the direction of arrow D in FIG. 1 and FIG. 2) of the bearing portions 156. The end portions of the release pieces 168 facing the sliders 144 are formed as slanted surfaces that are slanted with respect to the moving direction of the sliders 144 (the direction of arrow C and the direction of arrow D in FIG. 1 and FIG. 2).

Figure 4A:
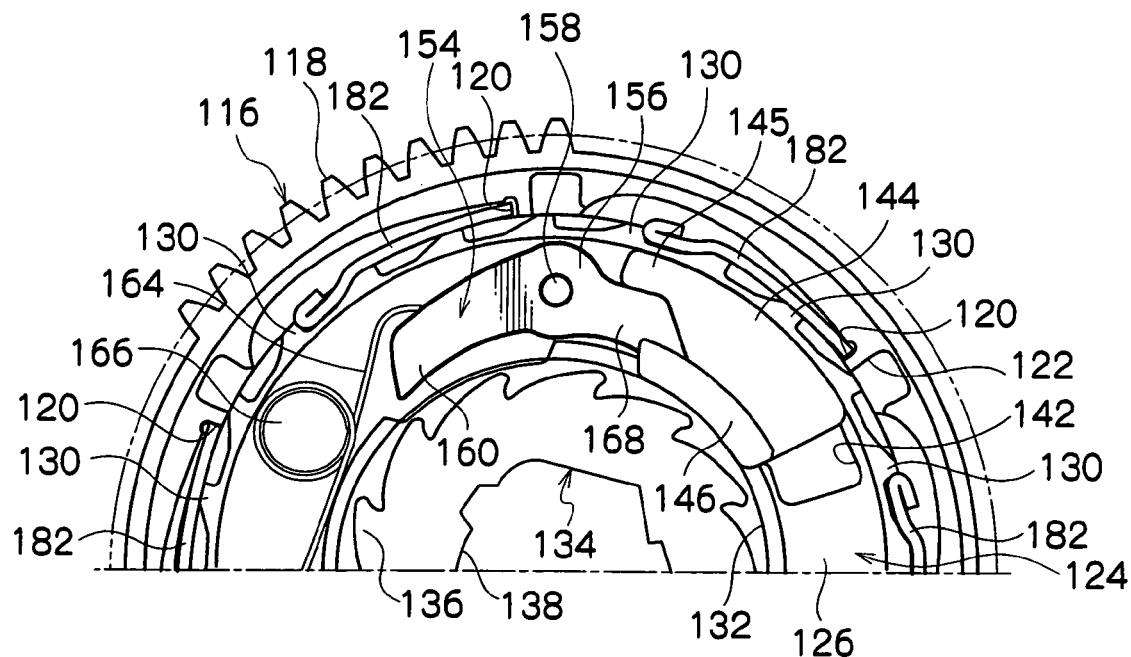
[FIG. 4A] A side view showing a state where lock bars are retained in sliders in the configuration of the clutch of the webbing take-up device pertaining to the embodiment of the present invention.
Figure 4B:
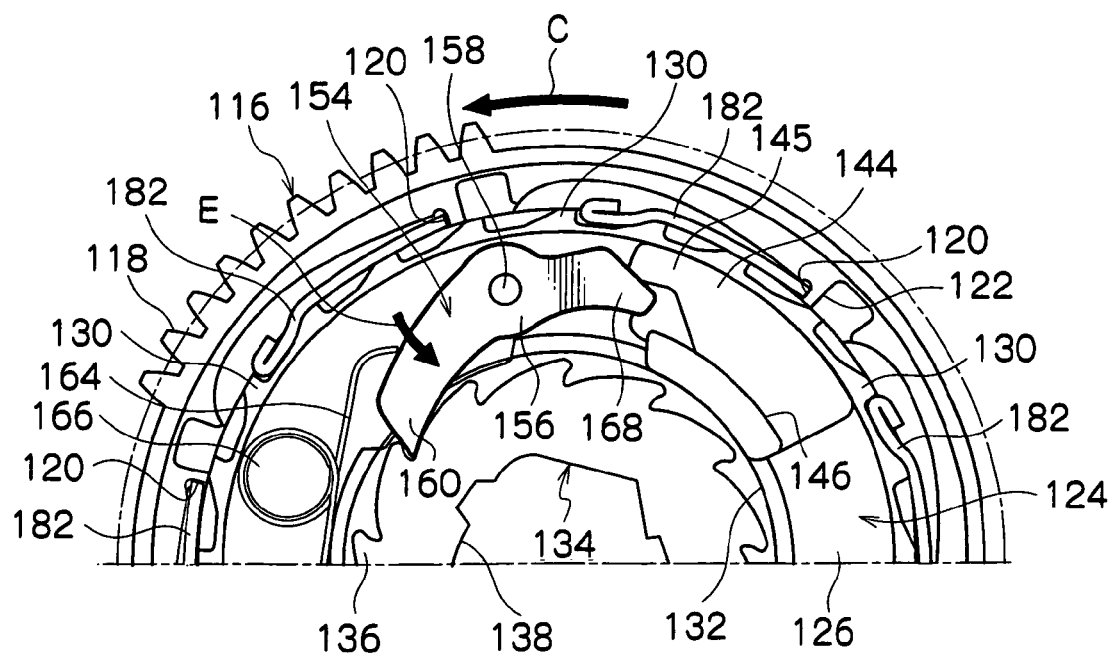
[FIG. 4B] A side view showing a state where the lock bars are engaged with a ratchet in the configuration of the clutch of the webbing take-up device pertaining to the embodiment of the present invention.

Here, as shown in FIG. 4A and FIG. 4B, when the rotor 124 relatively moves with respect to the sliders 144, the lock bars 154 move within a predetermined range toward and away from the sliders 144, and in a state where the lock bars 154 are close to the sliders 144 (the state shown in FIG. 4A), the release pieces 168 of the lock bars 154 enter the inner sides (ratchet 134 sides) of the push retention pieces 145 of the sliders 144, whereby the release pieces 168 are retained in disengaged positions counter to the biasing force of the torsion coil springs 164. In this state, the coupling pieces 160 of the lock bars 154 move away from the ratchet 134.

On the other hand, in a state where the lock bars 154 have moved away from the sliders 144 (the state shown in FIG. 4B), the release pieces 168 of the lock bars 154 release the retention by the push retention pieces 145 of the sliders 144. In this state, the coupling pieces 160 of the lock bars 154 are moved toward the ratchet 134 (engagement positions) by the biasing force of the torsion coil springs 164, and the distal end portions of the coupling pieces 160 mesh with the outer teeth 136.

It will be noted that, in the clutch body portion 114 pertaining to the present embodiment, the sliders 144 are ordinarily disposed close to the lock bars 154. Consequently, the lock bars 154 are ordinarily retained in the disengaged positions (the state shown in FIG. 4A) as a result of the release pieces 168 being retained by the push retention pieces 145 of the sliders 144.

A holder 170 formed in a ring-like shape by a resin material or the like is disposed at the side (the side in the direction of arrow A in FIG. 1 and FIG. 2) opposite from the rotor 124 via the lock bars 154. The holder 170 is disposed with a ring-like body portion 172 and a pair of retention pawls 174 disposed on the outer peripheral portion of the body portion 172. The body portion 172 regulates displacement of the lock bars 154 in the axial line direction with respect to the support shafts 158 (the rotor 124), and the pair of retention pawls 174 regulate displacement of the torsion coil springs 164 in the axial line direction with respect to the support shafts 166 (the rotor 124).

Further, the support shaft portion 133 of the rotor 124 penetrates a circular hole 173 formed in the center portion of the body portion 172. A rotation support portion 175 that protrudes slightly in a circular cylindrical shape toward the side opposite from the rotor 124 (toward the cover clutch 102) is disposed on the hole edge portion of the circular hole 173, and the support shaft portion 133 of the rotor 124 is supported, such that it can freely rotate, in the circular hole 135 of the cover clutch 102.

A ring 176 comprising a metal material (e.g., SUS, etc.) having elasticity is disposed at the radial-direction outer side of the holder 170 and on one axial-line direction side (the side in the direction of arrow A of FIG. 1 and FIG. 2) of the rotor 124. The ring 176 is disposed with a cover portion 178 formed in a ring shape. Plural (six in the present embodiment) baffle pawls 180 that protrude outward in the radial direction of the cover portion 178 are integrally formed on the outer peripheral portion of the cover portion 178. The baffle pawls 180 fit into the previously mentioned baffle concave portions 122 of the gear wheel 116. Thus, the ring 176 is integrally coupled to the gear wheel 116 in the circumferential direction of the gear wheel 116.

Moreover, plural (six in the present embodiment) spring pawls 182 that are formed in narrow plate shapes having elasticity (spring-ness) are integrally formed on the outer peripheral portion of the cover portion 178 at constant intervals along the circumferential direction of the cover portion 178. The proximal end portions of the spring pawls 182 are integrally connected to the cover portion 178, the longitudinal-direction intermediate portions of the spring pawls 182 are bent slightly toward the radial-direction inner side of the cover portion 178, and the distal end portions of the spring pawls 182 are bent toward the radial-direction outer side of the cover portion 178, so that, overall, the spring pawls 182 curve along the circumferential direction of the cover portion 178.

Figure 5A:
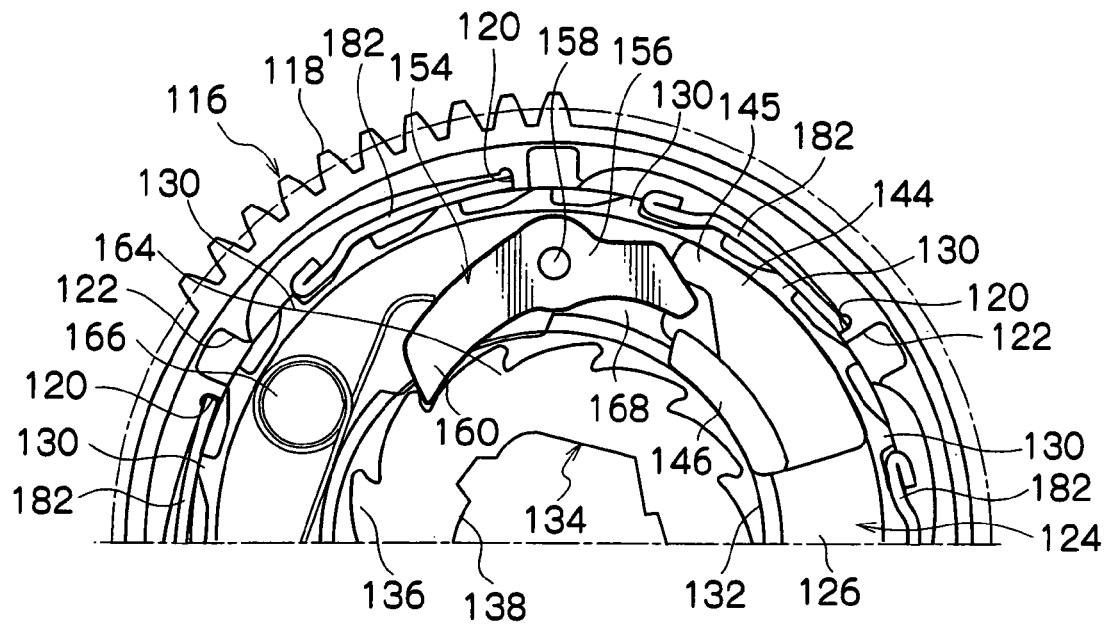
[FIG. 5A] A side view showing a state where a gear wheel and a rotor are coupled together by spring pawls in the configuration of the clutch of the webbing take-up device pertaining to the embodiment of the present invention.

As shown in FIG. 5A, the spring pawls 182 are disposed along the circumferential direction of the rotor 124 and the gear wheel 116 between the outer teeth 130 of the rotor 124 and the inner peripheral surface of the gear wheel 116, and the inner side portions of the spring pawls 182 are pushed against the outer teeth 130 of the rotor 124 by the elastic force of the spring pawls 182. Thus, the ring 176 is integrally retained on the rotor 124.

Further, the outer side portions of the spring pawls 182 are engaged with the inner peripheral surface of the gear wheel 116, and the gear wheel 116 is supported on the rotor 124 via the spring pawls 182. In this state, the movement of the gear wheel 116 in the axial line direction is regulated by the baffle pawls 180 of the ring 176 and the flange portion 128 of the rotor 124. Moreover, in this state, the sliders 144, the lock bars 154, the torsion coil springs 164, and the holder 170 are prevented from coming off the rotor 124 by the cover portion 178 of the ring 176, and these configural members are retained in predetermined installation positions.

Moreover, the distal end portions of the spring pawls 182 enter the valley portions between the outer teeth 130 and abut against one side wall of the outer teeth 130 (side walls at the sides formed parallel along the radial direction of the body portion 126), and the proximal end portions of the spring pawls 182 abut against the previously mentioned circumferential-direction load receiving portions 120 of the gear wheel 116. Thus, the gear wheel 116 and the rotor 124 are integrally coupled together (their relative rotation is regulated) by the spring pawls 182 with respect to their circumferential direction, and when the gear wheel 116 rotates, the gear wheel 116 and the rotor 124 basically integrally rotate.

In this case, the rotational force of the gear wheel 116 in the take-up direction is transmitted to the proximal end portions of the spring pawls 182 via the circumferential-direction load receiving portions 120 and is transmitted to the outer teeth 130 of the rotor 124 from the distal end portions of the spring pawls 182, such that the gear wheel 116 receives along the circumferential direction the load acting thereon from the spring pawls 182 via the circumferential-direction load receiving portions 120 (the direction in which the gear wheel 116 receives the load from the spring pawls 182 is set along the rotational direction thereof).

Figure 5B:
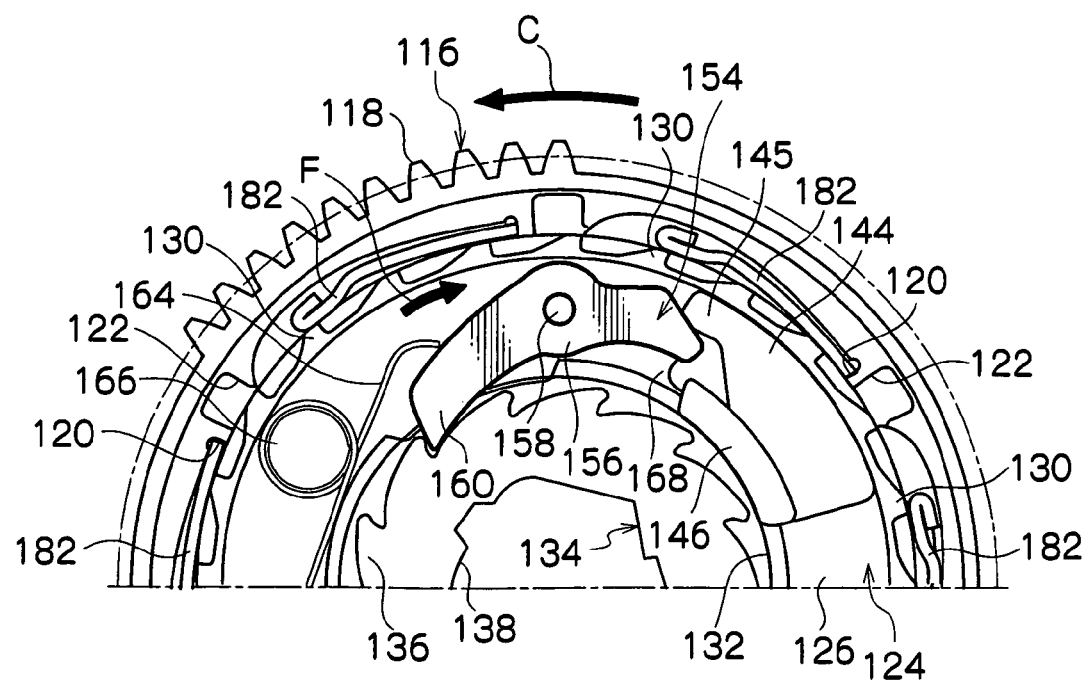
[FIG. 5B] A side view showing a state where the gear wheel and the rotor are relatively idling in the configuration of the clutch of the webbing take-up device pertaining to the embodiment of the present invention.

Moreover, in this case, because the spring pawls 182 are metal pieces having elasticity, the coupling about the axial line between the gear wheel 116 and the rotor 124 by the spring pawls 182 is released as long as the rotational force arising due to the relative rotation of the gear wheel 116 with respect to the rotor 124 is of a size sufficient for causing the distal end portions of the spring pawls 182 to escape from the valley portions between the outer teeth 130 counter to the spring force (biasing force) of the spring pawls 182, and for this reason, relative rotation between the gear wheel 116 and the rotor 124 becomes possible (see FIG. 5B).

Further, the rotational force of the gear wheel 116 in the pullout direction is transmitted to the baffle pawls 180 of the ring 176 via the baffle concave portions 122 and is transmitted from the distal end portions of the spring pawls 182 of the ring 176 to the outer teeth 130 of the rotor 124.

A spacer 184 formed in a ring shape by a resin material or the like is disposed on the side of the ring 176 opposite from the rotor 124 (the side in the direction of arrow A in FIG. 1 and FIG. 2). The spacer 184 is sandwiched between the ring 176 and the cover clutch 102 and is configured such that relative rotation is impossible with respect to the ring 176 about the axial line thereof. The spacer 184 prevents the metal ring 176 from directly sliding against the cover clutch 102 and ensures that the relative rotation of the ring 176 (the clutch body portion 114) with respect to the cover clutch 102 is smooth.

The clutch 100 having the above-described configuration is configured such that the gear wheel 116 of the clutch body portion 114 rotates when the worm gear 34 of the clutch gear portion 28 rotates, and the clutch body portion 114 and the clutch gear portion 28 are integrally assembled into a single case (the clutch case 101 and the cover clutch 102), so that, overall, the clutch 100 is unitized.

Figure 9:
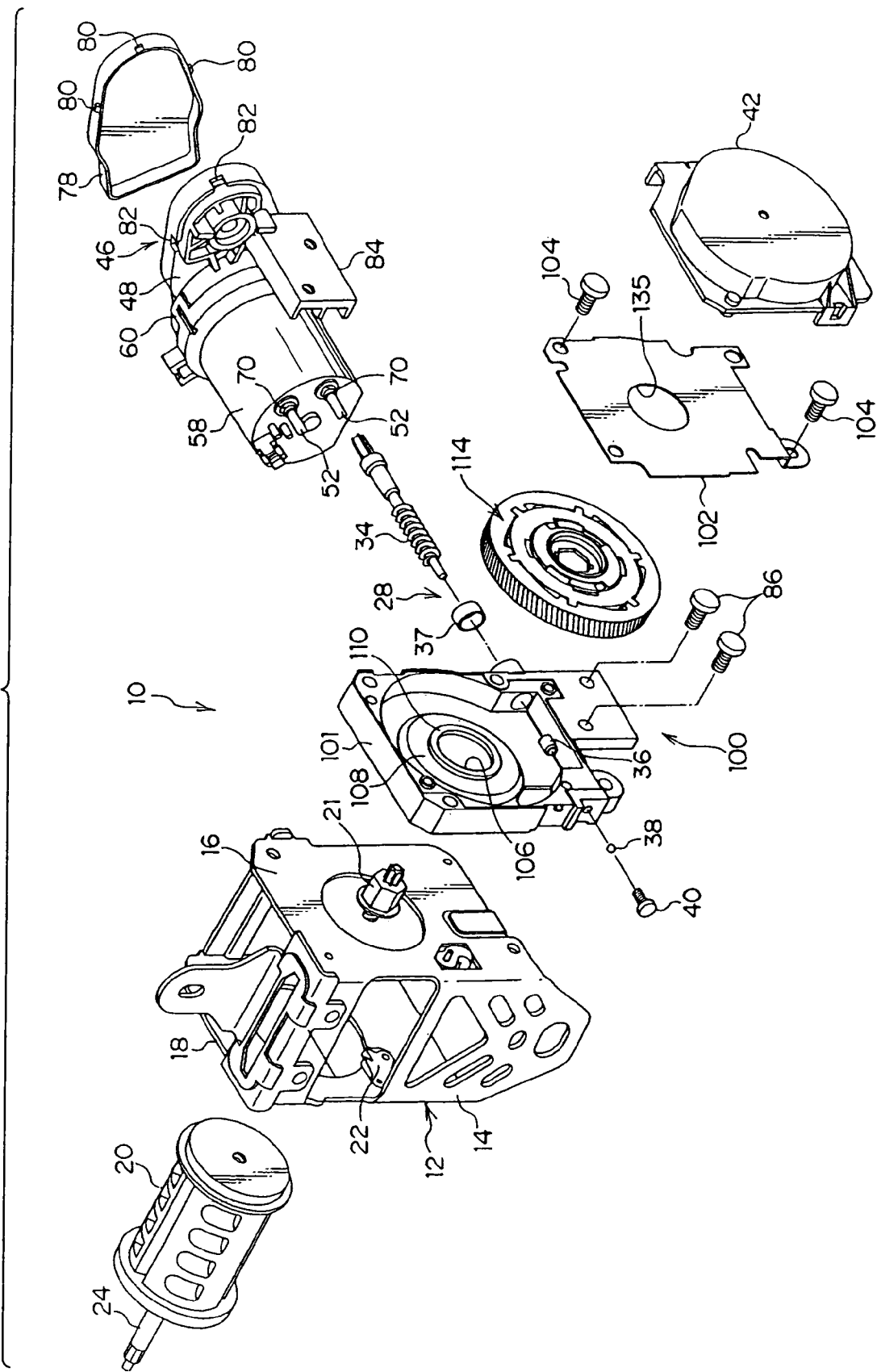
[FIG. 9] An exploded perspective view showing the overall configuration of the webbing take-up device pertaining to the embodiment of the present invention.

As shown in FIG. 9, a spring complete 42 is disposed on the side of the cover clutch 102. The spring complete 42 houses a spiral spring (not shown) inside. The end portion of the spiral spring at the outer side in the spiral direction is latched to the case body, and the end portion of the spiral spring at the inner side in the spiral direction is latched to the distal end of the coupling screw 21 penetrating the clutch body portion 114, and the spiral spring biases the take-up shaft 20 in the take-up direction.

Further, a motor 44 and a motor gear portion 46 are disposed below the take-up shaft 20 between the leg plate 16 and the leg plate 18.

Figure 8:
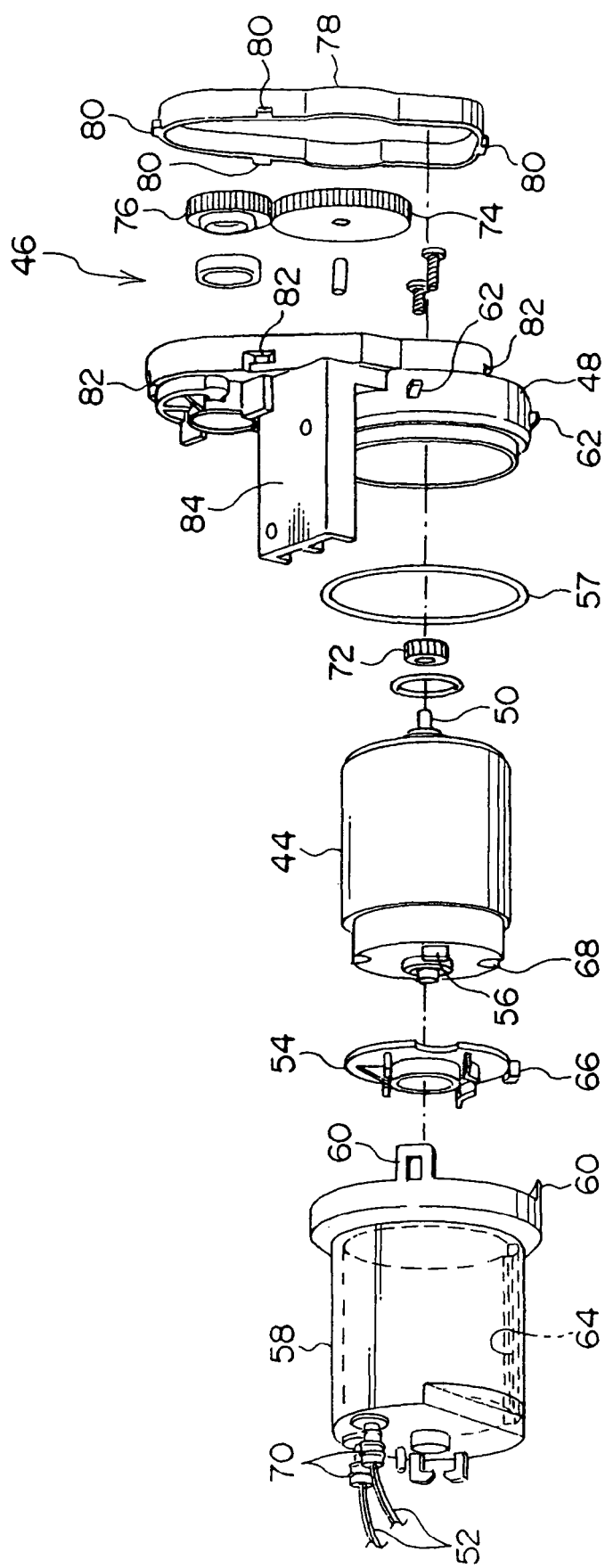
[FIG. 8] An exploded perspective view showing the configuration of peripheral members including a motor that is a configural member of the webbing take-up device pertaining to the embodiment of the present invention.

Here, in FIG. 8, the configurations of the motor 44 and the motor gear portion 46 are shown in perspective view.

The motor 44 and the motor gear portion 46 are disposed with a housing 48. The motor 44 is disposed on one side of the housing 48, and the motor gear portion 46 is disposed on the other side of the housing 48. The motor 44 is fixed to the one side of the housing 48 in a state where the distal end side (the output side) of a rotating shaft 50 faces the housing 48, and the distal end (the output side) of the rotating shaft 50 protrudes toward the other side of the housing 48 (the side of the motor gear portion 46). Further, a base plate 54, to which an electrical harness 52 for driving the motor is connected, is attached to the trailing end side of the motor 44. The electrical harness 52 is connected to the base plate 54, and the connected portion of the electrical harness 52 is connected by a crimp-style terminal structure to a power supply terminal 56 disposed on the body portion of the motor 44. It will be noted that the connected portion of the electrical harness 52 and the power supply terminal 56 may also be configured such that they are connected by solder or the like.

Moreover, the motor 44 is covered by a cover motor 58. Pawl portions 60 are disposed on the cover motor 58, and the pawl portions 60 fit together and latch with pawl receiving protrusions 62 disposed on the housing 48, whereby the cover motor 58 is fixed to the housing 48.

Further, here, a first concave portion 64 is disposed in the cover motor 58, and a convex portion 66 that can fit into the first concave portion 64 is disposed on the base plate 54 in correspondence to the first concave portion 64. Moreover, a second concave portion 68 into which the convex portion 66 can fit is disposed on the motor 44 in correspondence to the convex portion 66 of the base plate 54.

That is, the convex portion 66 is fitted into the second concave portion 68 to position the motor 44 with respect to the base plate 54, the convex portion 66 is fitted into the first concave portion 64 to position the base plate 54 with respect to the cover motor 58, and the pawl portions 60 are fitted together and latched with the pawl receiving protrusions 62 to attach and fix the cover motor 58 to the housing 48, whereby the installation position about the axis of the motor 44 with respect to the housing 48 is unambiguously defined.

Moreover, the electrical harness 52 for driving the motor is derived from the trailing end portion of the cover motor 58 facing the back plate 14 of the frame 12 opposite from the output side of the motor 44. Further, the derived portions of the electrical harness 52 of the cover motor 58 are waterproofed by rubber caps 70.

A pinion 72 configuring plural spur teeth of the motor gear portion 46 is attached to the distal end of the rotating shaft 50 of the motor 44 protruding toward the other side of the housing 48 (the side of the motor gear portion 46). Further, a gear 74 and a gear 76, each of which configures drive force transmitting means formed as outer-toothed spur gears, are housed in the motor gear portion 46 in a state where they are meshed with each other. The gear 74 and the gear 76 are disposed in a state where their axes are parallel to the rotating shaft 50 of the motor 44. The gear 74 meshes with the pinion 72, and the gear 76, which serves as a final spur gear, is detachably coupled to the previously mentioned one end portion of the worm gear 34 protruding outward from the clutch case 101 of the clutch gear portion 28. For this reason, when the motor 44 is driven, drive force is transmitted via the pinion 72, the gear 74, and the gear 76, and the worm gear 34 is rotated.

Further, the pinion 72, the gear 74, and the gear 76 are covered by a cover gear 78 attached to the housing 48. Pawl portions 80 are disposed on the cover gear 78, and the pawl portions 80 fit together and hook-and-lock with pawl receiving portions 82 disposed on the housing 48, whereby the cover gear 78 is fixed to the housing 48.

In this manner, the motor 44 and the motor gear portion 46 are both integrally assembled to the single housing 48, so that, overall, they are unitized.

As for the motor 44 and the motor gear portion 46 having the above configuration, an attachment stay 84 integrally disposed on the housing 48 is detachably attached by screws 86 to the clutch case 101 (i.e., the frame 12) housing the clutch body portion 114 and the clutch gear portion 28. In a state where the housing 48 is attached to the clutch case 101 (the frame 12), the rotating shaft 50 of the motor 44 is orthogonal to the take-up shaft 20 and the output side of the motor 44 faces the side of the frame 12 opposite from the back plate 14, and the motor 44 is positioned between the pair of the leg plate 16 and the leg plate 18 and directly below the take-up shaft 20.

Further, here, the motor 44 and the motor gear portion 46 having the previously mentioned configuration are configured such that the gear 76 serving as the final spur gear of the motor gear portion 46 is separably coupled to the clutch 26 and the worm gear 34 of the clutch gear portion 28 and the attachment stay 84 is detachably attached by the screws 86 to the clutch case 101, so that by removing the screws 86 and removing the attachment stay 84 from the clutch case 101, the motor 44 and the motor gear portion 46 can be independently separated from the clutch case 101 (the frame 12) in an assembled state.

Moreover, the motor 44 mentioned above is configured to be actuated on the basis of a detection signal of a forward monitoring device or the like, for example.

Next, the action of the present embodiment will be described.

In the webbing take-up device 10 having the above-described configuration, the sliders 144 of the clutch body portion 114 are ordinarily disposed close to the lock bars 154, as shown in FIG. 4A. Consequently, the release pieces 168 of the lock bars 154 are ordinarily retained by the push retention pieces 145 of the sliders 144, and the coupling pieces 160 of the lock bars 154 are separated from the outer teeth 136 of the ratchet 134. For this reason, the ratchet 134 (the take-up shaft 20) is free to relatively rotate with respect to the rotor 124.

Consequently, when a passenger is seated in the seat of the vehicle and pulls out the webbing stored in the webbing take-up device 10, the webbing is pulled out while the take-up shaft 20 rotates in the pullout direction. Thus, the passenger places the webbing around his/her body and causes a tongue plate disposed on the webbing, for example, to engage with a buckle device, whereby the passenger can wear the webbing around his/her body.

When an obstacle is present in front of the vehicle while the vehicle is traveling and the distance between the vehicle and the obstacle (the distance from the vehicle to the obstacle) comes within a predetermined range, the driving of the motor 44 is started and the rotating shaft 50 is suddenly rotated.

When the rotating shaft 50 of the motor 44 is rotated, the rotational force is transmitted to the gear wheel 116 of the clutch body portion 114 via the pinion 72, the gear 74, and the gear 76 of the motor gear portion 46 and the worm gear 34 of the clutch gear portion 28, and the gear wheel 116 is suddenly rotated in the take-up direction. The rotation of the gear wheel 116 in the take-up direction is transmitted to the proximal end portions of the spring pawls 182 of the ring 176 via the circumferential-direction load receiving portions 120 and is transmitted to the outer teeth 130 of the rotor 124 from the distal end portions of the spring pawls 182, and the rotor 124 is suddenly rotated in the take-up direction.

At this time, because the sliders 144 are retained in the case (the clutch case 101 and the cover clutch 102) by frictional force acting on the sliding pieces 146 and the retainers 148, the rotor 124 relatively moves within a predetermined range with respect to the sliders 144, and the lock bars 154 supported on the rotor 124 move away from the sliders 144.

For this reason, the retention of the release pieces 168 by the push retention pieces 145 is released, the coupling pieces 160 of the lock bars 154 are moved toward the ratchet 134 by the biasing force of the torsion coil springs 164, and the distal end portions of the coupling pieces 160 mesh with the outer teeth 136 of the ratchet 134 (see arrow E in FIG. 4B). Thus, the rotation of the rotor 124 in the take-up direction is transmitted to the ratchet 134 via the lock bars 154, and the ratchet 134 is suddenly rotated in the take-up direction. Because the ratchet 134 is integrally coupled to the take-up shaft 20, the take-up shaft 20 is suddenly rotated in the take-up direction together with the ratchet 134.

Thus, the webbing is taken up on the take-up shaft 20, slight looseness of the webbing known as "slack" is eliminated and the restraining force of the webbing with respect to the body of the passenger is improved, so that even if the passenger thereafter performs the operation of sudden vehicular braking (sudden braking) and the vehicle suddenly decelerates, the webbing reliably holds the body of the passenger.

Moreover, in a state where the "slack" has been eliminated as described above, the body of the passenger becomes an obstacle, so that basically no more of the webbing becomes able to be taken up on the take-up shaft 20. For this reason, a load equal to or greater than a predetermined value acts on the take-up shaft 20 from the webbing, and as a result, a load equal to or greater than a predetermined value acts on the rotor 124 via the ratchet 134 and the lock bars 154. When a load equal to or greater than a predetermined value acts on the rotor 124, as shown in FIG. 5A and FIG. 5B, the spring pawls 182 become elastically deformed, the distal end portions of the spring pawls 182 escape from the valley portions between the outer teeth 130 of the rotor 124, and relative idling between the gear wheel 116 and the rotor 124 becomes possible (a "load limiter mechanism"; see arrow F in FIG. 5B).

Thus, the take-up shaft 20 coupled to the rotor 124 via the ratchet 134 and the lock bars 154 can be prevented from being rotated in the take-up direction with a force more than necessary by the driving force of the motor 44, and the webbing can be prevented from tightening around the body of the passenger with a force more than necessary.

Figure 6A:
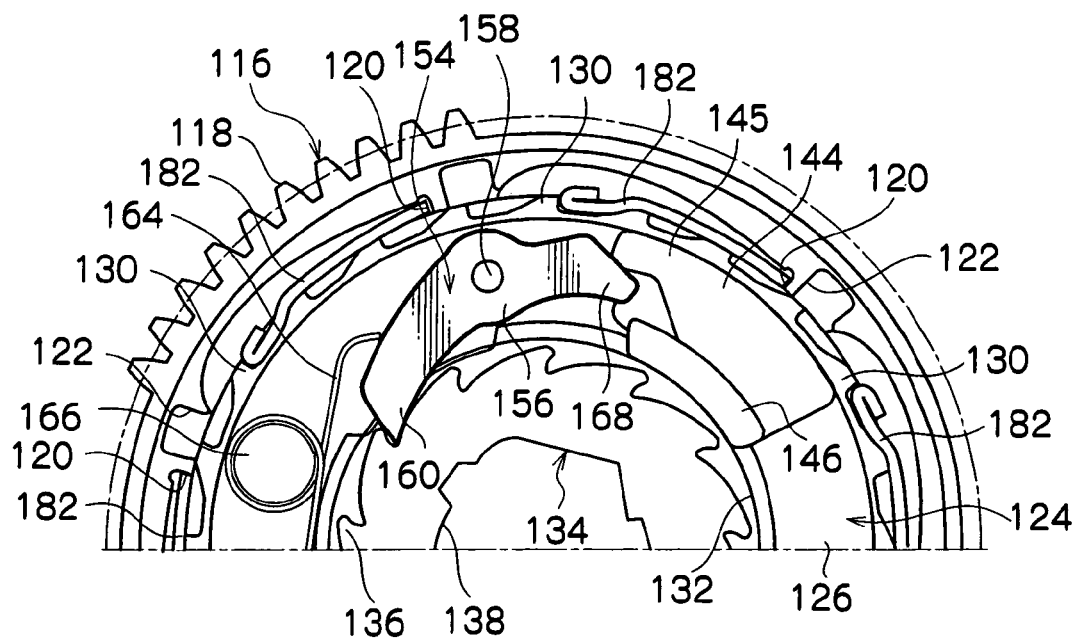
[FIG. 6A] A side view showing a state where the lock bars are engaged with the ratchet in the configuration of the clutch of the webbing take-up device pertaining to the embodiment of the present invention.
Figure 6B:
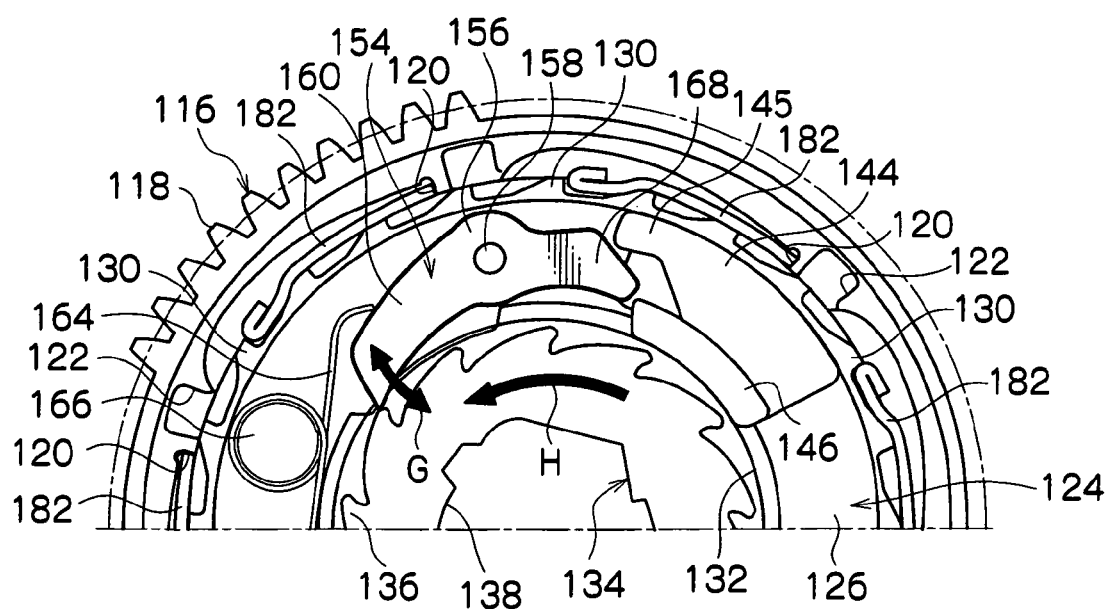
[FIG. 6B] A side view showing a state where the lock bars allow relative rotation of the ratchet with respect to the rotor in a webbing take-up direction in the configuration of the clutch of the webbing take-up device pertaining to the embodiment of the present invention.

Moreover, in this state, because the outer teeth 136 of the ratchet 134 are formed as ratchet teeth, as shown in FIGS. 6A and 6B, when the ratchet 134 (the take-up shaft 20) tries to relatively rotate in the take-up direction with respect to the rotor 124 (see arrow H in FIG. 6B), the lock bars 154 jump over the outer teeth 136 of the ratchet 134 (see arrow G in FIG. 6B) and allow the relative rotation of the ratchet 134 (the take-up shaft 20) in the take-up direction with respect to the rotor 124. Thus, as described above, when, for example, a collision of the vehicle cannot be avoided in a state where the "slack" has been eliminated, it is also possible to cause the take-up shaft 20 to be forcibly rotated in the take-up direction by a separate pretensioner mechanism or the like. In this case, the restraining force of the webbing on the body of the passenger can be further raised, and injury to the passenger in the event of a vehicle collision can be kept to a minimum.

Figure 7A:
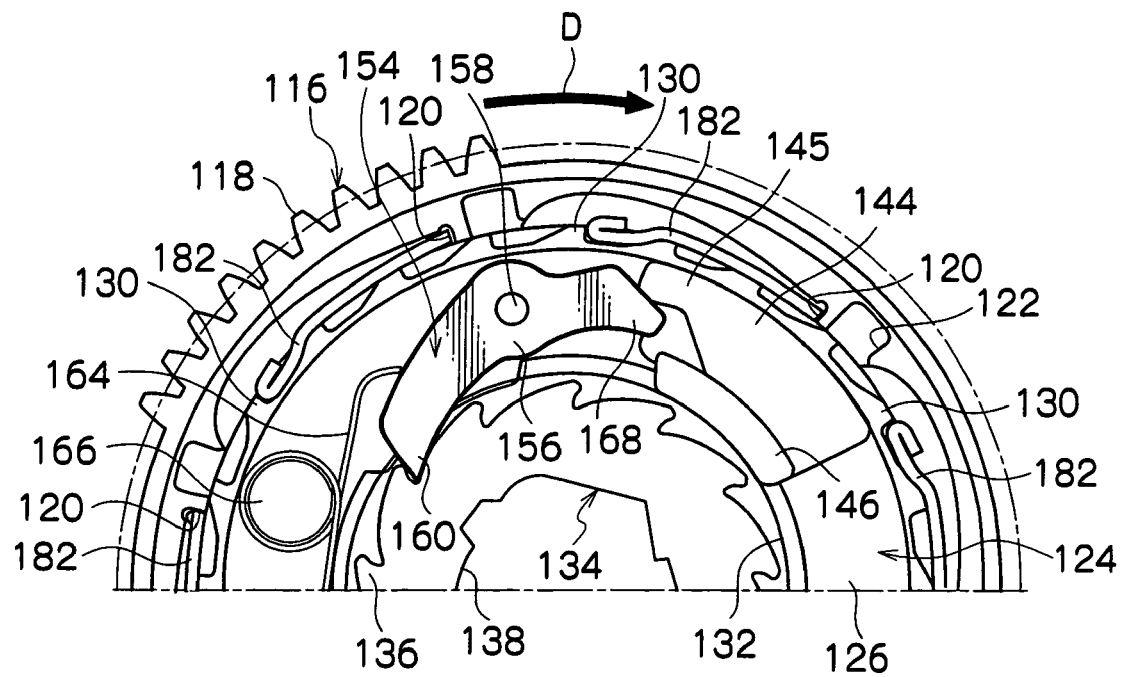
[FIG. 7A] A side view showing a state where the lock bars are engaged with the ratchet in the configuration of the clutch of the webbing take-up device pertaining to the embodiment of the present invention.

When the danger of such a vehicle collision has been avoided, the rotating shaft 50 of the motor 44 is reversely rotated. The rotational force of the rotating shaft 50 is transmitted to the gear wheel 116 of the clutch body portion 114 via the pinion 72, the gear 74, and the gear 76 of the motor gear portion 46 and the worm gear 34 of the clutch gear portion 28, and the gear wheel 116 is suddenly rotated in the pullout direction (see arrow D in FIG. 7A).

The rotation of the gear wheel 116 in the pullout direction is transmitted to the baffle pawls 180 of the ring 176 via the baffle concave portions 122 of the gear wheel 116 and is transmitted to the outer teeth 130 of the rotor 124 from the distal end portions of the spring pawls 182 of the ring 176, and the rotor 124 is suddenly rotated in the pullout direction.

At this time, because the sliders 144 are retained in the case (the clutch case 101 and the cover clutch 102) by frictional force acting on the sliding pieces 146 and the retainers 148, the rotor 124 relatively moves within a predetermined range with respect to the sliders 144, and the lock bars 154 supported on the rotor 124 move toward the sliders 144.

Figure 7B:
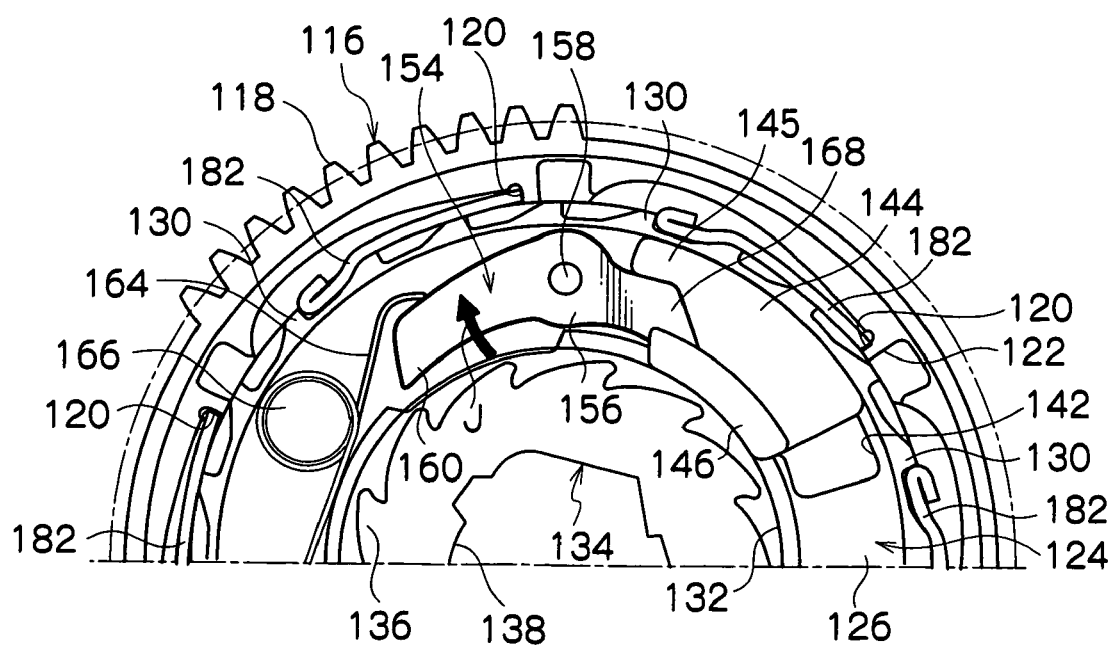
[FIG. 7B] A side view showing a state where the lock bars are retained in the sliders in the configuration of the clutch of the webbing take-up device pertaining to the embodiment of the present invention.

For this reason, the push retention pieces 145 of the sliders 144 push the slanted end surfaces of the release pieces 168 of the lock bars 154, whereby the release pieces 168 are moved toward the ratchet 134 counter to the biasing force of the torsion coil springs 164 (see arrow J in FIG. 7B), and the coupling pieces 160 of the lock bars 154 move away from the outer teeth 136 of the ratchet 134. Moreover, when the lock bars 154 move toward the sliders 144, the release pieces 168 of the lock bars 154 enter the inner sides (toward the ratchet 134) of the push retention pieces 145 of the sliders 144 so that the lock bars 154 are retained in the disengaged positions (the state shown in FIG. 7B). Thus, the rotor 124 and the ratchet 134 again become relatively rotatable so that free rotation of the take-up shaft 20 becomes possible.

Here, the clutch 100 of the webbing take-up device 10 has a simple configuration where, as described above, the sliders 144 of the clutch body portion 114 are caused to be retained in the case (the clutch case 101 and the cover clutch 102) by frictional force, whereby the sliders 144 and the lock bars 154 are caused to relatively move and the lock bars 154 are caused by this relative movement to move to the positions where the lock bars 154 engage with or disengage from the ratchet 134. Consequently, the overall configuration of the clutch 100 can be made significantly compact (in particular, thinned) in comparison to a configuration where a pawl is moved using an inertial disk that is large and has a certain weight as in a conventional clutch. Thus, the overall configuration of the webbing take-up device 10 can be made compact.

Moreover, in the clutch 100 of the webbing take-up device 10, the clutch body portion 114 does not have a configuration where it is supported on the take-up shaft 20 but has a configuration where it is supported on the case (the clutch case 101 and the cover clutch 102). That is, the clutch body portion 114 is supported, such that it can freely rotate, on the case (the clutch case 101 and the cover clutch 102) as a result of the support shaft portion 133 disposed on one axial-line direction side of the housing portion 132 of the rotor 124 being supported, such that it can freely rotate, in the circular hole 135 of the cover clutch 102 via the rotation support portion 175 of the holder 170 and as a result of the other axial-line direction side of the housing portion 132 being supported, such that it can freely rotate, on the clutch case 101 via the bushing 112. Consequently, in the webbing take-up device 10, the take-up shaft 20 can rotate without relation to the clutch body portion 114 at times other than the state where the rotor 124 and the ratchet 134 (the take-up shaft 20) are coupled together by the lock bars 154 (when the vehicle suddenly decelerates, etc.) Thus, smooth rotation of the take-up shaft 20 is assured, and the ease with which the webbing can be pulled out and taken up during ordinary use is improved.

Further, in the clutch 100 of the webbing take-up device 10, the circumferential-direction load receiving portions 120 are disposed on the gear wheel 116 of the clutch body portion 114, and when rotational force in the take-up direction is transmitted from the gear wheel 116 to the rotor 124, the load acting on the gear wheel 116 from the spring pawls 182 acts along the circumferential direction of the gear wheel 116 via the circumferential-direction load receiving portions 120. For this reason, it is not necessary to raise the rigidity of the gear wheel 116 for a load acting along the radial direction of the gear wheel 116 from the spring pawls 182 during this rotational force transmission.

Moreover, in the clutch 100, the spring pawls 182 have a configuration where, when a load equal to or greater than a predetermined value acts on the rotor 124, the spring pawls 182 become elastically deformed to cause their distal end portions to escape from the outer teeth of the rotor and cut off the transmission of rotation between the gear wheel 116 and the rotor 124. That is, the spring pawls 182 have a configuration where the operation of a "load limiter mechanism" as previously mentioned is performed between the rotor 124 and the spring pawls 182, and a load along the radial direction does not act on the gear wheel 116. Consequently, in this respect also, it is not necessary to raise the rigidity of the gear wheel 116. Consequently, in the clutch 100, the gear wheel 116 can be molded thinly or molded by resin or the like. Thus, the clutch 100 can be made compact and lightweight.

Moreover, in the clutch 100 of the webbing take-up device 10, the ring 176 of the clutch body portion 144 integrally includes the cover portion 178, which retains the gear wheel 116, the sliders 144, the lock bars 154, the torsion coil springs 164 and the holder 170 in predetermined installation positions, and the spring pawls 182 for the previously mentioned "load limiter mechanism". Moreover, the ring 176 has a configuration where it is integrally retained on the rotor 124 by the elastic force of the spring pawls 182. That is, in the clutch body portion 144, the gear wheel 116, the sliders 144, the lock bars 154, the torsion coil springs 164 and the holder 170 are assembled in predetermined installation positions, and the ring 176 is caused to be retained on the rotor 124 by the elastic force of the spring pawls 182, so that the clutch configural members can be integrally temporarily held (sub-assembled). Thus, the installability such as when the clutch body portion 114 is installed in the case (the clutch case 101 and the cover clutch 102) is significantly improved, and the productivity of the webbing take-up device 10 is improved.

As described above, the webbing take-up device 10 pertaining to the present embodiment can not only transmit to the take-up shaft 20 just the rotation from the motor 44 by the clutch 100, but also can be configured simply and compactly.

It will be noted that in the above-described embodiment, although the webbing take-up device was configured such that the rotation of the rotating shaft 50 of the motor 44 was transmitted to the take-up shaft 20 by the clutch 100 to cause the take-up shaft 20 to rotate in the webbing take-up direction, the webbing take-up device may also be configured such that the rotation of the rotating shaft 50 of the motor 44 is transmitted to the take-up shaft 20 by the clutch to cause the take-up shaft 20 to rotate in the webbing pullout direction.

Second Embodiment

Figure 12:
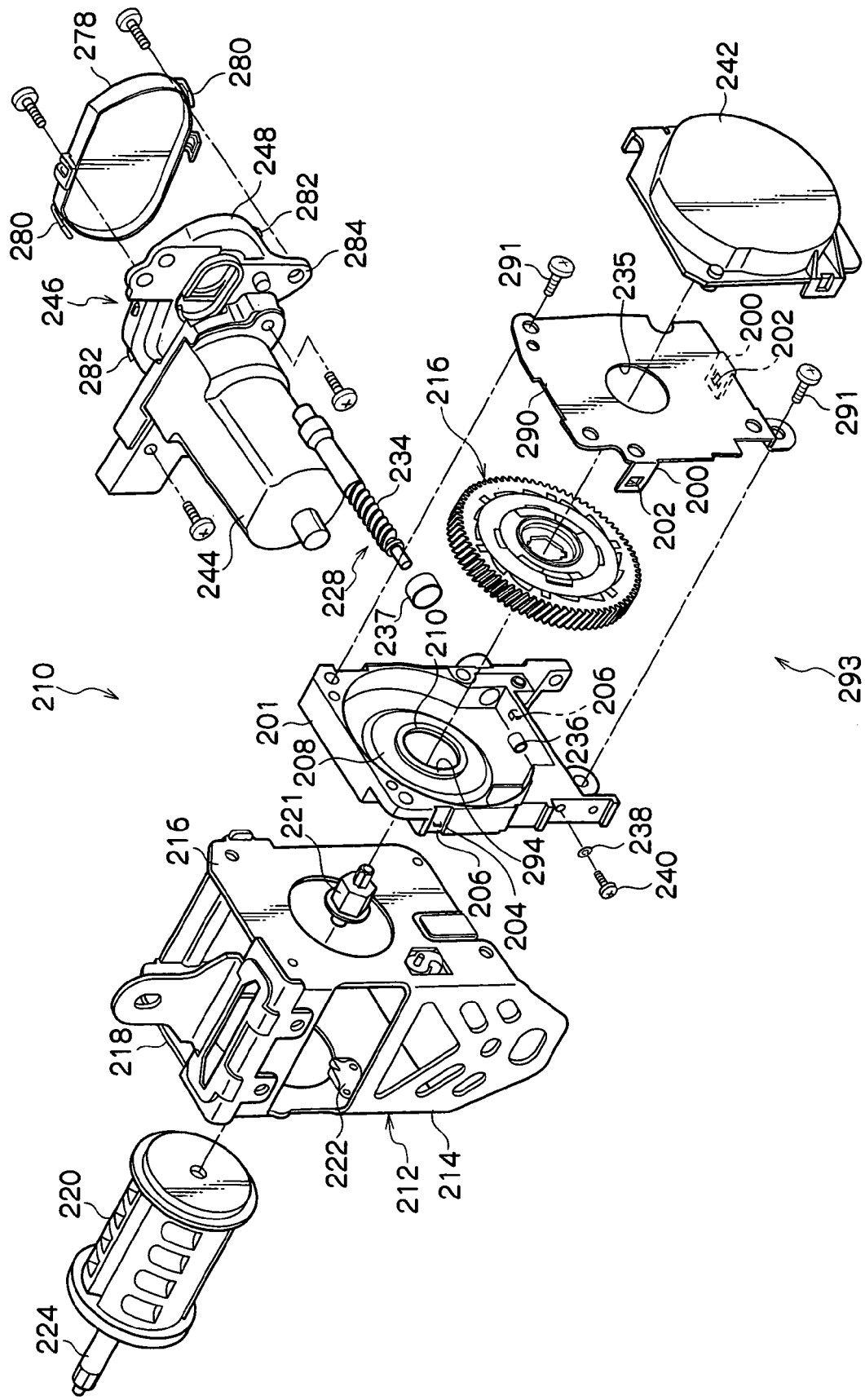
[FIG. 12] An exploded perspective view showing the overall configuration of a webbing take-up device pertaining to a second embodiment of the present invention.

The overall configuration of a webbing take-up device 210 pertaining to a second embodiment of the present invention is the same as that shown in FIG. 11 of the first embodiment, so illustration thereof will be omitted. Further, the configurations of relevant portions of the webbing take-up device 210 are the same as those shown in FIG. 10 of the first embodiment, so illustration thereof will be omitted. In FIG. 12, the overall configuration of the webbing take-up device 210 of the present embodiment is shown in exploded perspective view.

The webbing take-up device 210 is disposed with a frame 212. The frame 212 is configured by a substantially plate-like back plate 214 and a pair of a leg plate 216 and a leg plate 218 that extend integrally from both width-direction ends of the back plate 214. The frame 12 is attached to a vehicle body as a result of the back plate 214 being fixed to the vehicle body by unillustrated fastening means such as a bolt.

A take-up shaft 220 manufactured by die-casting or the like is rotatably disposed between the pair of the leg plate 216 and the leg plate 218 of the frame 212. The take-up shaft 220 has a drum-like shape overall, and a proximal end portion of a webbing (not shown) formed in a long band-like shape is coupled and fixed to the take-up shaft 220. When the take-up shaft 220 is rotated in one direction about its axial line (below, this direction will be called "the take-up direction"), the webbing is taken up in layers on the outer peripheral portion of the take-up shaft 220 from is proximal end side, and when the webbing is pulled out from its distal end side, the webbing is pulled out while the take-up shaft 220 rotates in the other direction about its axial line in accompaniment therewith (below, the rotational direction of the take-up shaft 220 when the webbing is pulled out will be called "the pullout direction").

One end side of the take-up shaft 220 penetrates the leg plate 218 and protrudes outward of the frame 212. An unillustrated lock mechanism is disposed on the side of the leg plate 218. The lock mechanism is configured to include an acceleration sensor and is linked to a lock plate 222 that spans the distance between the leg plate 216 and the leg plate 218 and to a torsion bar 224 that is disposed in the axial center portion of the take-up shaft 220. When the vehicle suddenly decelerates or the like, one end of the torsion bar 224 is restrained via the lock plate 222 by the actuation of the lock mechanism so that energy absorption is performed and the rotation of the take-up shaft 220 in the pullout direction is deterred.

The other end side of the take-up shaft 220 penetrates the leg plate 216 and protrudes slightly outward of the frame 212. A coupling screw 221 formed in a hexagonal column shape is coaxially and integrally coupled to the other end side of the take-up shaft 220.

Further, a clutch case 201 serving as a case configuring a clutch 293 pertaining to the second embodiment is disposed on the outer side of the leg plate 216. The clutch case 201 is formed in a substantially rectangular box-like shape by a metal material or the like (e.g., an aluminum alloy, etc.) and opens toward the side opposite of the leg plate 216. A cover clutch 290 comprising an iron plate or the like and serving as a case is disposed on the open side of the clutch case 201.

Figure 13:
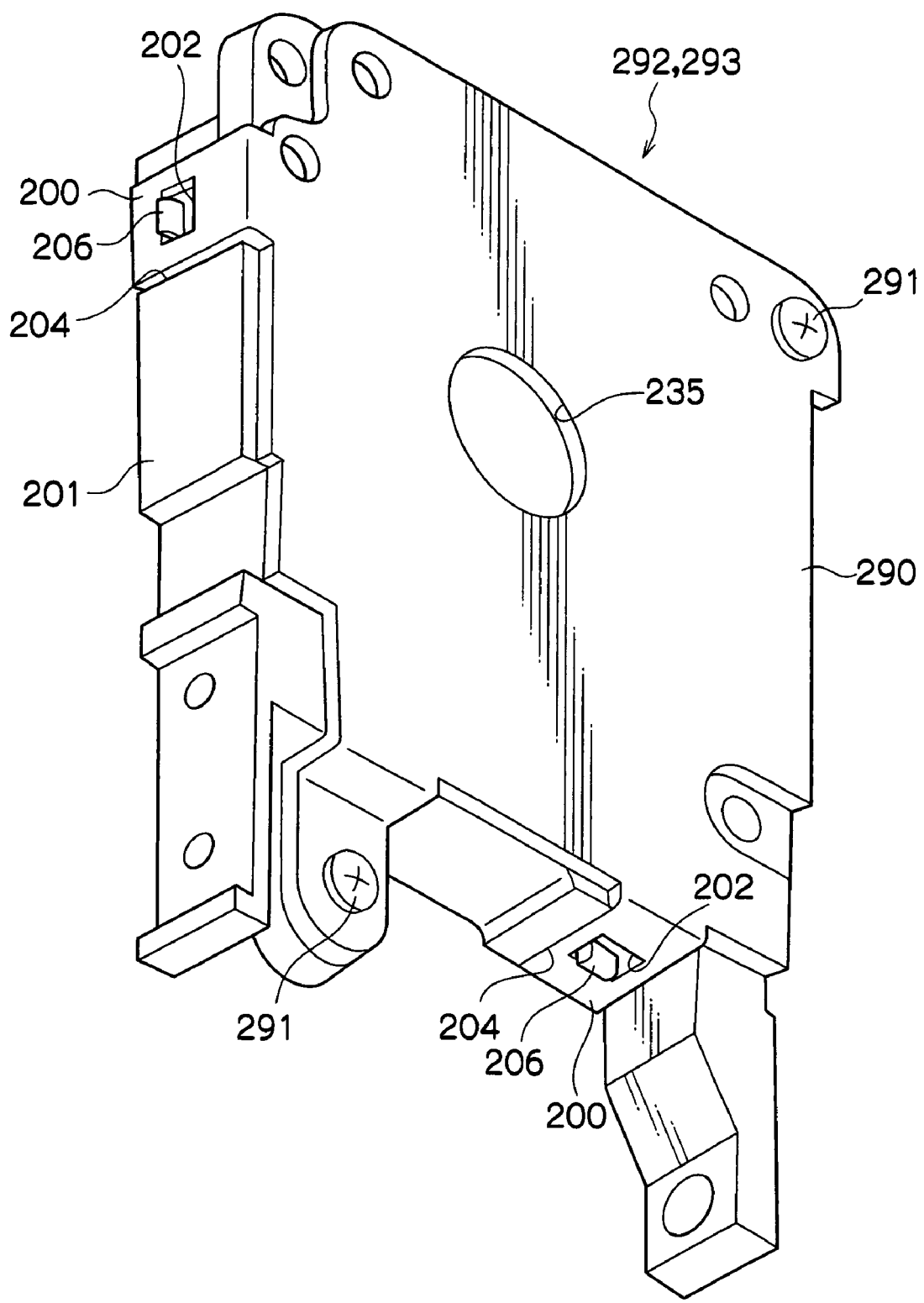
[FIG. 13] A perspective view showing the configuration of a clutch case and a cover clutch that are configural members of the webbing take-up device pertaining to the second embodiment of the present invention.

As shown in FIG. 13, two hook-and-lock pawls 200 that protrude in the plate thickness direction are disposed on the cover clutch 290. The two hook-and-lock pawls 200 are disposed at positions at a substantial diagonal in mutually orthogonal end surfaces of the cover clutch 290 (in FIG. 13, the left side end surface and the lower side end surface), and substantially rectangular through holes 202 are formed in the center portion of each of the hook-and-lock pawls 200. Further, groove-like guide portions 204, together with which the hook-and-lock pawls 200 can fit, are formed in the side walls of the clutch case 201 at positions corresponding to the two hook-and-lock pawls 200 of the cover clutch 290, and engagement protrusions 206 serving as engagement portions are disposed in the guide portions 204 at positions corresponding to the through holes 202 of the hook-and-lock pawls 200.

Thus, the cover clutch 290 is attached (provisionally fixed) to the open side of the clutch case 201 as a result of the hook-and-lock pawls 200 being guided and positioned in the guide portions 204 of the clutch case 201 and the engagement protrusions 206 being fitted together with and locked in the through holes 202.

The clutch case 201 and the cover clutch 290 are integrally fixed to the leg plate 216 by screws 291.

As shown in FIG. 12, a circular through hole 294 is formed coaxially with the take-up shaft 220 in the center portion of the bottom wall of the clutch case 201, and the coupling screw 221 passes through the through hole 294. Further, the site in the vicinity of the through hole 294 protrudes slightly in a circular fashion toward the side opposite of the leg plate 216, and a ring-like sliding surface 208 is formed. Moreover, a circular cylindrical bushing support portion 210 that protrudes toward the side opposite of the leg plate 216 is formed in the hole edge portion of the through hole 294. A bushing 212 (see FIG. 14 and FIG. 15) formed in a ring-like shape by a resin material or the like is supported on the bushing support portion 210.

A clutch gear portion 292 is disposed inside the clutch case 201. The clutch gear portion 292 is disposed with a worm gear 234. The axis of the worm gear 234 is disposed in a state where it is perpendicular to the take-up shaft 220, end portions of the worm gear 234 are supported on the clutch case 201 via bushes 236 and 237, and one end side of the worm gear 234 is disposed protruding outward from the clutch case 201. Further, a steel ball 238 is housed in a bearing portion of the clutch case 201 that supports the distal end portion of the worm gear 234, the steel ball 238 contacts the distal end portion of the worm gear 234, and an adjust screw 240 is screwed into the bearing portion. The adjust screw 240 pushes the steel ball 238 at its distal end portion to cause the steel ball 238 to be pressed against the distal end of the worm gear 234. Thus, displacement in the axial direction of the worm gear 234 is regulated (thrust-adjusted). It will be noted that the steel ball 238 may also be configured such that it is formed integrally on the distal end portion of the adjust screw 240 (such that the distal end portion of the adjust screw 240 is formed in a spherical shape). A clutch body portion 214 that configures the clutch 293 pertaining to the second embodiment is disposed above the worm gear 234.

Figure 14:
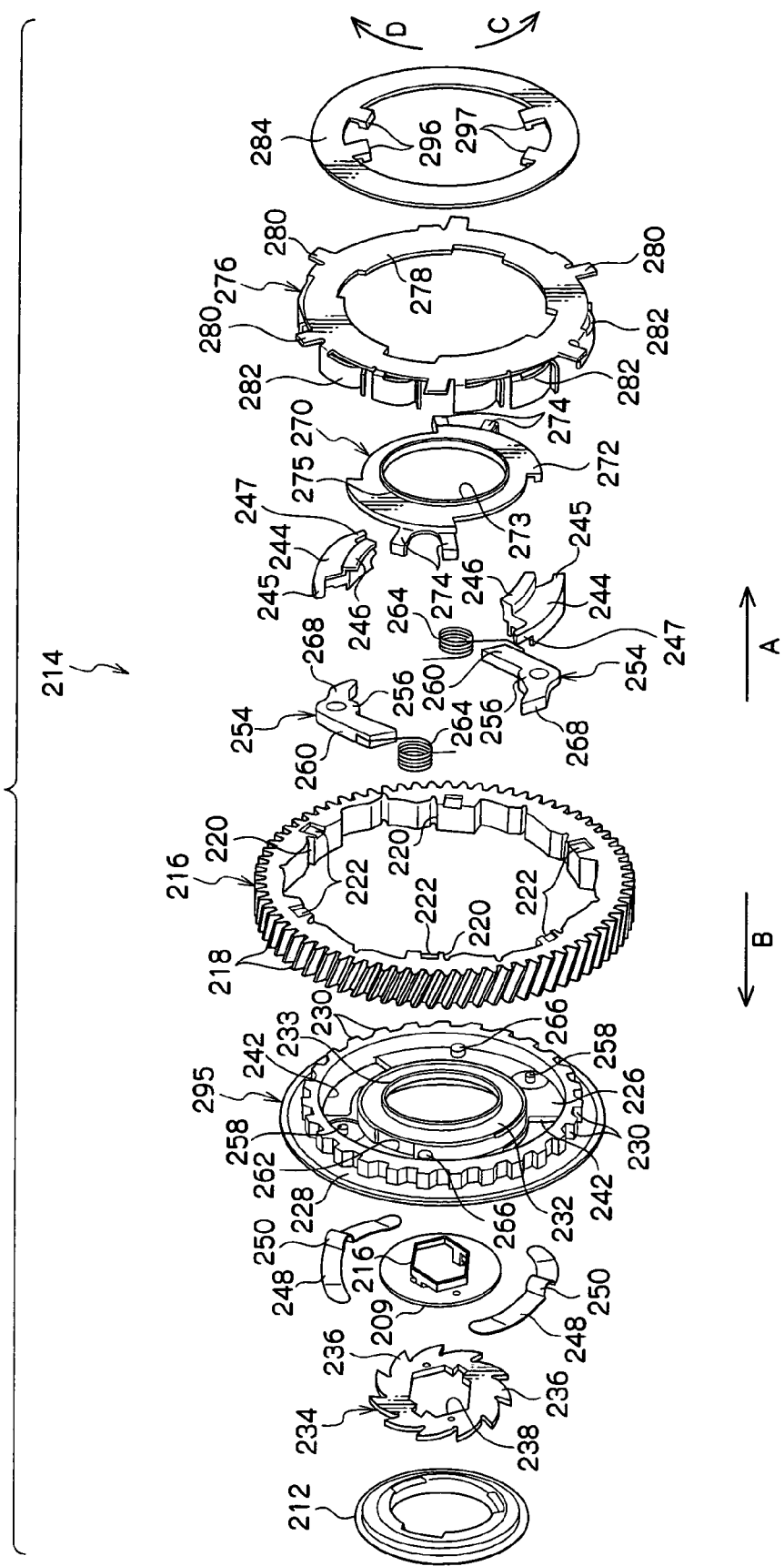
[FIG. 14] An exploded perspective view showing the configuration of relevant portions of a clutch that is a configural member of the webbing take-up device pertaining to the second embodiment of the present invention.
Figure 15:
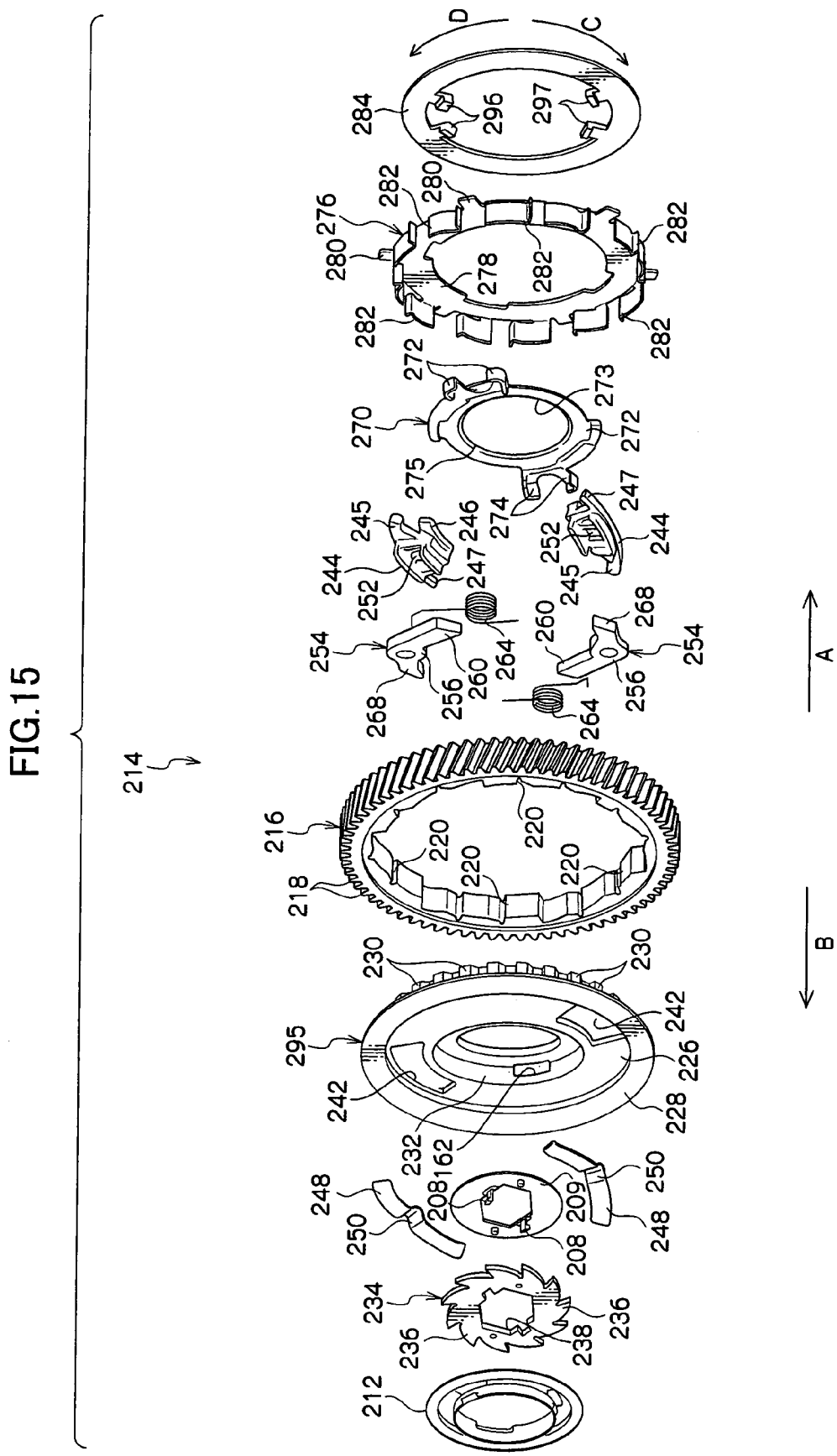
[FIG. 15] An exploded perspective view showing the configuration of relevant portions of the clutch that is a configural member of the webbing take-up device pertaining to the second embodiment of the present invention.

As shown in FIG. 14 and FIG. 15, the clutch body portion 214 is disposed with a gear wheel 216 that configures a rotating body. The gear wheel 216 is formed in a ring-like shape by a resin material or the like, is disposed coaxially with the take-up shaft 220, and worm wheel teeth 218 are formed on the outer peripheral portion of the gear wheel 216. The worm wheel teeth 218 mesh with the above-mentioned worm gear 234. Further, plural (twelve in the second embodiment) circumferential-direction load receiving portions 220 are formed on the inner peripheral portion of the gear wheel 216 at predetermined intervals along the radial direction of the gear wheel 216. The circumferential-direction load receiving portions 220 correspond to later-described spring pawls 282 of a ring 276. Moreover, plural (six in the second embodiment) baffle concave portions 222 are formed on the end surface of one axial-line direction side (the side in the direction of arrow A in FIG. 14 and FIG. 15) of the gear wheel 216 at constant intervals along the circumferential direction of the gear wheel 216. The baffle concave portions 222 correspond to later-described baffle pawls 280 of the ring 276.

A rotor 224 that is formed in a discoid shape by a metal material or the like (e.g., zinc aluminum alloy, etc.) and configures a rotating body is disposed coaxially with the gear wheel 216 inside the gear wheel 216. The rotor 224 includes a bottomed circular cylindrical body portion 226 and a flange portion 228 that protrudes in the radial direction at one axial-line direction side (the side in the direction of arrow B in FIG. 14 and FIG. 15) of the body portion 226.

Plural outer teeth 230 are formed on the outer peripheral portion of the body portion 226 at equidistant intervals along the circumferential direction of the body portion 226. Side walls of the outer teeth 230 on one side (the side in the direction of arrow C in FIG. 14 and FIG. 15) along the circumferential direction of the body portion 226 slant with respect to the circumferential direction of the body portion 226, and side walls of the outer teeth 230 on the other side (the side in the direction of arrow D in FIG. 14 and FIG. 15) along the circumferential direction of the body portion 226 are formed parallel along the radial direction of the body portion 226 (in other words, the cross-sectional shapes of the outer teeth 230 are trapezoidal). The outer teeth 230 correspond to the later-described spring pawls 282 of the ring 276.

A substantially circular cylindrical housing portion 232 is formed coaxially in the center portion of the bottom wall of the body portion 226. A ring-like support shaft portion 233 protrudes coaxially on one axial-line direction side (the side in the direction of arrow A in FIG. 14 and FIG. 15) of the housing portion 232. The support shaft portion 233 is supported in a circular hole 235 formed in the cover clutch 290 such that the support shaft portion 233 can freely rotate via a later-described rotation support portion 275 of a holder 270. Further, the previously mentioned bushing 212 is fitted, such that it can freely rotate, in the other axial-line direction side (the side in the direction of arrow B in FIG. 14 and FIG. 15), and the other axial-line direction side of the housing portion 232 is supported, such that it can freely rotate, on the clutch case 201 via the bushing 212. Thus, the body portion 226 (the rotor 224) is configured to be rotatable about its own axial line.

A ratchet 234 formed in a substantially ring-like shape by a steel plate or the like is housed inside the housing portion 232 of the body portion 226. Outer teeth 236 that are ratchet teeth are formed on the outer peripheral portion of the ratchet 234. Further, a coupling hole 238 that has a cross-sectionally hexagonal shape is formed in the axial center portion of the ratchet 234, and the previously mentioned coupling screw 221 is passed through the coupling hole 238 such that relative rotation is impossible. Thus, the take-up shaft 220 and the ratchet 234 are configured to rotate integrally via the coupling screw 221.

Figure 16:
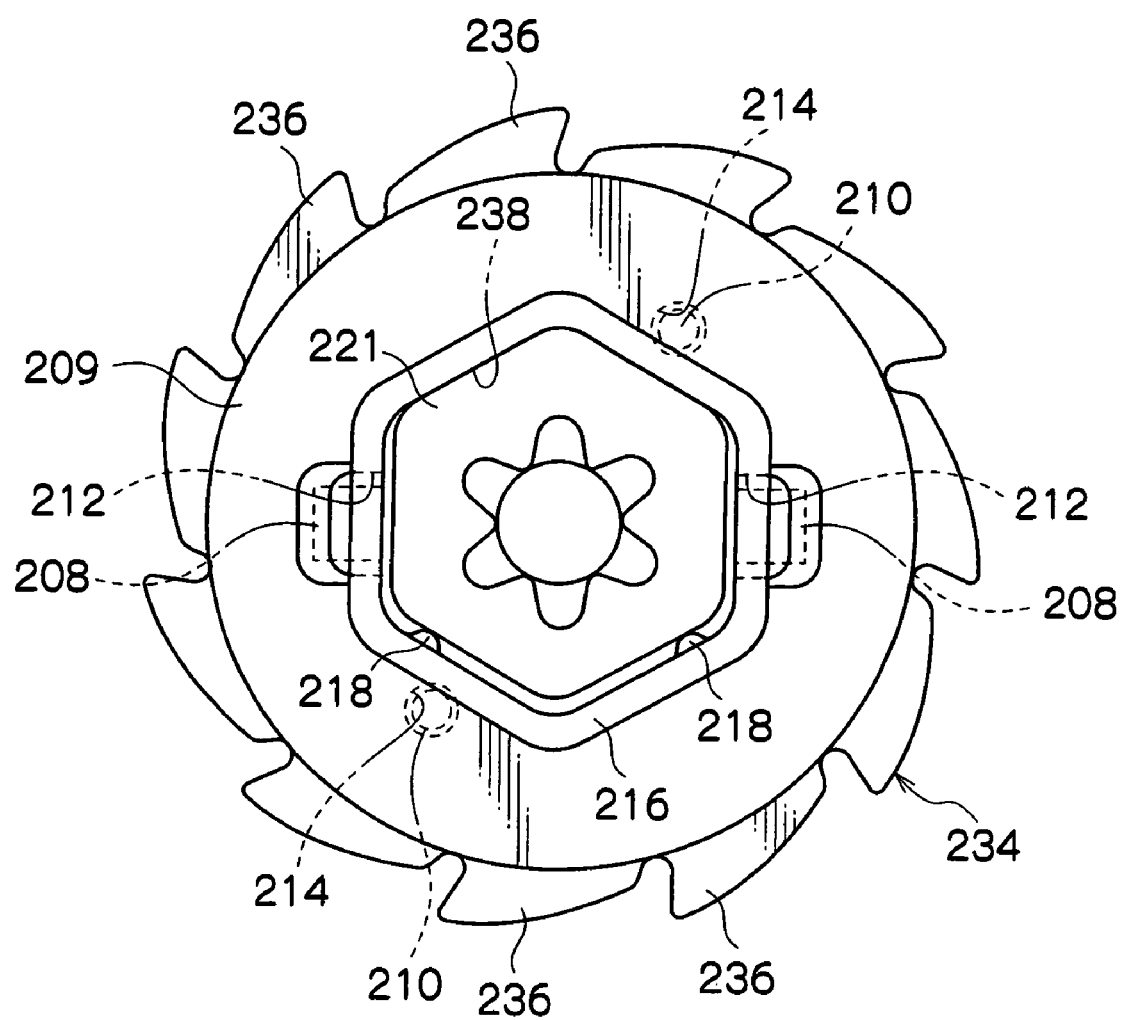
[FIG. 16] A side view showing a coupling screw, a ratchet, and a washer that are configural members of the webbing take-up device pertaining to the second embodiment of the present invention.

Further, a washer 209 formed in a ring shape by a resin material or the like is integrally attached to the one axial-line direction side (the side in the direction of arrow A in FIG. 1 and FIG. 2) of the ratchet 234. As shown in FIG. 16, a pair of pawl portions 208 and a pair of circular cylindrical baffle portions 210 are disposed on the ratchet 234 side of the washer 209 (in FIG. 16, the far side in the direction perpendicular to the surface of the page). The pair of pawl portions 208 hook and lock into a pair of hook-and-lock grooves 212 formed in the hole edge portion of the coupling hole 238 of the ratchet 234. Thus, the washer 209 is attached to the ratchet 234 (movement of the washer 209 along the axial line direction with respect to the ratchet 234 is regulated). Further, the baffle portions 210 fit into a pair of baffle concave portions 214 formed in the end surface of the ratchet 234, and movement of the washer 209 along the radial direction with respect to the ratchet 234 is regulated (the washer 209 is positioned at a predetermined position of the ratchet 234).

A press fit portion 216 formed in a hexagonal cylinder shape is disposed in the center portion of the washer 209 opposite from the ratchet 234 (in FIG. 16, the front side in the direction perpendicular to the page). Two crush rubs 218 that protrude inward in the radial direction are disposed inside the cylinder of the press fit portion 216, and the coupling screw 221 is press-fitted inside the cylinder of the press fit portion 216 in a state where it crushes these crush ribs 218. Thus, backlash of the ratchet 234 with respect to the coupling screw 221 is prevented, and the occurrence of striking sounds (backlash sounds) resulting from such backlash is prevented.

It will be noted that the end surface of the washer 209 opposite from the ratchet 234 (the side in the direction of arrow A in FIG. 14 and FIG. 15) slidably abuts against the ring-like bottom wall of the housing portion 232, and the end surface at the other axial-line direction side (the side in the direction of arrow B in FIG. 14 and FIG. 15) of the ratchet 234 slidably abuts against the previously mentioned bushing 212.

Figure 17:
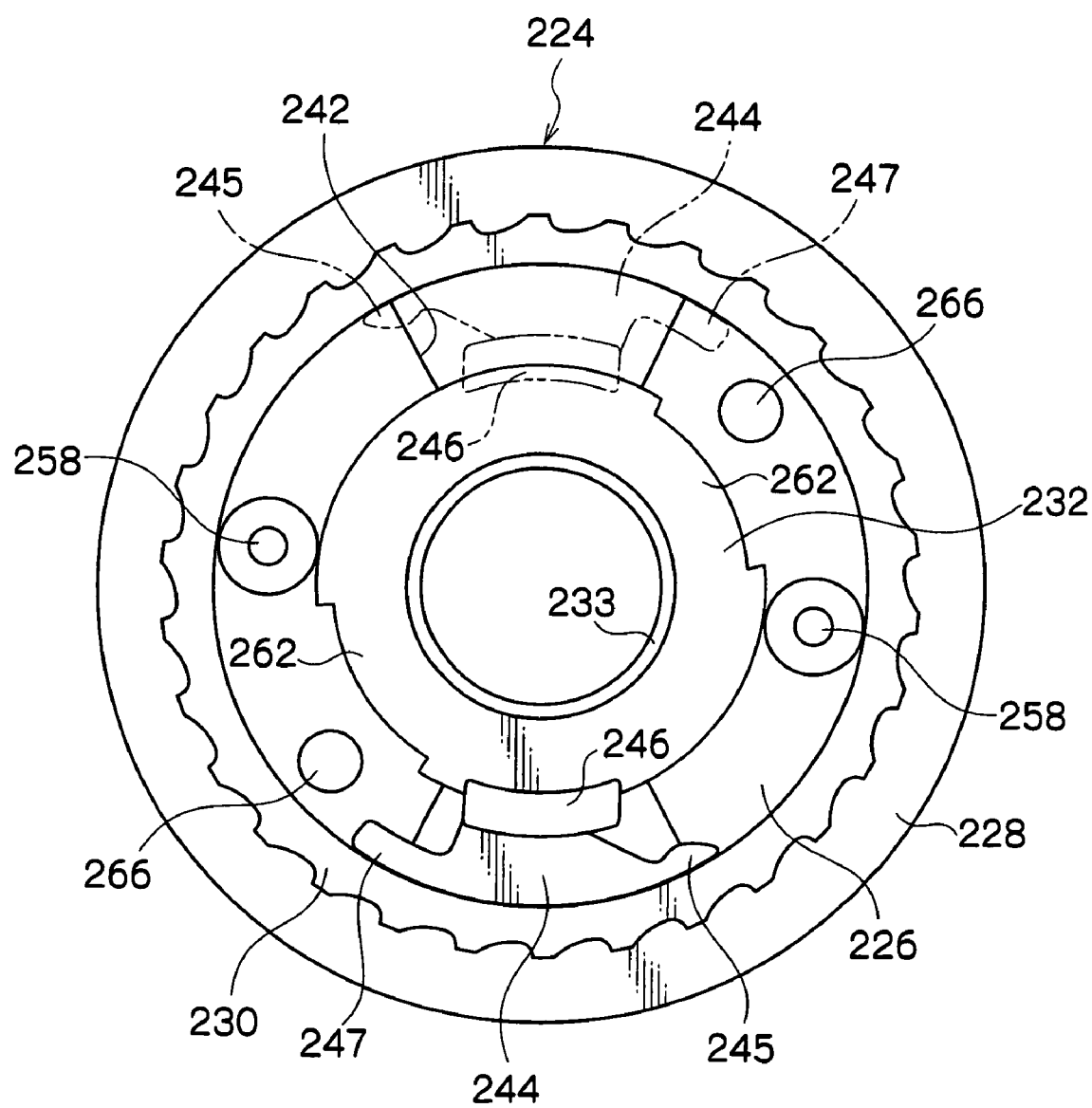
[FIG. 17] A side view showing the configuration of a rotor and sliders that are configural members of the webbing take-up device pertaining to the second embodiment of the present invention.

As shown in FIG. 17, pair of guide holes 242 that are curved along the circumferential direction of the body portion 226 is formed in the bottom wall of the body portion 226 of the rotor 224 at the radial-direction outer side of the housing portion 232. Sliders 244 that are formed by a resin material or the like in substantially block-like shapes and are curved along the circumferential direction of the body portion 226 are slidably attached to the guide holes 242. The pair of sliders 244 is guided by the inner peripheral surface of the body portion 226 and by the outer peripheral surface of the housing portion 232 and is configured to be relatively movable with respect to the body portion 226 (the rotor 224) within a predetermined range along the guide holes 242 (in FIG. 17, the illustration of later-described lock bars 254 and torsion coil springs 264 is omitted).

Figure 18:
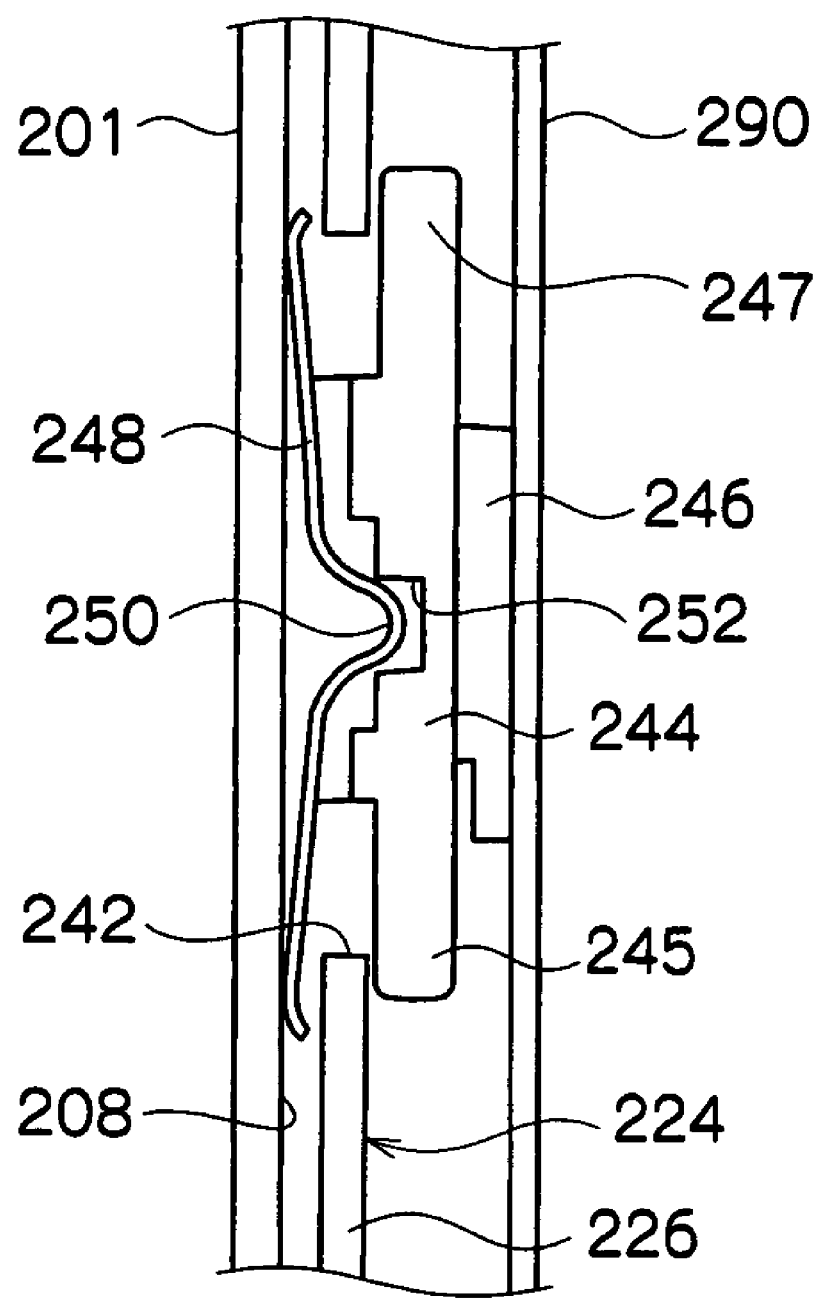
[FIG. 18] A cross-sectional view showing the partial configuration of the clutch that is a configural member of the webbing take-up device pertaining to the second embodiment of the present invention.

Sliding pieces 246 protrude from one side (the side in the direction of arrow A in FIG. 14 and FIG. 15) of the sliders 244 and, as shown in FIG. 18, abut against the cover clutch 290. Further, retainers 248 are disposed on the side of the sliders 244 opposite of the sliding pieces 246. The retainers 248 are narrow metal pieces having elasticity and are bent in substantial "<" shapes. The retainers 248 are integrally coupled to the sliders 244 as a result of coupling portions 250 disposed in longitudinal-direction center portions of the retainers 248 being fitted into coupling holes 252 formed in the sliders 244, and are elastically deformed a predetermined amount as a result of both longitudinal-direction end portions of the retainers 248 being pushed against the previously mentioned sliding surface 208 of the clutch case 201.

For this reason, the sliding pieces 246 of the sliders 244 are pushed against the cover clutch 290 by the elastic force of the retainers 248, and predetermined frictional force is imparted to the movement (relative movement with respect to the rotor 224) of the sliders 244 along the guide holes 242. For this reason, when the rotor 224 rotates, the sliders 244 are retained in the case (the clutch case 201 and the cover clutch 290) temporarily by the frictional force acting on both longitudinal-direction end portions of the retainers 248 and the sliding pieces 246 and relatively move within a predetermined range along the guide holes 242 with respect to the rotor 224.

An escape prevention piece 247 is formed on one curve-direction end portion (the end portions at the side in the direction of arrow D in FIG. 14 and FIG. 15) of each of the sliders 244. Further, a push retention piece 245 is formed on the other curve-direction end portion (the end portions at the side in the direction of arrow C in FIG. 14 and FIG. 15) of each of the sliders 244. The sliders 244 are retained on the rotor 224 as a result of the escape prevention pieces 247 and the push retention pieces 245 engaging with the hole edge portions of the guide holes 242 and the previously mentioned sliding pieces 246 engaging with the housing portion 232 (the sliders 244 are prevented from escaping to one axial-line direction side of the rotor 224 (the side in the direction of arrow B in FIG. 14 and FIG. 15) via the guide holes 242).

Further, the previously mentioned push retention pieces 245 correspond to a pair of lock bars 254. Each of the lock bars 254 is formed in a substantial "<" shape by a steel plate or the like, is disposed on one curve-direction end side of each of the sliders 244, and is disposed with a ring-like bearing portion 256. The bearing portions 256 are supported, such that they can freely rotate, by circular columnar support shafts 258 that protrude from the bottom wall of the body portion 226. A coupling piece 260 protrudes on the side (the side in the direction of arrow C in FIG. 14 and FIG. 15) of each of the bearing portions 256 opposite from the sliders 244. The coupling pieces 260 rotate about the support shafts 258 together with the bearing portions 256, whereby the distal end portions of the coupling pieces 260 penetrate hole portions 262 formed in the housing portion 232 of the rotor 224 and mesh with the previously mentioned outer teeth 236 of the ratchet 234. Further, the coupling pieces 260 are always biased in the direction in which they mesh with the outer teeth 236 (the ratchet 234) by the biasing force of torsion coil springs 264. It will be noted that the torsion coil springs 264 are supported by circular columnar support shafts 266 that protrude from the bottom wall of the body portion 226 of the rotor 224.

Release pieces 268 that correspond to the previously mentioned push retention pieces 245 of the sliders 244 protrude from the sliders 244 side (the side in the direction of arrow D in FIG. 14 and FIG. 15) of the bearing portions 256. The end portions of the release pieces 268 facing the sliders 244 are formed as slanted surfaces that are slanted with respect to the moving direction of the sliders 244 (the direction of arrow C and the direction of arrow D in FIG. 14 and FIG. 15).

Figure 19A:
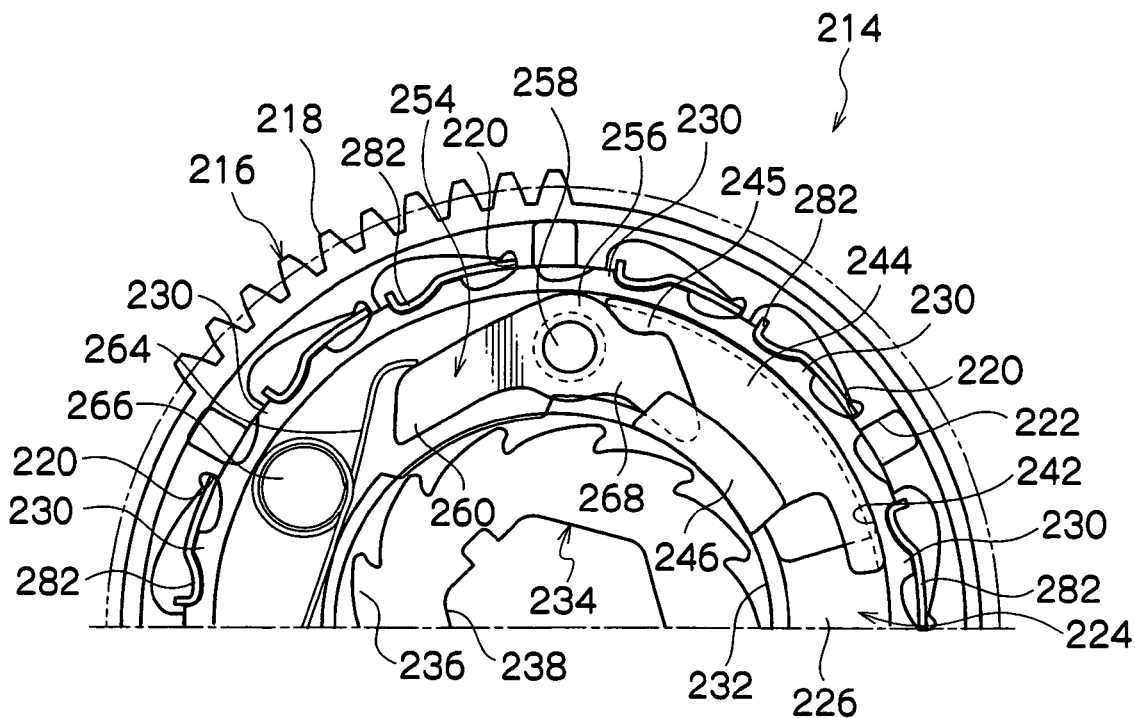
[FIG. 19A] A side view showing a state where lock bars are retained in the sliders in the configuration of the clutch of the webbing take-up device pertaining to the second embodiment of the present invention.
Figure 19B:
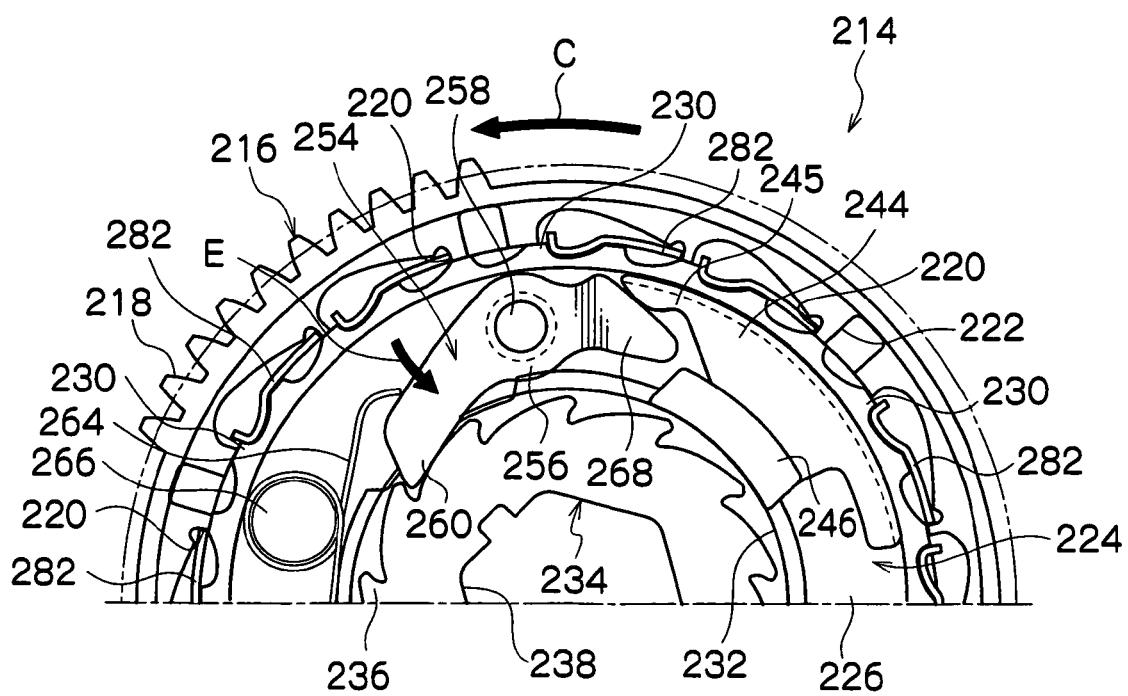
[FIG. 19B] A side view showing a state where the lock bars are engaged with the ratchet in the configuration of the clutch of the webbing take-up device pertaining to the second embodiment of the present invention.

Here, as shown in FIG. 19A and FIG. 19B, when the rotor 224 relatively moves with respect to the sliders 244, the lock bars 254 move within a predetermined range toward and away from the sliders 244, and in a state where the lock bars 254 are close to the sliders 244 (the state shown in FIG. 19A), the release pieces 268 of the lock bars 254 enter the inner sides (ratchet 234 sides) of the push retention pieces 245 of the sliders 244, whereby the release pieces 268 are retained in the disengaged positions counter to the biasing force of the torsion coil springs 264. In this state, the coupling pieces 260 of the lock bars 254 move away from the ratchet 234.

On the other hand, in a state where the lock bars 254 have moved away from the sliders 244 (the state shown in FIG. 19B), the release pieces 268 of the lock bars 254 release the retention by the push retention pieces 245 of the sliders 244. In this state, the coupling pieces 260 of the lock bars 254 are moved toward the ratchet 234 (engagement positions) by the biasing force of the torsion coil springs 264, and the distal end portions of the coupling pieces 260 mesh with the outer teeth 236.

Figure 20:
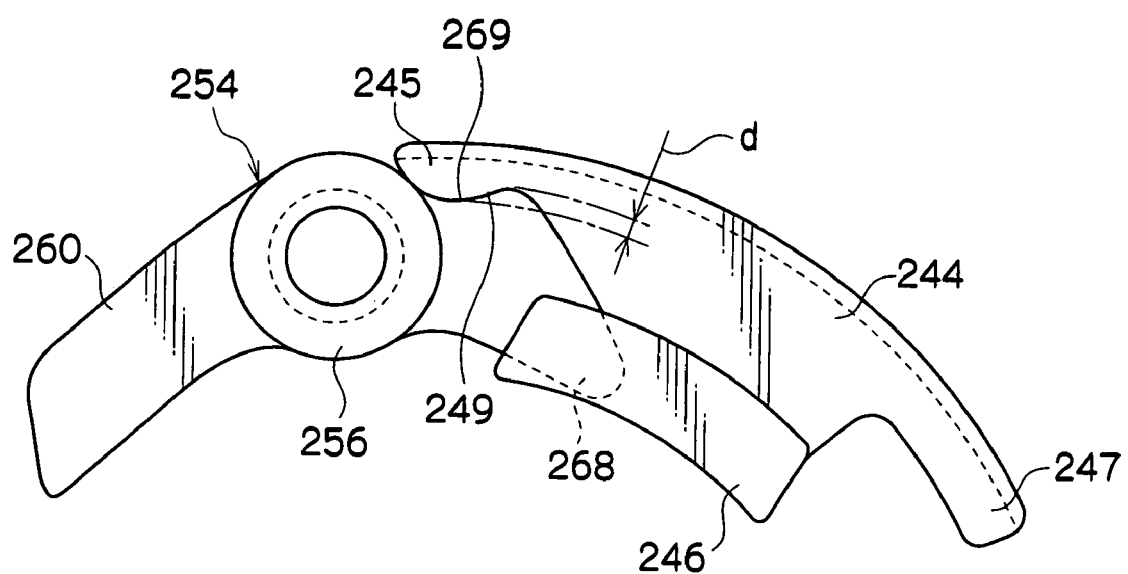
[FIG. 20] A side view showing the configuration of the sliders and the lock bars of the webbing take-up device pertaining to the second embodiment of the present invention.

Further, here, as shown in FIG. 20, undercut portions that slant a predetermined angle (e.g., 10 degrees) with respect to the moving direction of the sliders (the circumferential direction of the rotor 224) are formed in the push retention pieces 245 of the sliders 244, and the surfaces of the push retention pieces 245 facing the release pieces 268 are formed as slanted surfaces 249 that slant with respect to the moving direction of the sliders 244. Further, undercut portions are formed in the release pieces 268 of the lock bars 254 in correspondence to the previously mentioned undercut portions of the push retention pieces 245, and the surfaces of the release pieces 245 facing the push retention pieces 268 are formed as slanted surfaces 269 that slant with respect to the moving direction of the sliders 244.

That is, the push retention pieces 245 and the release pieces 268 are configured to mesh and engage with each other a predetermined amount (predetermined dimension) d with respect to the radial direction of the rotor 224. Additionally, when the lock bars 254 move away from the sliders 244, the slanted surfaces 249 of the push retention pieces 245 cause the release pieces 268 to move the predetermined amount d toward the ratchet 234, and the coupling pieces 260 are moved a predetermined amount toward the side opposite of the ratchet 234 counter to the biasing force of the torsion coil springs 264. Thus, predetermined drag arises in the separation movement of the lock bars 254 and the sliders. However, this drag is set to be sufficiently small in comparison to the frictional force acting between both longitudinal-direction end portions of the retainers 248 and the clutch case 201 and between the sliding pieces 246 of the sliders 244 and the cover clutch 290 by the elastic force of the previously mentioned retainers 248.

It will be noted that, in the clutch body portion 214 pertaining to the second embodiment, the sliders 244 are ordinarily disposed close to the lock bars 254. Consequently, the lock bars 254 are ordinarily retained in the disengaged positions (the state shown in FIG. 19A) as a result of the release pieces 268 being retained by the push retention pieces 245 of the sliders 244.

A holder 270 formed in a ring-like shape by a resin material or the like is disposed at the side (the side in the direction of arrow A in FIG. 5 and FIG. 15) opposite from the rotor 224 via the lock bars 254. The holder 270 is disposed with a ring-like body portion 272 and a pair of retention pawls 274 disposed on the outer peripheral portion of the body portion 272. The body portion 272 regulates displacement of the lock bars 254 in the axial line direction with respect to the support shafts 258 (the rotor 224), and the pair of retention pawls 274 regulate displacement of the torsion coil springs 264 in the axial line direction with respect to the support shafts 266 (the rotor 224).

Further, the support shaft portion 233 of the rotor 224 penetrates a circular hole 273 formed in the center portion of the body portion 272. A rotation support portion 275 that protrudes slightly in a circular cylindrical shape toward the side opposite from the rotor 224 (toward the cover clutch 290) is disposed on the hole edge portion of the circular hole 273, and the support shaft portion 233 of the rotor 224 is supported, such that it can freely rotate, in the circular hole 235 of the cover clutch 290 via the rotation support portion 275.

A ring 276 comprising a metal material (e.g., SUS, etc.) having elasticity is disposed at the radial-direction outer side of the holder 270 and on one axial-line direction side (the side in the direction of arrow A of FIG. 14 and FIG. 15) of the rotor 224. The ring 276 is disposed with a cover portion 278 formed in a ring shape. Plural (six in the second embodiment) baffle pawls 280 that protrude outward in the radial direction of the cover portion 278 are integrally formed on the outer peripheral portion of the cover portion 278. The baffle pawls 280 fit together with the previously mentioned baffle concave portions 222 of the gear wheel 216. Thus, the ring 276 is integrally coupled to the gear wheel 216 in the circumferential direction of the gear wheel 216.

Moreover, plural (twelve in the second embodiment) spring pawls 282 that are formed in narrow plate shapes having elasticity (spring-ness) are integrally formed on the outer peripheral portion of the cover portion 278 at predetermined intervals along the circumferential direction of the cover portion 278. The proximal end portions of the spring pawls 282 are integrally connected to the cover portion 278, the longitudinal-direction intermediate portions of the spring pawls 282 are bent slightly toward the radial-direction inner side of the cover portion 278, and the distal end portions of the spring pawls 282 are bent toward the radial-direction outer side of the cover portion 278, so that, overall, the spring pawls 282 curve along the circumferential direction of the cover portion 278.

Figure 21A:
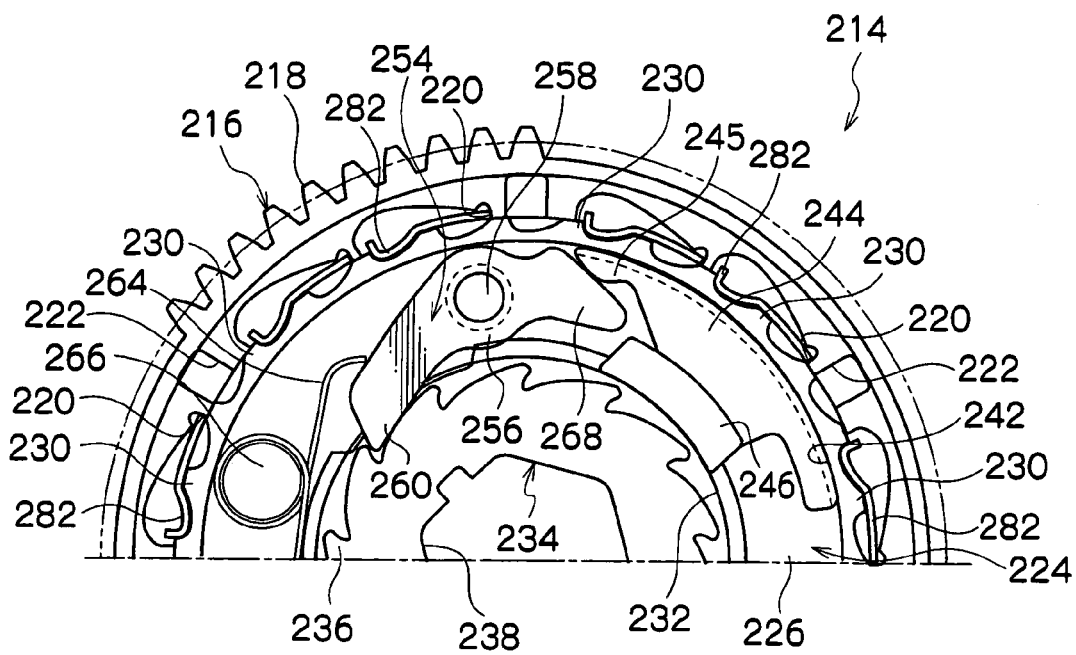
[FIG. 21A] A side view showing a state where a gear wheel and the rotor are coupled together by spring pawls in the configuration of the clutch of the webbing take-up device pertaining to the second embodiment of the present invention.

As shown in FIG. 21A, the spring pawls 282 are disposed along the circumferential direction of the rotor 224 and the gear wheel 216 between the outer teeth 230 of the rotor 224 and the inner peripheral surface of the gear wheel 216, and the inner side portions of the spring pawls 282 are pushed against the outer teeth 230 of the rotor 224 by the elastic force of the spring pawls 282. Thus, the ring 276 is integrally retained on the rotor 224.

Further, the outer side portions of the spring pawls 282 are engaged with the inner peripheral surface of the gear wheel 216, and the gear wheel 216 is supported on the rotor 224 via the spring pawls 282. In this state, the movement of the gear wheel 216 in the axial line direction is regulated by the baffle pawls 280 of the ring 276 and the flange portion 228 of the rotor 224. Moreover, in this state, the sliders 244, the lock bars 254, the torsion coil springs 264, and the holder 270 are prevented from coming off the rotor 224 by the cover portion 278 of the ring 276, and these configural members are retained in predetermined installation positions.

Moreover, the distal end portions of the spring pawls 282 enter the valley portions between the outer teeth 230 and abut against one side wall of the outer teeth 230 (side walls at the sides formed parallel along the radial direction of the body portion 226), and the proximal end portions of the spring pawls 282 abut against the previously mentioned circumferential-direction load receiving portions 220 of the gear wheel 216. Thus, the gear wheel 216 and the rotor 224 are integrally coupled together (their relative rotation is regulated) by the spring pawls 282 with respect to their circumferential direction, and when the gear wheel 216 rotates, the gear wheel 216 and the rotor 224 basically integrally rotate.

In this case, the rotational force of the gear wheel 216 in the take-up direction is transmitted to the proximal end portions of the spring pawls 282 via the circumferential-direction load receiving portions 220 and is transmitted to the outer teeth 230 of the rotor 224 from the distal end portions of the spring pawls 282, such that the gear wheel 216 receives along the circumferential direction the load acting thereon from the spring pawls 282 via the circumferential-direction load receiving portions 220 (the direction in which the gear wheel 216 receives the load from the spring pawls 282 is set along the rotational direction thereof).

Figure 21B:
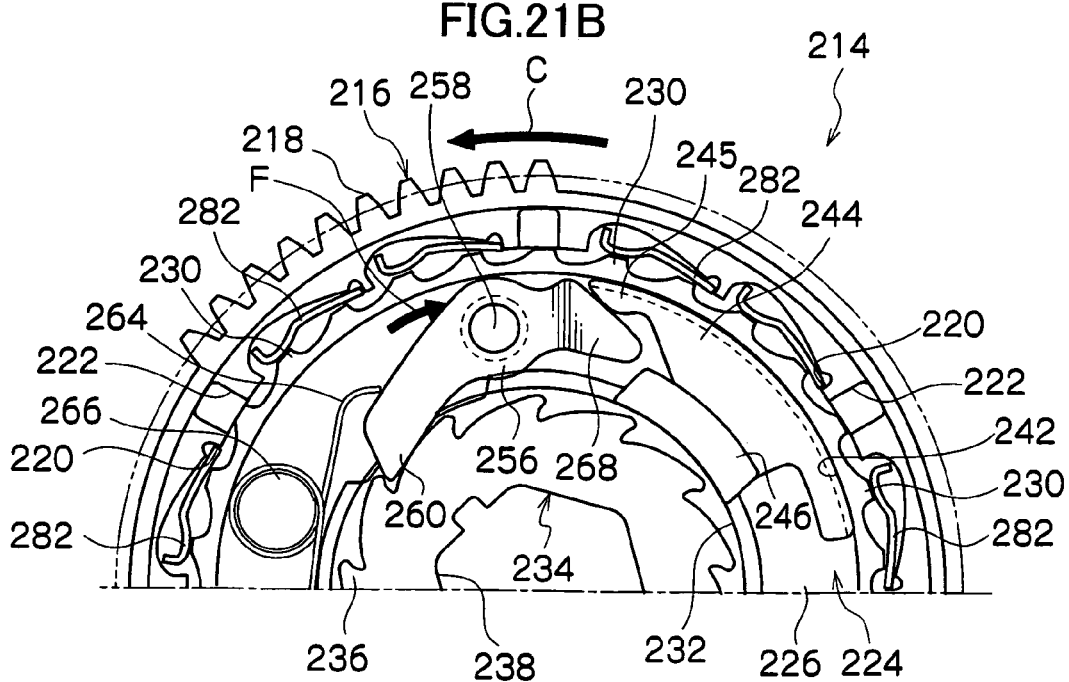
[FIG. 21B] A side view showing a state where the gear wheel and the rotor are relatively idling in the configuration of the clutch that is a configural member of the webbing take-up device pertaining to the second embodiment of the present invention.

Moreover, in this case, as previously mentioned, because the spring pawls 282 are metal pieces having elasticity, the coupling about the axial line between the gear wheel 216 and the rotor 224 by the spring pawls 282 is released as long as the rotational force arising due to the relative rotation of the gear wheel 216 with respect to the rotor 224 is of a size sufficient for causing the distal end portions of the spring pawls 282 to escape from the valley portions between the outer teeth 230 counter to the spring force (biasing force) of the spring pawls 282, and for this reason, the transmission of the rotation of the gear wheel 216 and the rotor 224 is cut off so that relative rotation between the gear wheel 216 and the rotor 224 becomes possible (see FIG. 21B).

Further, the rotational force of the gear wheel 216 in the pullout direction is transmitted to the baffle pawls 280 of the ring 276 via the baffle concave portions 222 and is transmitted from the distal end portions of the spring pawls 282 of the ring 276 to the outer teeth 230 of the rotor 224.

It will be noted that in the second embodiment, although the ring 276 has a configuration disposed with twelve of the spring pawls 282, the number of the spring pawls 282 can be changed to six or eight, for example, to adjust the load when the transmission of the rotation of the gear wheel 216 and the rotor 224 is cut off. However, in this case, the number of the circumferential-direction load receiving portions 220 and the like must also be changed in correspondence to the number of the spring pawls 282.

Further, the load when the transmission of the rotation of the gear wheel 216 and the rotor 224 is cut off can also be changed by changing the width dimension and the thickness dimension of the spring pawls 282 or changing the depth dimension of the valley portions between the outer teeth 230 of the rotor 224.

Figure 22:
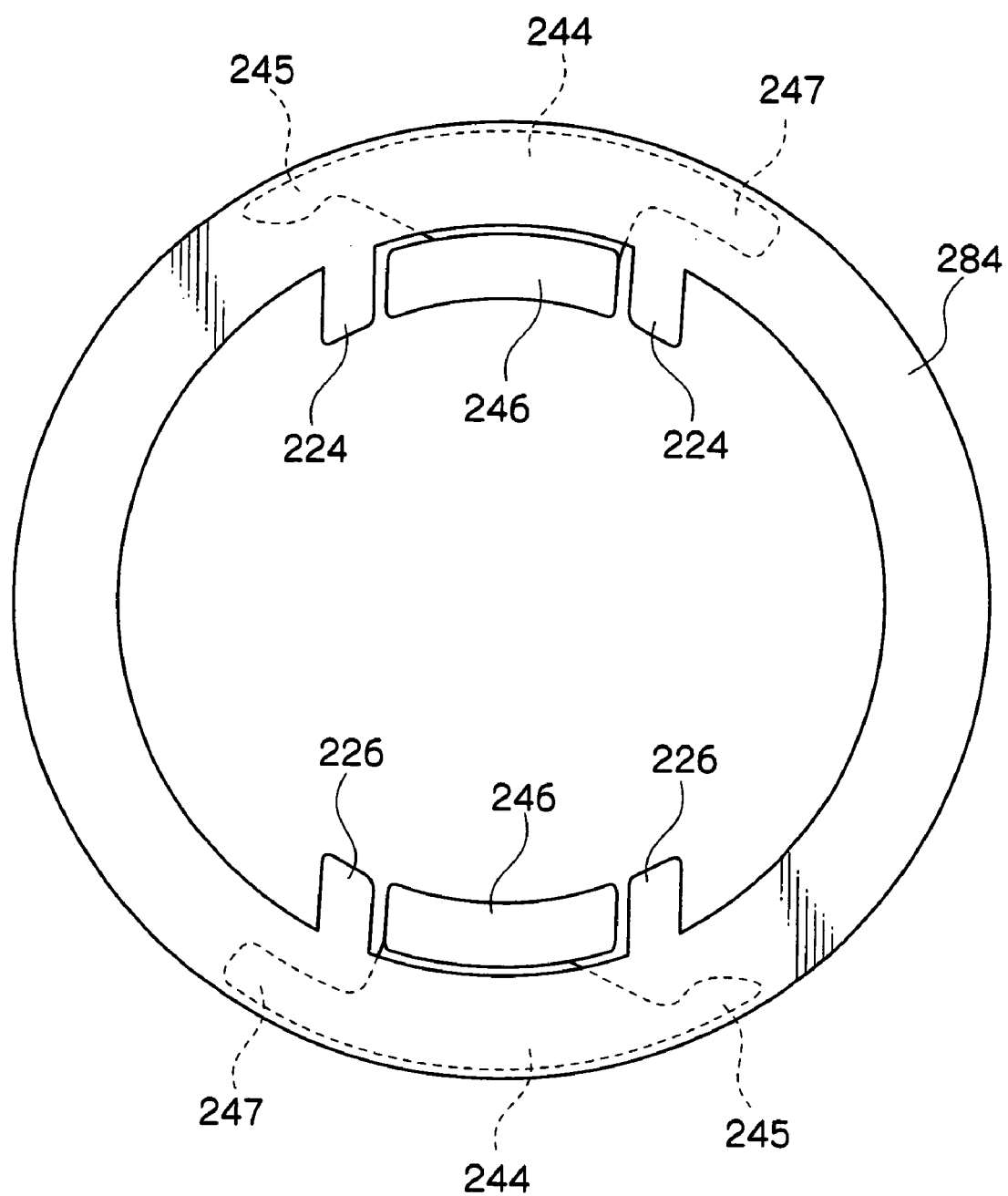
[FIG. 22] A side view showing the configuration of the sliders and a spacer of the webbing take-up device pertaining to the second embodiment of the present invention.

A spacer 284 formed in a ring shape by a resin material or the like is disposed on the side of the ring 276 opposite from the rotor 224 (the side in the direction of arrow A in FIG. 14 and FIG. 15). The spacer 284 is sandwiched between the cover portion 278 of the ring 276 and the cover clutch 290. A pair each of coupling pieces 224 and 226 that protrude inward in the radial direction in correspondence to the previously mentioned pair of sliders 244 are disposed on the inner peripheral portion of the spacer 284. As shown in FIG. 22, the pair of coupling pieces 224 and the pair of coupling pieces 226 sandwich the sliding pieces 246 of the sliders 244 at both of their curve-direction sides. Thus, the pair of sliders 244 are coupled by the spacer 284, and the pair of sliders 244 and the spacer 284 synchronously relatively move (relatively rotate) with respect to the rotor 224 and the lock bars 254. Moreover, in this case, frictional force acts on the spacer 284 by slide contact (sliding) with the cover clutch 290.

It will be noted that in the second embodiment, although the pair of sliders 244 and the spacer 284 are configured separately, the invention is not limited to this and the pair of sliders 244 and the spacers 284 may also be configured integrally.

The clutch 293 having the above-described configuration is configured such that the gear wheel 216 of the clutch body portion 214 rotates when the worm gear 234 of the clutch gear portion 292 rotates, and the clutch body portion 214 and the clutch gear portion 292 are integrally assembled into a single case (the clutch case 201 and the cover clutch 290), so that, overall, the clutch 293 is unitized.

As shown in FIG. 12, a spring complete 242 is disposed on the side of the cover clutch 290. The spring complete 242 houses a spiral spring (not shown) inside. The end portion of the spiral spring at the outer side in the spiral direction is latched to the case body, and the end portion of the spiral spring at the inner side in the spiral direction is latched to the distal end of the coupling screw 221 penetrating the clutch body portion 214, and the spiral spring biases the take-up shaft 220 in the take-up direction.

Further, a motor 244 and a motor gear portion 246 are disposed below the take-up shaft 220 between the leg plate 216 and the leg plate 218.

Figure 23:
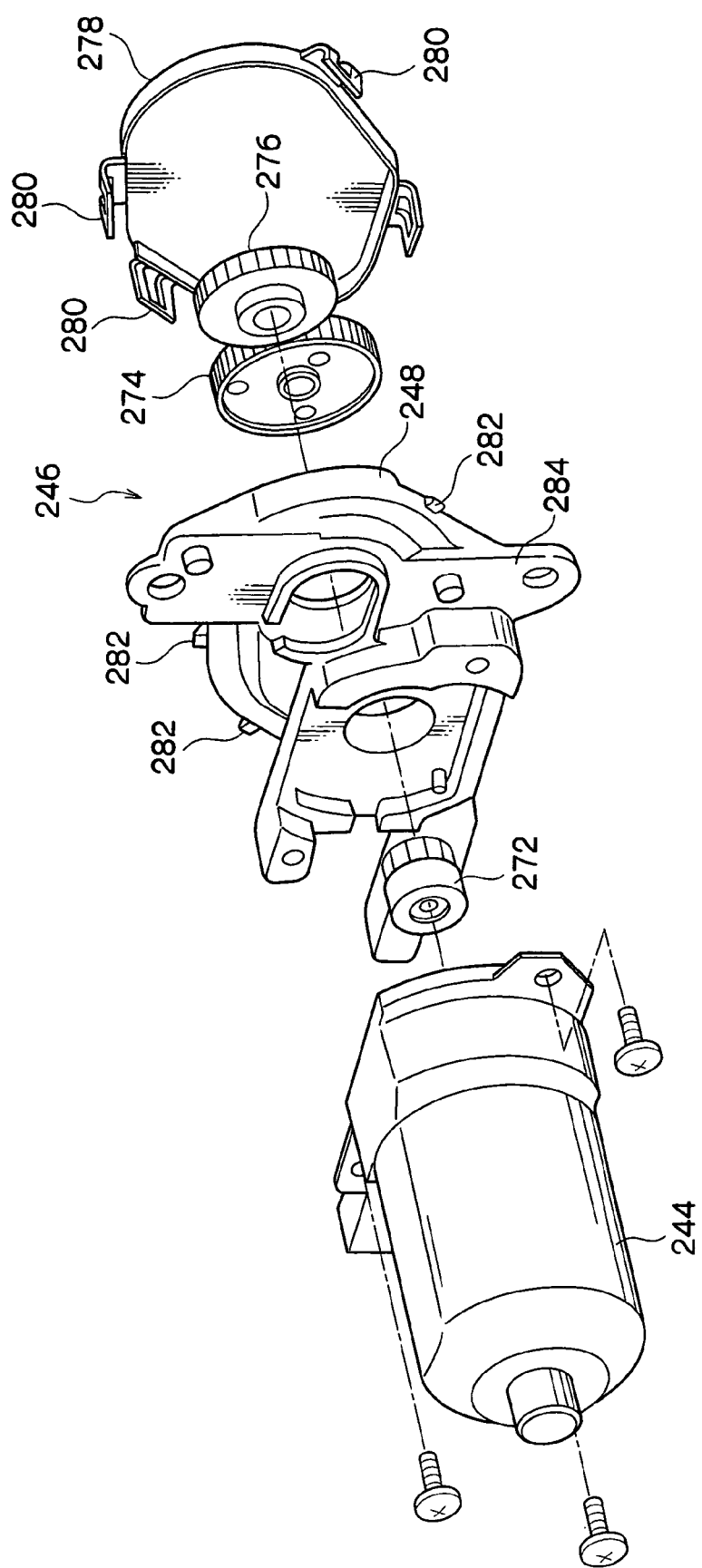
[FIG. 23] An exploded perspective view showing the configuration of a motor and a motor gear portion of the webbing take-up device pertaining to the second embodiment of the present invention.

As shown in FIG. 23, the motor 244 and the motor gear portion 246 are disposed with a housing 248. The motor 244 is attached to one side of the housing 248 by screws, and the motor gear portion 246 is disposed on the other side of the housing 248. The motor 244 is fixed to the one side of the housing 248 in a state where the distal end side (the output side) of a rotating shaft 250 faces the housing 248, and the distal end (the output side) of the rotating shaft 250 protrudes toward the other side of the housing 248 (the side of the motor gear portion 246).

A pinion 272 having spur teeth on its outer periphery is attached to the distal end of the rotating shaft of the motor 244 protruding toward the other side of the housing 248 (the side of the motor gear portion 246). Further, a gear 274 and a gear 276, each of which is formed as outer-toothed spur gears, are housed in the motor gear portion 246 in a state where they are meshed with each other. The gear 274 and the gear 276 are disposed in a state where their axes are parallel to the rotating shaft of the motor 244. The gear 274 meshes with the pinion 272, and the gear 276, which serves as a final spur gear, is detachably coupled to the previously mentioned one end portion of the worm gear 234 protruding outward from the clutch case 201. For this reason, when the motor 244 is driven, drive force is transmitted via the pinion 272, the gear 274, and the gear 276, and the worm gear 234 is rotated.

Further, the pinion 272, the gear 274, and the gear 276 are covered by a cover gear 278 attached to the housing 248. Pawl portions 280 are disposed on the cover gear 278, and the pawl portions 280 fit together and hook-and-lock with pawl receiving portions 282 disposed on the housing 248, whereby the cover gear 278 is fixed to the housing 248.

In this manner, the motor 244 and the motor gear portion 246 are both integrally assembled to the single housing 248, so that, overall, they are unitized.

Figure 24:
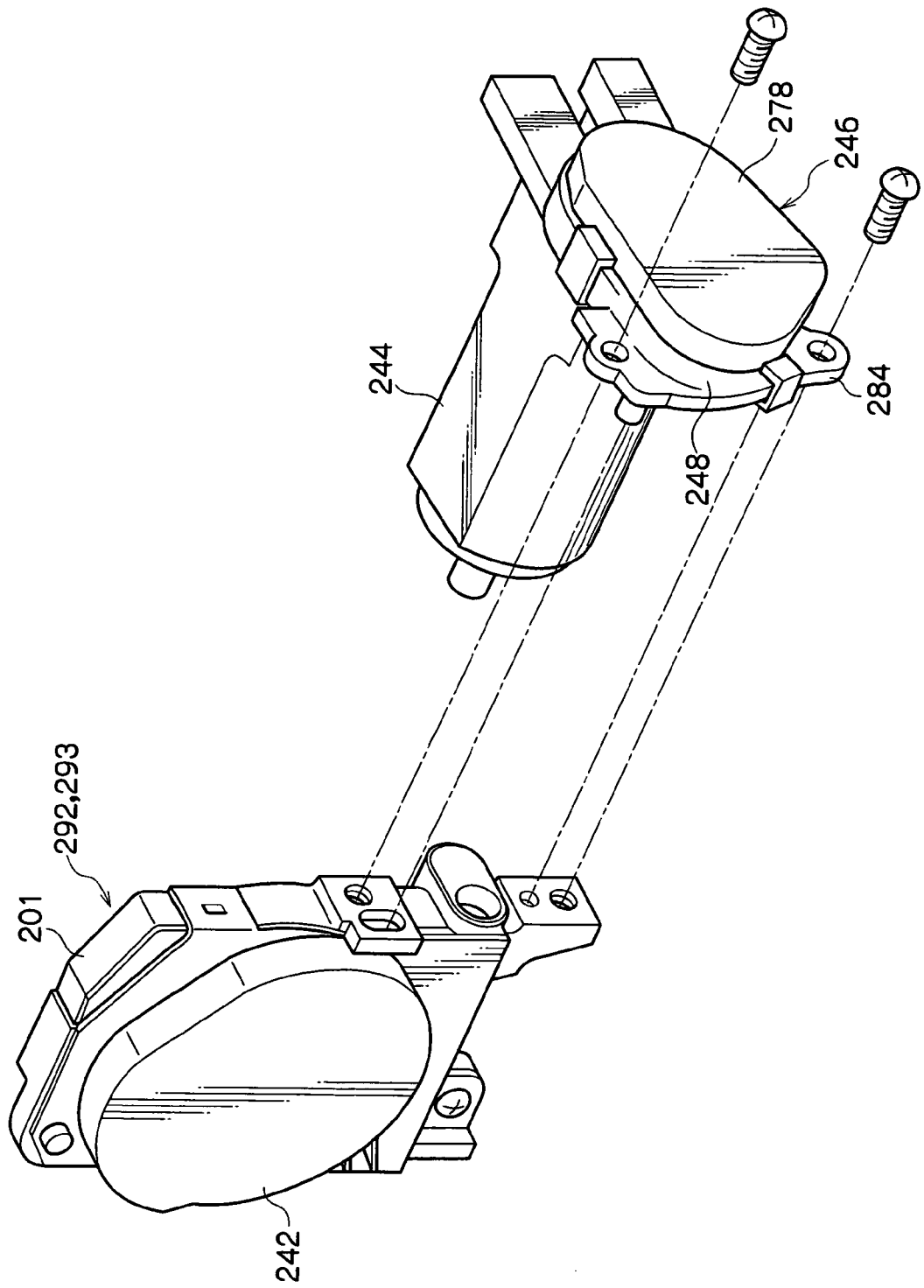
[FIG. 24] A side view showing the configuration of installation and fixing of the motor and the motor gear portion of the webbing take-up device pertaining to the second embodiment of the present invention.

As for the motor 244 and the motor gear portion 246 having the above configuration, as shown in FIG. 24, an attachment stay 284 integrally disposed on the housing 248 is detachably attached by screws to the clutch case 201 (i.e., the frame 212) housing the clutch body portion 214 and the clutch gear portion 292. In a state where the housing 248 is attached to the clutch case 201 (the frame 212), the rotating shaft 250 of the motor 244 is orthogonal to the take-up shaft 220 and the output side of the motor 244 faces the side of the frame 212 opposite from the back plate 214, and the motor 244 is positioned between the pair of the leg plate 216 and the leg plate 218 and directly below the take-up shaft 220.

Moreover, the previously mentioned motor 244 is configured to be actuated on the basis of a detection signal of a forward monitoring device or the like, for example.

Next, the action of the second embodiment will be described.

In the webbing take-up device 210 having the above-described configuration, the sliders 244 of the clutch body portion 214 are ordinarily disposed close to the lock bars 254, as shown in FIG. 19A. Consequently, the release pieces 268 of the lock bars 254 are ordinarily retained by the push retention pieces 245 of the sliders 244, and the coupling pieces 260 of the lock bars 254 are separated from the outer teeth 236 of the ratchet 234. For this reason, the ratchet 234 (the take-up shaft 220) is free to relatively rotate with respect to the rotor 224.

Consequently, when a passenger is seated in the seat of the vehicle and pulls out the webbing stored in the webbing take-up device 210, the webbing is pulled out while the take-up shaft 220 rotates in the pullout direction. Thus, the passenger places the webbing around his/her body and causes a tongue plate disposed on the webbing, for example, to engage with a buckle device, whereby the passenger can wear the webbing around his/her body.

When an obstacle is present in front of the vehicle while the vehicle is traveling and the distance between the vehicle and the obstacle (the distance from the vehicle to the obstacle) comes within a predetermined range, the driving of the motor 244 is started and the rotating shaft 250 is suddenly rotated.

When the rotating shaft 250 of the motor 244 is rotated, the rotational force is transmitted to the gear wheel 216 of the clutch body portion 214 via the pinion 272, the gear 274, and the gear 276 of the motor gear portion 246 and the worm gear 234 of the clutch gear portion 292, and the gear wheel 216 is suddenly rotated in the take-up direction. The rotation of the gear wheel 216 in the take-up direction is transmitted to the proximal end portions of the spring pawls 282 of the ring 276 via the circumferential-direction load receiving portions 220 and is transmitted to the outer teeth 230 of the rotor 224 from the distal end portions of the spring pawls 282, and the rotor 224 is suddenly rotated in the take-up direction.

At this time, because the sliders 244 are retained in the case (the clutch case 201 and the cover clutch 290) by frictional force acting on the sliding pieces 246 and the retainers 248, the rotor 224 relatively moves within a predetermined range with respect to the sliders 244, and the lock bars 254 supported on the rotor 224 move away from the sliders 244.

For this reason, the retention of the release pieces 268 by the push retention pieces 245 is released, the coupling pieces 260 of the lock bars 254 are moved toward the ratchet 234 by the biasing force of the torsion coil springs 264, and the distal end portions of the coupling pieces 260 mesh with the outer teeth 236 of the ratchet 234 (see arrow E in FIG. 19B). Thus, the rotation of the rotor 224 in the take-up direction is transmitted to the ratchet 234 via the lock bars 254, and the ratchet 234 is suddenly rotated in the take-up direction. Because the ratchet 234 is integrally coupled to the take-up shaft 220, the take-up shaft 220 is suddenly rotated in the take-up direction together with the ratchet 234.

Thus, the webbing is taken up on the take-up shaft 220, slight looseness of the webbing known as "slack" is eliminated and the restraining force of the webbing with respect to the body of the passenger is improved, so that even if the passenger thereafter performs the operation of sudden vehicular braking (sudden braking) and the vehicle suddenly decelerates, the webbing reliably holds the body of the passenger.

Moreover, in a state where the "slack" has been eliminated as described above, the body of the passenger becomes an obstacle, so that basically no more of the webbing becomes able to be taken up on the take-up shaft 220. For this reason, a load equal to or greater than a predetermined value acts on the take-up shaft 220 from the webbing, and as a result, a load (overload) equal to or greater than a predetermined value acts on the rotor 224 via the ratchet 234 and the lock bars 254. When a load equal to or greater than a predetermined value acts on the rotor 224, as shown in FIG. 21A and FIG. 21B, the spring pawls 282 become elastically deformed, the distal end portions of the spring pawls 282 escape from the valley portions between the outer teeth 230 of the rotor 224, and relative idling between the gear wheel 216 and the rotor 224 becomes possible (a "load limiter mechanism"; see arrow F in FIG. 21B).

Thus, the take-up shaft 220 coupled to the rotor 224 via the ratchet 234 and the lock bars 254 can be prevented from being rotated in the take-up direction with a force more than necessary by the driving force of the motor 244, and the webbing can be prevented from tightening around the body of the passenger with a force more than necessary.

Figure 25A:
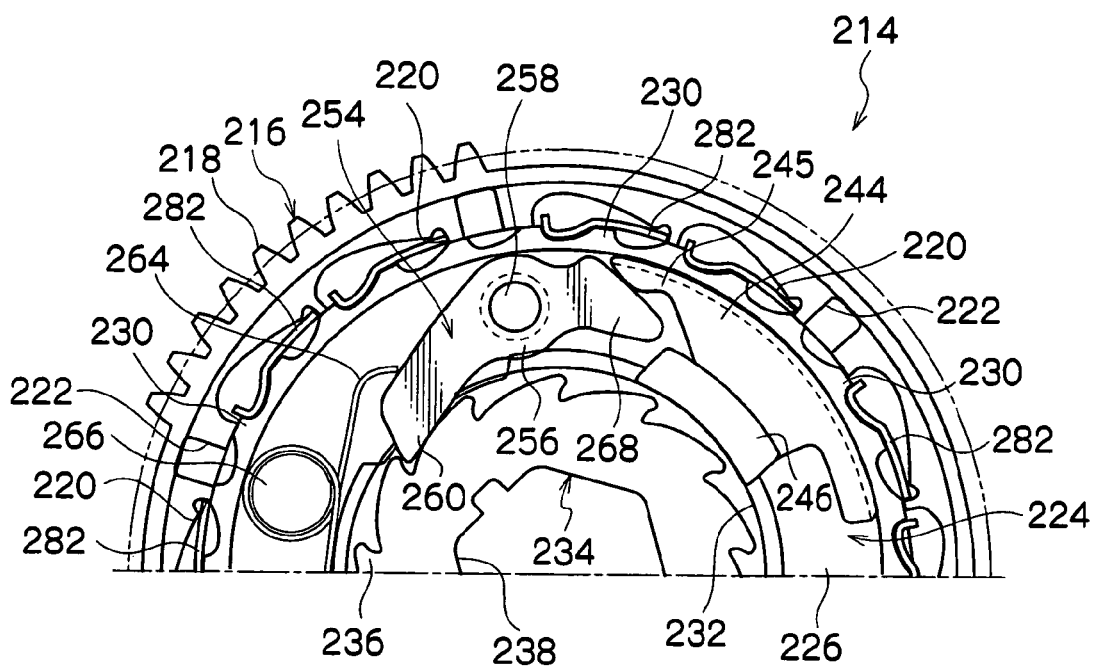
[FIG. 25A] A side view showing a state where the lock bars are engaged with the ratchet in the configuration of the clutch of the webbing take-up device pertaining to the second embodiment of the present invention.
Figure 25B:
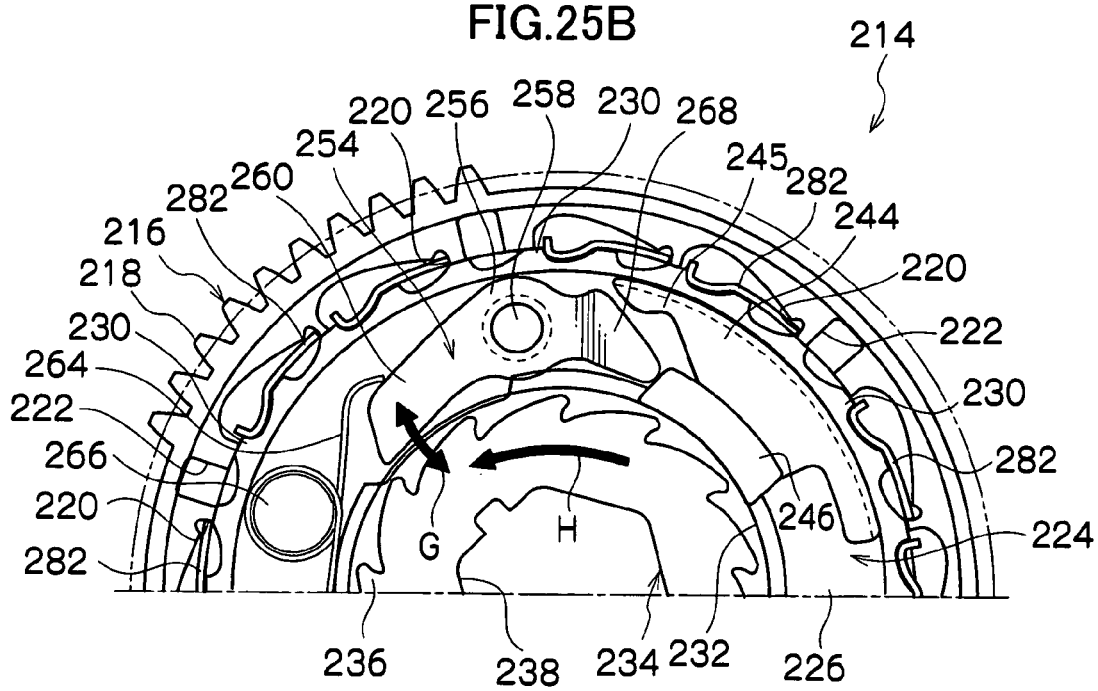
[FIG. 25B] A side view showing a state where the lock bars allow relative rotation of the ratchet with respect to the rotor in the webbing take-up direction in the configuration of the clutch of the webbing take-up device pertaining to the second embodiment of the present invention.

Moreover, in this state, because the outer teeth 236 of the ratchet 234 are formed as ratchet teeth, as shown in FIGS. 25A and 25B, when the ratchet 234 (the take-up shaft 220) tries to relatively rotate in the take-up direction with respect to the rotor 224 (see arrow H in FIG. 25B), the lock bars 254 jump over the outer teeth 236 of the ratchet 234 (see arrow G in FIG. 25B) and allow the relative rotation of the ratchet 234 (the take-up shaft 220) in the take-up direction with respect to the rotor 224.

Thus, as described above, when, for example, a collision of the vehicle cannot be avoided in a state where the "slack" has been eliminated, it is also possible to cause the take-up shaft 220 to be forcibly rotated in the take-up direction by a separate pretensioner mechanism or the like. In this case, the restraining force of the webbing on the body of the passenger can be further raised, and injury to the passenger in the event of a vehicle collision can be kept to a minimum.

Figure 26A:
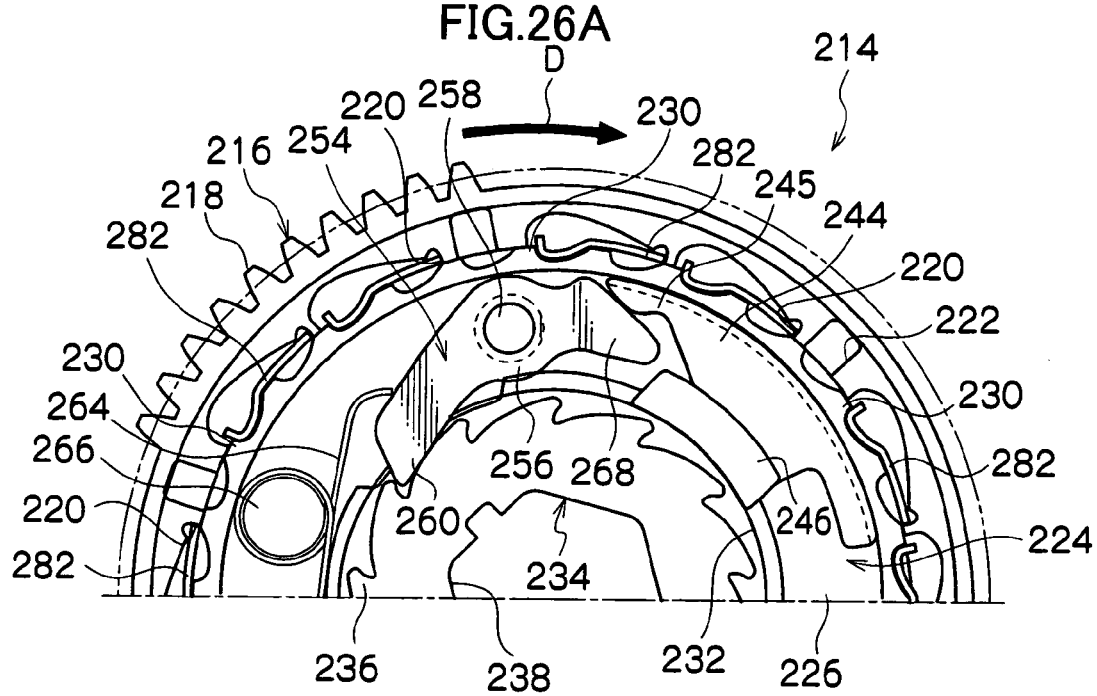
[FIG. 26A] A side view showing a state where the lock bars are engaged with the ratchet in the configuration of the clutch of the webbing take-up device pertaining to the second embodiment of the present invention.

When the danger of such a vehicle collision has been avoided, the rotating shaft 250 of the motor 244 is reversely rotated. The rotational force of the rotating shaft 250 is transmitted to the gear wheel 216 of the clutch body portion 214 via the pinion 272, the gear 274, and the gear 276 of the motor gear portion 246 and the worm gear 234 of the clutch gear portion 292, and the gear wheel 216 is suddenly rotated in the pullout direction (see arrow D in FIG. 26A).

The rotation of the gear wheel 216 in the pullout direction is transmitted to the baffle pawls 280 of the ring 276 via the baffle concave portions 222 of the gear wheel 216 and is transmitted to the outer teeth 230 of the rotor 224 from the distal end portions of the spring pawls 282 of the ring 276, and the rotor 224 is suddenly rotated in the pullout direction.

At this time, because the sliders 244 are retained in the case (the clutch case 201 and the cover clutch 290) by frictional force acting on the sliding pieces 246 and the retainers 248, the rotor 224 relatively moves within a predetermined range with respect to the sliders 244, and the lock bars 254 supported on the rotor 224 move toward the sliders 244.

Figure 26B:
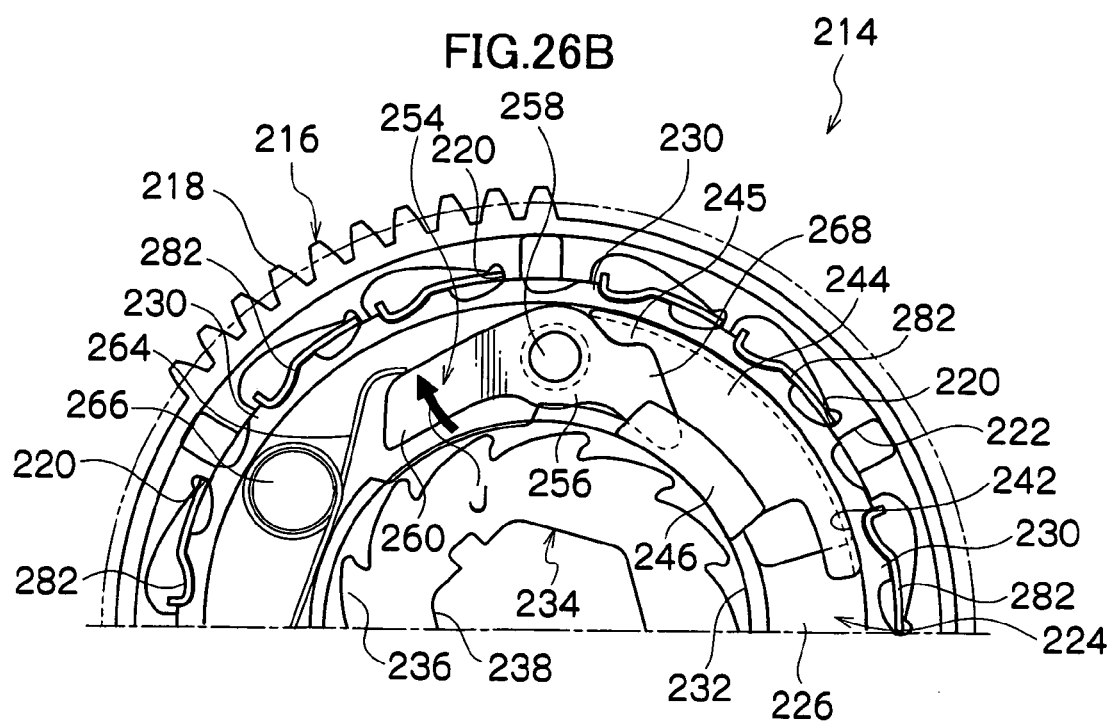
[FIG. 26B] A side view showing a state where the lock bars are retained in the sliders in the configuration of the clutch of the webbing take-up device pertaining to the second embodiment of the present invention.

For this reason, the push retention pieces 245 of the sliders 244 push the slanted end surfaces of the release pieces 268 of the lock bars 254, whereby the release pieces 268 are moved toward the ratchet 234 counter to the biasing force of the torsion coil springs 264 (see arrow J in FIG. 26B), and the coupling pieces 260 of the lock bars 254 move away from the outer teeth 236 of the ratchet 234. Moreover, when the lock bars 254 move toward the sliders 244, the release pieces 268 of the lock bars 254 enter the inner sides (toward the ratchet 234) of the push retention pieces 245 of the sliders 244 so that the lock bars 254 are retained in the disengaged positions (the state shown in FIG. 26B). Thus, the rotor 224 and the ratchet 234 again become relatively rotatable so that free rotation of the take-up shaft 220 becomes possible.

Here, in the clutch body portion 214 of the webbing take-up device 210, the push retention pieces 245 of the sliders 244 and the release pieces 268 of the lock bars 254 are configured to mesh and engage with each other via the slanted surfaces 249 and the slanted surfaces 269, and predetermined drag arises when the sliders 244 try to move away from the lock bars 254. Consequently, for example, even when the sliders 214 try to move away form the lock bars 254 due to intense vibration or the like of the vehicle during traveling, the separation movement is deterred by the predetermined drag resulting form the meshing and engagement between the push retention pieces 245 and the release pieces 268, and the engaged state between the push retention pieces 245 of the sliders 244 and the release pieces 268 of the lock bars 254 is maintained. Thus, the retention of the lock bars 254 by the sliders 244 is prevented from being inadvertently released, and erroneous linkage of the clutch body portion 214 is prevented.

Moreover, in the clutch body portion 214 of the webbing take-up device 210, the pair of sliders 244 that retain the pair of lock bars 254 in the positions where the lock bars 254 are disengaged from the ratchet 234 are coupled by the spacer 284 and are synchronous. Consequently, for example, even when one of the sliders 244 tries to relatively move with respect to the rotor 224 (one of the lock bars 254) due to intense vibration or the like of the vehicle, the retention of the one lock bar 254 by the one slider 244 is not released as long as the other slider 244 and the spacer 284 do not relatively move with respect to the rotor 224.

That is, in the clutch body portion 214, the retention of the lock bars 254 by the sliders 144 is not released as long as the sliders 244 and the spacer 284 do not relatively move at the same time with respect to the lock bars 254.

Moreover, in this case, the spacer 284 that couples and synchronizes the pair of sliders 244 is configured to slide against the cover clutch 290. For this reason, because frictional force acts on the spacer 284, the pair of sliders 244 and the spacer 284 can be more reliably prevented from inadvertently relatively moving with respect to the rotor 224, that is, the pair of lock bars 254, and erroneous linkage of the clutch body portion 214 can be more reliably prevented.

Further, in the clutch body portion 214 of the webbing take-up device 210, the load (overload) at the time of rotation transmission cutoff of the gear wheel 216 and the rotor 224 can be adjusted by changing the number of the twelve spring pawls 282 disposed on the ring 276 to six or eight, for example. Consequently, the setting of the load is easy.

Further, in the clutch body portion 214 of the webbing take-up device 210, the coupling screw 221 coaxially and integrally coupled to the take-up shaft 220 penetrates the coupling hole 238 of the ratchet 234 such that relative rotation is impossible and is press-fitted into the press fit portion 216 of the washer 209 integrally attached to the ratchet 234. Consequently, backlash of the ratchet 234 with respect to the coupling screw 221 is prevented, and the occurrence of striking sounds (backlash sounds) resulting from such backlash is prevented.

Moreover, the press fit portion 216 of the washer 209 includes the crush ribs 218 that are crushed by the press-fitting of the coupling screw 221. Consequently, the load when the coupling screw 221 is press-fitted into the press fit portion 216 can be easily adjusted by changing the size and the shape of the crush ribs 218.

Further, in the clutch 293 of the webbing take-up device 210, with respect to the clutch case 201 and the cover clutch 290 that house the clutch body portion 214 and the clutch gear portion 292, the cover clutch 290 is attached to the open side of the clutch case 201 as a result of the through holes 202 of the two hook-and-lock pawls 200 that protrude in the plate thickness direction fitting and hooking-and-locking together with the two engagement protrusions 206 disposed on the side wall of the clutch case 201. Consequently, when the cover clutch 290 is to be attached to the clutch case 201, it is not necessary to use tools, and the cover clutch 290 can be easily and quickly attached by manual work.

Moreover, in this case, the guide portions 204 that guide and position the hook-and-lock pawls 200 of the cover clutch 290 are disposed in the clutch case 201. Thus, the work of attaching the cover clutch 290 to the clutch case 201 becomes even easier.

Further, in this case, because the guide portions 204 have groove shapes and the hook-and-lock pawls 200 fit together with the guide portions 204, the hook-and-lock pawls 200 can be prevented from becoming displaced (escaping) along the side wall of the clutch case 201 when the cover clutch 290 is to be attached to the clutch case 201. Consequently, it is not necessary to set the two hook-and-lock pawls 200 to positions where the clutch case 201 is sandwiched by the hook-and-lock pawls 200 (e.g., in FIG. 13, the right side end surface and the left side end surface of the cover clutch 290), and it becomes possible to dispose the hook-and-lock pawls 200 on mutually orthogonal end surfaces of the cover clutch 290 (in FIG. 13, the left side end surface and the lower side end surface) as in the second embodiment. Thus, the degree of freedom with which the positions of the hook-and-lock pawls 200 can be set is improved.

As described above, in the webbing take-up device 210 pertaining to the second embodiment, erroneous linkage of the clutch body portion 214 can be prevented. Further, the load (overload) at the time of rotation transmission cutoff between the gear wheel 216 and the rotor 224 can be easily set. Moreover, the attachment of the cover clutch 290 to the clutch case 201 becomes easy. Further still, backlash between the ratchet 234 and the coupling screw 221 is prevented, and the occurrence of backlash sounds is prevented. Further, the load when the coupling screw 221 is press-fitted into the washer 234 can be easily adjusted.

The clutch body portion 214 pertaining to the second embodiment has a configuration where the slanted surfaces 249 are disposed on the push retention pieces 245 of the sliders 244, the slanted surfaces 269 corresponding to the slanted surfaces 249 are disposed on the release pieces 268 of the lock bars 254, and predetermined drag is caused to arise in the separation movement of the lock bars 254 and the sliders as a result of the push retention pieces 245 and the release pieces 268 being caused to mesh and engage with each other. However, the invention is not limited to this. Protrusions may be disposed on the push retention pieces 245 of the sliders 244 and on the release pieces 268 of the lock bars 254, so that predetermined drag is caused to arise in the separation movement of the lock bars 254 and the sliders as a result of causing these protrusions to mesh and engage with each other. Further, a treatment to raise frictional force may be administered to the contact portions of the push retention pieces 245 and the release pieces 268 to cause predetermined drag to arise in the separation movement of the lock bars 254 and the sliders.

Further, although the webbing take-up device 210 pertaining to the second embodiment was configured such that the rotation of the rotating shaft 250 of the motor 244 was transmitted to the take-up shaft 220 by the clutch 293 to cause the take-up shaft 220 to rotate in the webbing take-up direction, the webbing take-up device is not limited to this and may also be configured such that the rotation of the rotating shaft 250 of the motor 244 is transmitted to the take-up shaft 220 by the clutch to cause the take-up shaft 220 to rotate in the webbing pullout direction. This point is the same with respect also the third embodiment below.

Third Embodiment

Next, a third embodiment of the present invention will be described. It will be noted that, in regard to configurations/actions that are basically the same as those of the second embodiment, the same reference numerals as those in the second embodiment will be used and description thereof will be omitted.

Figure 27A:
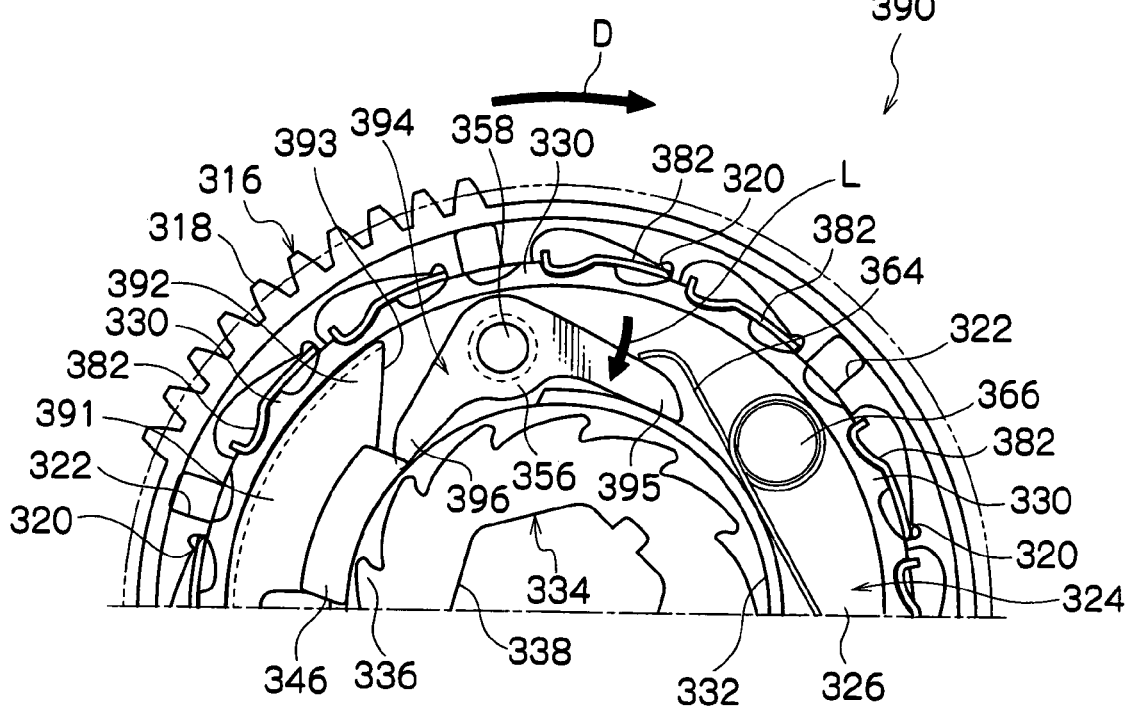
[FIG. 27A] A side view showing a state where the lock bars are retained in positions where they are disengaged from the ratchet in the configuration of the clutch of the webbing take-up device pertaining to the second embodiment of the present invention.
Figure 27B:
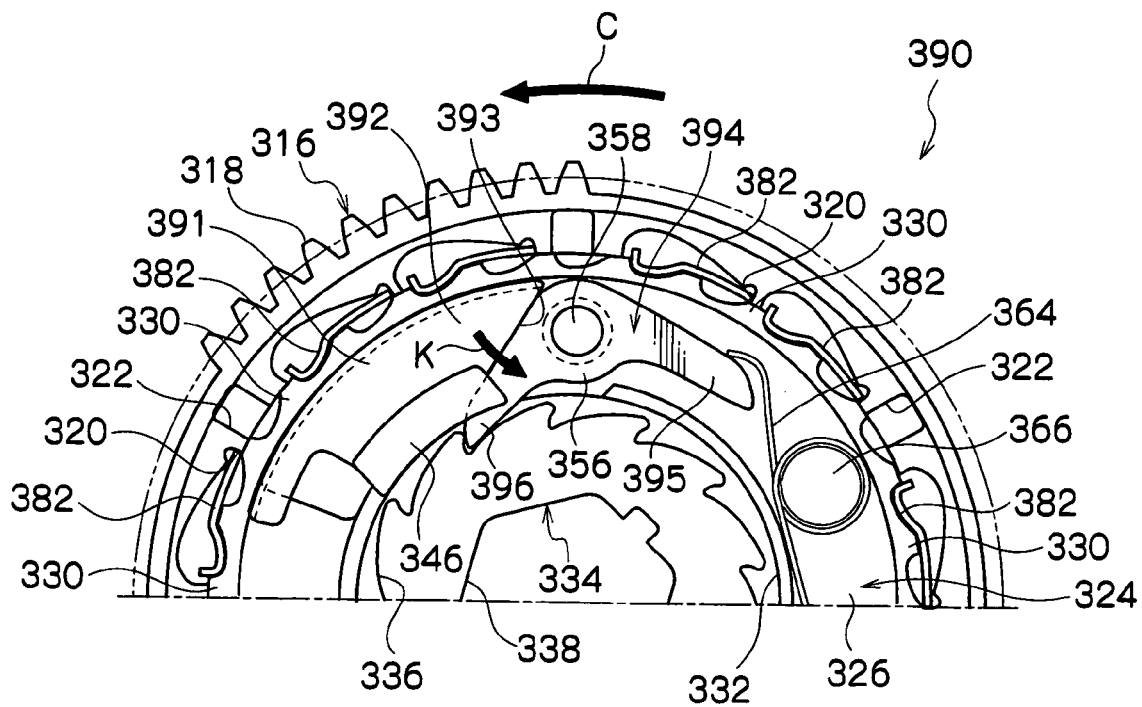
[FIG. 27B] A side view showing a state where the lock bars are engaged with the ratchet in the configuration of the clutch of the webbing take-up device pertaining to the second embodiment of the present invention.

In FIG. 27A and FIG. 27B, the partial configuration of a clutch body portion 390 that is a configural member of a webbing take-up device pertaining to the third embodiment of the invention is shown in side view.

The clutch body portion 390 basically has the same configuration as that of the clutch body portion 114 pertaining to the previously mentioned second embodiment, but is different in the following respect.

The clutch body portion 390 is disposed with sliders 391. The sliders 391 basically have the same configuration as that of the sliders 244 pertaining to the second embodiment, but include push portions 392 instead of the previously mentioned push retention pieces 245. Slanted surfaces 393 that are slanted with respect to the moving direction of the sliders 391 (the circumferential direction of a rotor 324) are formed on the push portions 392.

Further, lock bars 394 are disposed on the push portion 392 (the slanted surface 393) side of the sliders 391. The lock bars 394 basically have the same configuration as that of the lock bars 254 pertaining to the second embodiment, but release edges 395 that protrude toward the side of bearing portions 356 opposite from the sliders 391 are always biased toward a ratchet 334 by torsion coil springs 364. For this reason, coupling pieces 396 that are disposed on the bearing portions 356 such that they protrude toward the sliders 391 are always biased toward the opposite side of the ratchet 334 (in the disengagement direction) and are always separated from the ratchet 334 (the state shown in FIG. 27A).

In the clutch body portion 390, when the rotor 324 rotates in the take-up direction (in the direction of arrow C in FIG. 27B), the rotor 324 relatively moves within a predetermined range with respect to the sliders 391 and the lock bars 394 supported on the rotor 324 move toward the sliders 391 because the sliders 391 are retained on the clutch case 201 and the cover clutch 290 (both not shown) by frictional force acting on sliding pieces 346 and retainers 348 (not shown). When the lock bars 394 move toward the sliders 391, the coupling pieces 396 of the lock bars 394 are pushed toward the ratchet 134 by the slanted surfaces 393 of the push portions 392, and the distal end portions of the coupling pieces 396 mesh with outer teeth 336 of the ratchet 334 (see arrow K in FIG. 27B).

On the other hand, when the rotor 324 rotates in the pullout direction (the direction of arrow D in FIG. 27A), the rotor 324 relatively moves within a predetermined range with respect to the sliders 391 and the lock bars 394 supported on the rotor 324 move away from the sliders 391 because the sliders 391 are retained on the clutch case 101 and the cover clutch 290 (both not shown) by frictional force acting on the sliding pieces 346 and the retainers 348 (not shown). When the lock bars 394 move away from the sliders 391, the pushing on the coupling pieces 396 of the lock bars 394 by the slanted surfaces 393 of the push portions 392 is released and the coupling pieces 396 are again moved to and retained in the positions where they are disengaged from the ratchet 334 (see arrow L in FIG. 27A).

Even in the clutch body portion 390 having this configuration, action and effects that are basically the same as those of the clutch body portion 114 pertaining to the second embodiment are provided.

In particular, in the clutch, body portion 390, the coupling pieces 396 of the lock bars 394 are always biased by the torsion coil springs 364 in the direction in which the coupling pieces 396 are disengaged from the ratchet 334. Consequently, even when intense vibration arises in the vehicle during travel, the coupling pieces 396 of the lock bars 394 are retained by the biasing force of the torsion coil springs 364 in the positions where the coupling pieces 396 are disengaged from the ratchet 334. Thus, the coupling pieces 396 of the lock bars 394 are prevented from inadvertently engaging with the ratchet 334, and erroneous linkage of the clutch body portion 390 is prevented.

INDUSTRIAL APPLICABILITY

The present invention is as described above, and the webbing take-up device pertaining to the present invention can not only transmit to the take-up shaft just the rotation from the motor by the clutch, but can also be configured simply and compactly. Further, the webbing take-up device of the present invention can prevent erroneous linkage of the clutch. Consequently, its range of utilization is extremely wide.

DESCRIPTION OF THE REFERENCE NUMERALS

10, 210 Webbing take-up devices
20, 220 Take-Up Shafts
44, 244 Motors
100, 293 Clutches
101, 201 Clutch Cases (Cases)
102, 290 Cover Clutches (Cases)
116, 216 Gear Wheels
124, 224, 324 Rotors
134, 234, 334 Ratchets
144, 244, 391 Sliders
154, 254, 394 Lock Bars
182, 282 Spring Pawls

The invention claimed is:

1. A webbing take-up device comprising:
a take-up shaft around which a webbing for restraining a passenger is wound such that the webbing can be taken up and pulled out;
a frame rotatably supporting the take-up shaft;
a motor; and
a clutch that is mechanically intervened between the motor and the take-up shaft, transmits the rotation of the motor to the take-up shaft to cause the take-up shaft to rotate in the webbing take-up direction, and cuts off the transmission of rotation arising at the take-up shaft side to prevent that rotation from being transmitted to the motor,
wherein the clutch includes
a case that is fixed to the frame,
a rotating body that is disposed coaxially with respect to the take-up shaft and rotates as a result of the rotation of the motor being transmitted to the rotating body,
a ratchet that is integrally coupled to the take-up shaft,
sliders that are configured to be relatively movable within a predetermined range with respect to the rotating body as a result of being retained in the case by frictional force, and
lock bars that are disposed on the rotating body, are always biased in a direction in which the lock bars engage with the ratchet, and are ordinarily retained by the sliders in positions where the lock bars are disengaged from the ratchet, and when the rotating body rotates in the webbing take-up direction, the lock bars move away from the sliders such that the retention is released, engage with the ratchet by the biasing force, transmit to the ratchet the rotation of the rotating body in the webbing take-up direction, and allow the relative rotation of the ratchet with respect to the rotating body in the webbing take-up direction, and when the rotating body rotates in the webbing pullout direction, the lock bars move toward the sliders and are moved to and retained in the disengaged positions by the sliders.

2. The webbing take-up device of claim 1, wherein the rotating body includes
a gear wheel that rotates as a result of the rotation of the motor being transmitted to the gear wheel,
a rotor that supports the lock bars, and
spring pawls that are disposed between the gear wheel and the rotor, couple both to each other, and transmit the rotation of the gear wheel to the motor, and when a load equal to or greater than a predetermined value acts on the rotor, the spring pawls cut off the transmission of rotation between the gear wheel and the rotor by the load to enable both to relatively idle.

3. The webbing take-up device of claim 1, wherein the sliders are configured to relatively move within a predetermined range with respect to the rotating body when the rotating body rotates in the webbing take-up direction, such that the lock bars that rotate integrally with the rotating body separate from the sliders.

4. The webbing take-up device of claim 3, wherein the lock bars are configured to engage with the ratchet by moving away from the sliders.

5. The webbing take-up device of claim 3, wherein the lock bars are configured to disengage from the ratchet when a load that causes the ratchet to relatively rotate with respect to the rotating body in the webbing take-up direction is applied to the ratchet.

6. The webbing take-up device of claim 3, wherein the sliders are configured to relatively move within a predetermined range with respect to the rotating body when the rotating body rotates in the webbing pullout direction, such that the lock bars that rotate integrally with the rotating body reengage with the sliders.

7. The webbing take-up device of claim 6, wherein the lock bars are configured such that they are retained in the positions where the lock bars are disengaged from the ratchet by reengaging with the sliders.

8. The webbing take-up device of claim 1, wherein at least one of the sliders and the lock bars include retention portions that cause predetermined drag to arise with respect to the movement of the sliders away from the lock bars when the rotating body is stopped.

9. The webbing take-up device of claim 8, wherein the sliders and the lock bars are configured to mesh and engage with each other a predetermined dimension with respect to the radial direction of the rotating body, and the engagement portions of the sliders and the lock bars are the retention portions.

* * * * *